(12) United States Patent
Bao et al.

(10) Patent No.: US 10,063,606 B2
(45) Date of Patent: Aug. 28, 2018

(54) SYSTEMS AND METHODS FOR USING CLIENT-SIDE VIDEO BUFFER OCCUPANCY FOR ENHANCED QUALITY OF EXPERIENCE IN A COMMUNICATION NETWORK

(71) Applicant: Taiwan Semiconductor Manufacturing Co., Ltd., Hsinchu (TW)

(72) Inventors: Yiliang Bao, San Diego, CA (US); David Gell, San Diego, CA (US)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 588 days.

(21) Appl. No.: 14/675,259

(22) Filed: Mar. 31, 2015

(65) Prior Publication Data

US 2015/0215359 A1 Jul. 30, 2015

Related U.S. Application Data

(63) Continuation-in-part of application No. 13/789,462, filed on Mar. 7, 2013, now Pat. No. 9,380,091.
(Continued)

(51) Int. Cl.
   *G06F 15/16* (2006.01)
   *H04L 29/06* (2006.01)
   *H04L 29/08* (2006.01)
(52) U.S. Cl.
   CPC .......... *H04L 65/60* (2013.01); *H04L 65/605* (2013.01); *H04L 65/80* (2013.01); *H04L 67/10* (2013.01)

(58) Field of Classification Search
   CPC .................................................... H04L 65/605
   See application file for complete search history.

(56) References Cited

U.S. PATENT DOCUMENTS 8,554,879 B2  10/2013  Yu et al.
8,902,782 B2  12/2014  Gustafsson et al.
(Continued)

OTHER PUBLICATIONS

Singh et al. "Video Capacity and QoE Enhancements over LTE." Presented at IEEE International Conference on Communications, Jun. 15, 2012, 20 pages.
(Continued)

*Primary Examiner* — Vivek Srivastava
*Assistant Examiner* — Nicholas Celani
(74) *Attorney, Agent, or Firm* — JCIPRNET

(57) ABSTRACT

A network node, and a method for operating a network node, such as a base station, may transmit multiple video streaming sessions from servers to clients in terminal nodes and can estimate client-side video buffer occupancy levels associated with the streaming sessions. To estimate a client-side video buffer occupancy level, the network node analyzes packets communicated with the terminal nodes to identify application layer messages and extract transaction information, determine payload types associated with objects conveyed in the packets identified with application layer messages, and associate the objects conveyed in the packets identified with application layer messages with one of the streaming sessions. The network node may use the estimated video buffer occupancy levels to determine scheduler parameters for use in scheduling packets for transmission to the terminal nodes. Packet scheduling may also be based on quality of experience considerations associated with streaming session clients in the terminal nodes.

28 Claims, 22 Drawing Sheets

Related U.S. Application Data

(60) Provisional application No. 61/973,016, filed on Mar. 31, 2014, provisional application No. 61/658,854, filed on Jun. 12, 2012.

(56) References Cited

U.S. PATENT DOCUMENTS

| | | | |
|---|---|---|---|
| 9,032,427 | B2 | 5/2015 | Gallant et al. |
| 9,037,743 | B2 | 5/2015 | Kordasiewicz et al. |
| 2004/0057446 | A1 | 3/2004 | Varsa et al. |
| 2006/0095944 | A1 | 5/2006 | Demircin et al. |
| 2007/0133405 | A1* | 6/2007 | Bowra ............... H04L 43/00 370/230 |
| 2007/0286279 | A1 | 12/2007 | Hamanaka |
| 2008/0198929 | A1 | 8/2008 | Fujihara |
| 2009/0154445 | A1* | 6/2009 | Jiang ............... H04L 47/10 370/349 |
| 2010/0135381 | A1* | 6/2010 | Hamamoto ...... H04N 21/23406 375/240.01 |
| 2010/0161761 | A1 | 6/2010 | Yu et al. |
| 2011/0096828 | A1 | 4/2011 | Chen et al. |
| 2011/0116460 | A1 | 5/2011 | Kovvali et al. |
| 2012/0110167 | A1 | 5/2012 | Joch et al. |
| 2012/0117225 | A1 | 5/2012 | Kordasiewicz et al. |
| 2012/0155398 | A1 | 6/2012 | Oyman et al. |
| 2012/0257671 | A1 | 10/2012 | Brockmann et al. |
| 2012/0317308 | A1 | 12/2012 | Penner et al. |
| 2013/0041998 | A1 | 2/2013 | Kordasiewicz et al. |
| 2013/0097309 | A1* | 4/2013 | Ma ............... H04L 29/08099 709/224 |
| 2013/0286879 | A1* | 10/2013 | ElArabawy ...... H04N 21/26208 370/252 |
| 2014/0082146 | A1* | 3/2014 | Bao ............... H04L 65/605 709/219 |
| 2014/0219082 | A1 | 8/2014 | Geijer Lundin |

OTHER PUBLICATIONS

International Search Report and Written Opinion for related international application No. PCT/US13/044253, dated Sep. 11, 2013, in 8 pages.

"Office Action of Europe Counterpart Application," dated Nov. 27, 2017, p. 1-p. 8.

* cited by examiner

| 'ftyp' (file type) 801 | | | | | | |
|---|---|---|---|---|---|---|
| 'pdin' (progressive download information) 802 | | | | | | |
| 'moov' metadata top-level Container 810 | 'mvhd' (movie header) 815 | | | | | |
| | 'trak' Track 820 | 'tkhd' (track header) 821 | | | | |
| | | 'edts' 822 | 'elst' (an edit list) 823 | | | |
| | | 'mdia' Media 830 | 'mdhd' (media header) 831 | | | |
| | | | 'hdlr' (handler) 832 | | | |
| | | | 'minf' media Information 840 | 'vmhd' (video media header) 842 | | |
| | | | | 'dinf' 844 | 'dref' (data reference) 846 | |
| | | | | 'stbl' sample Table 860 | 'stsd' (sample description) 861 | |
| | | | | | 'stts' (time-to-sample) 862 | |
| | | | | | 'stss' (sync sample) 863 | |
| | | | | | 'stsz' (sample size) 864 | |
| | | | | | 'stsc' (sample-to-chunk) 865 | |
| | | | | | 'stco' (chunk offset) 866 | |
| | | | | | 'sdtp' (independent & disp.) 867 | |
| | (more 'trak' BOXes, if movie has more tracks) 825 | | | | | |
| | 'mvex' 880 | 'mehd' (movie extends header) 881 | | | | |
| | | 'trex' (track extends defaults) 882 | | | | |
| 'mdat' (media data) 890 | | | | | | |

FIG. 9

SYSTEMS AND METHODS FOR USING CLIENT-SIDE VIDEO BUFFER OCCUPANCY FOR ENHANCED QUALITY OF EXPERIENCE IN A COMMUNICATION NETWORK

RELATED APPLICATIONS

This application claims the benefit of U.S. provisional patent application Ser. No. 61/973,016, filed Mar. 31, 2014 and is a continuation-in-part of U.S. patent application Ser. No. 13/789,462, filed Mar. 7, 2013, which claims the benefit of U.S. provisional patent application Ser. No. 61/658,854, filed Jun. 12, 2012, all of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention generally relates to the field of communication systems and more specifically to systems and methods for using estimated client-side video buffer occupancy for enhanced quality of experience in a communication network.

In a communication network, the rate at which data can be effectively transported between the various nodes in the network is limited. In a wired network, the limitation is often a function of equipment capability. For example, a gigabit Ethernet link can transport no more than one billion bits per second. In a wireless network, the limitation is often a function of channel bandwidth and the transmission technology and communication protocols used. A wireless network is further constrained by the amounts of spectrum allocated for particular services and areas and the quality of the signals between transmitting and receiving nodes. Additionally, the rates at which data can be transported in a wireless network often vary over time.

The demand for communication continues to increase. When demand for communication approaches or exceeds the capacity of the communication network, users are likely to experience delays or interruptions in their communication services. How delays or interruptions effect the users can vary between users, for example, depending on the type of data to be communicated. For example, delay in transporting data for a streaming video would be expected to substantially lower the quality of a user's experience relative to delay in transporting data for an email message.

SUMMARY

Systems and methods for using estimated client-side video buffer occupancy for enhanced quality of experience in a communication network are provided. The systems and methods provided herein can drive changes in a communication system using control responses. Example control responses include scheduling of packets and intelligent discard of packets under capacity constrained conditions. An access node, such as a base station, may transmit video from a server to a client in a user device. The access node can estimate or predict client-side video buffer occupancy. The client-side video buffer occupancy can be predicted by emulating the behavior of the client. The buffer occupancy can be used to enhance quality of experience for the user. For example, when the buffer occupancy is low, the access node may increase scheduling priority of packets conveying the video.

In an aspect, the invention provides a network node, including: a first communication module configured to communicate packets with one or more terminal nodes, the packets including packets associated with one or more streaming sessions; a second communication module configured to provide communications with one or more video servers; and a client buffer occupancy estimation module comprising a streaming object classification module configured, based on an inspection of at least a subset of the packets communicated with the one or more terminal nodes, to determine a payload type associated with objects conveyed in packets identified with application layer messages, and associate the objects conveyed in the packets identified with application layer messages with the one or more streaming sessions, and a buffer occupancy estimator module configured to estimate an occupancy level of each of one or more video buffers in the one or more terminal nodes, each of the one or more video buffers being associated with one of the one or more streaming sessions.

In an aspect, the invention provides a method for use in operating a network node that communicates packets with one or more terminal nodes, the packets including packets associated with one or more streaming sessions. The method includes: determining, based on an inspection of at least a subset of the packets communicated with the one or more terminal nodes, a payload type associated with objects conveyed in packets identified with application layer messages; associating, based on an inspection of at least a subset of the packets communicated with the one or more terminal nodes, objects conveyed in the packets identified with application layer messages with the one or more streaming sessions; and estimating an occupancy level of each of one or more video buffers in the one or more terminal nodes, each of the one or more video buffers being associated with one of the one or more streaming sessions.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 9 is a diagram of a data structure of a video file in accordance with aspects of the invention;

DETAILED DESCRIPTION

Systems and methods for communication systems that use estimated, or predicted, client-side video buffer occupancy to enhance users' quality of experience (QoE) are provided. Information about client-side video buffer occupancy may, for example, be used in control functions for scheduling communication between user equipment and base stations (or other network nodes). Information about client-side video buffer occupancy may, for example, be derived from information about what video data has been received by the client and an estimated playback time position of the video at the client. The systems and method are particularly useful in capacity constrained, multiple-access communication systems.

The systems and methods disclosed herein can be applied to various communication systems, including wireline and wireless technologies. For example, the systems and methods disclosed herein can be used with Cellular 2G, 3G, 4G (including Long Term Evolution (LTE), LTE Advanced, and WiMAX), cellular backhaul, Wi-Fi, ZigBee, Bluetooth, Ultra Mobile Broadband (UMB), digital subscriber line (DSL), multimedia over coax alliance (MoCA), Ethernet, cable modem, and other point-to-point or point-to-multi-point wireline or wireless technologies. For concise exposition, various embodiments are described using terminology and organization from particular technologies and standards. However, the systems and methods described herein are broadly applicable to other technologies and standards.

Figure 1:
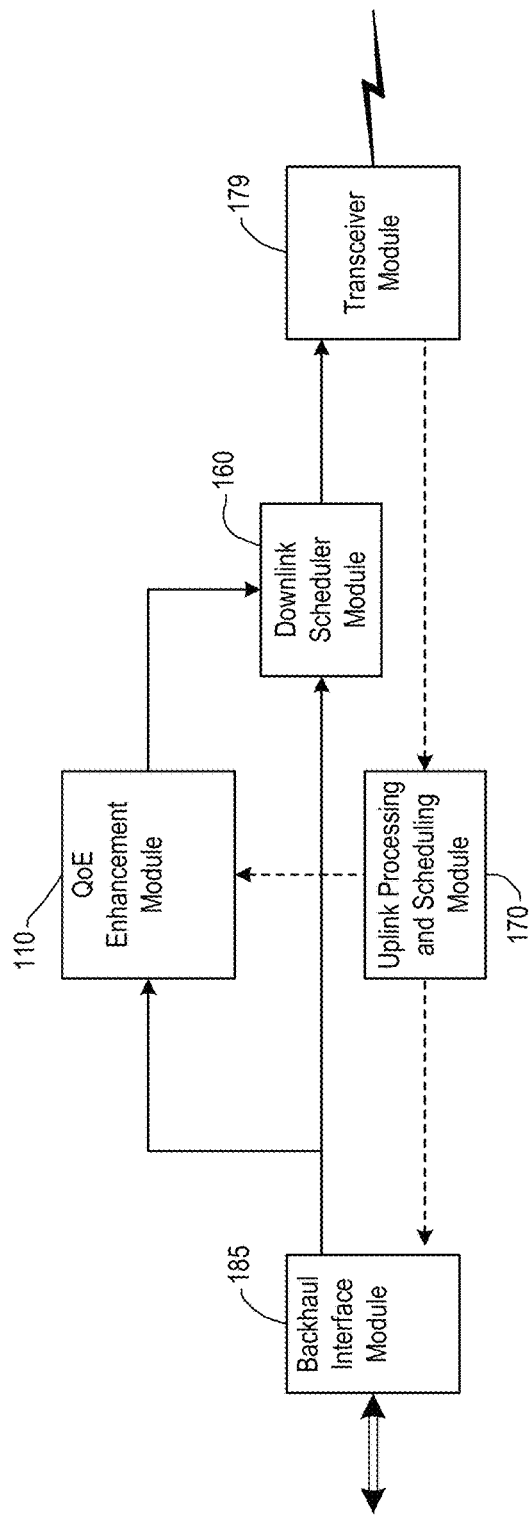
FIG. 1 is a block diagram of aspects of an access node in accordance with aspects of the invention.

FIG. 1 is a block diagram of aspects of an access node in accordance with aspects of the invention. The access node of FIG. 1 facilitates communication between terminal nodes (e.g., cellular phones, smart phones, mobile WiMAX subscriber stations, tablets, notebook and personal computers, and televisions) and devices in a service provider or core network and devices coupled to the network (e.g., devices accessed via the Internet such as video servers). The access node may be, for example, a mobile WiMAX base station, a global system for mobile (GSM) wireless base transceiver station (BTS), a Universal Mobile Telecommunications System (UMTS) NodeB, an LTE evolved Node B (eNB or eNodeB), a cable modem termination system, or other wireline or wireless access node of various form factors.

A terminal node may, for example, request video data from a video server with the access node receiving the request from the terminal node and relaying the request onward to the video server. Similarly, when the requested video data arrives at the access node, the access node transmits the video data to the terminal node. To aid in understanding, in FIG. 1, solid lines represent downlink data and dashed lines represent uplink data. The terms downlink and uplink refer to directions toward and away from a terminal node, respectively.

Video server generally refers to hardware, software, or a combination of hardware and software that provides video content. Video client generally refers to hardware, software, or a combination of hardware and software that receives video content from a video server. A video server, for example, can be a hypertext transfer protocol (HTTP) video streaming server, which stores video files and streams the video files to a video client upon requests from the video client following a particular HTTP video streaming protocol, for example, MPEG DASH (Dynamic Adaptive Streaming over HTTP). In another example, a video server can be a real time streaming protocol (RTSP) video streaming server, which stores video files and streams the video files to a video client upon requests from the video client following the RTSP/RTP protocol. In another example, a video server can be any device acting as a video source in a peer-to-peer video streaming application. In a content delivery network, often a cluster of computers serve the role of a video server.

The access node includes a transceiver module 179 for communication with terminal nodes. The transceiver module 179 includes modules appropriate for the methods used for communication with the terminal nodes. For example, in an embodiment of an LTE base station (eNodeB), the transceiver module 179 includes circuitry such as radio-frequency modulators, demodulators, amplifiers, and tuners.

The access node includes a backhaul interface module 185 for communication with other network nodes. For example, the backhaul interface module 185 may directly provide communication to a router or gateway device that can provide communication with still other network nodes and servers coupled to the network nodes. The backhaul interface module 185 includes modules appropriate for the methods used for communication with the other network nodes. For example, in an LTE base station embodiment that uses Ethernet backhaul, the backhaul interface module 185 may include a gigabit Ethernet transceiver.

Communications received via the transceiver module 179 may be transmitted from the access node via the backhaul interface module 185. Similarly, communications received via the backhaul interface module 185 may be transmitted from the access node via the transceiver module 179.

The access node includes a downlink scheduler module 160 for use in scheduling transmission of data received from the backhaul interface module to one or more terminal nodes via the transceiver module 179. The access node includes an uplink processing and scheduling module 170 for use in scheduling and processing transmissions from one or more terminal nodes received via the transceiver module 179 for transmission on the backhaul by the backhaul interface module 185. For clarity and brevity, some descriptions will describe communication with a single terminal node and a single uplink device. The access node will generally communicate with many terminal nodes and uplink devices concurrently.

The downlink scheduler module 160 receives packets from the backhaul interface module 185 and places the packets in one or more queues. The queues hold the packets until they are transmitted, discarded, or otherwise removed from the queues. The downlink scheduler module 160 may also include a scheduling control module that determines when packets are removed from the various queues for transmission. The scheduling control module can, for example, use a weighted round robin or a proportional fair queuing method with a scheduling parameter (e.g., a weight) associated with each of the queues. The uplink processing and scheduling module 170 may use a scheduling method similar to or the same as that used by the downlink scheduler module 160. Additionally, the uplink processing and scheduling module 170 may perform processing similar to the QoE enhancement module 110 for uplink traffic.

The access node includes a quality of experience (QoE) enhancement module 110. The QoE enhancement module 110 can be used to improve the QoE for users of terminal devices that communicate with the access node of FIG. 1.

The QoE enhancement module 110 receives downlink packets from the backhaul interface module 185. The QoE enhancement module 110 may also receive uplink packets or information about the uplink packets via the uplink processing and scheduling module 170 or the transceiver module 179.

The QoE enhancement module 110 can inspect packets to determine information about the contents of the packets. The information may be, for example, an application class and specific application associated with a packet. Further information about the applications may also be determined. For example, for video applications, the further information may include a video format, a bit rate, a video resolution, a player state, a frame rate, and playback status.

The QoE enhancement module 110 can evaluate congestion. Communication congestion can occur in many locations in a communication network. The QoE enhancement module 110 may, in particular, evaluate congestion affecting communication between the access node and terminal nodes. Congestion can occur when demand for communication exceeds capacity for communication. The QoE enhancement module 110 may use, for example, information about packet arrival rates, throughput delays, and resource utilization in congestion evaluation.

The QoE enhancement module 110 can use the packet information and congestion information in making control responses. For example, the QoE enhancement module 110 may supply scheduler parameters to the downlink scheduler module 160. The scheduler parameters can be set to modify QoE.

The QoE enhancement module 110, in addition to utilizing locally available information, such as queue occupancies, queuing delays, packet drop rates, and egress rates, can assess user QoE for applications at the terminal nodes. In an embodiment, the QoE enhancement module 110 may enhance QoE for applications with video delivery. Video data has characteristics that differ from characteristics of many other data, such as email or data used with web browsing. Video data, in particular, is consumed according to specific timing. If video data is not timely delivered to its destination, a video session playing back the video will freeze. In this case, impact on the Quality of Experience for the video session is much greater than what a similar delay may cause with other types of data. Thus the QoE enhancement module 110 may consider timing needs for video delivery.

As an example of operation of the QoE enhancement module 110, consider a video delivery application where the access node relays video data from a video server to a video client at a terminal node. The number and duration of video freezes can be used a measure of a user's quality of experience for video delivery. The video freezes occur when a video buffer at the client device is empty or lacks the complete data needed for decoding. The access node can estimate what data is in the client-side video buffer. The QoE enhancement module 110 may emulate operation of the client's behavior to estimate client-side video buffer occupancy. The buffer occupancy may also be referred to as the buffer occupancy level, buffer level, or buffer fullness. The QoE enhancement module 110 may use the estimated client-side video buffer occupancy to predict video freezes. Emulated aspects of the client's behavior may include estimating how much of the video has been decoded, that is, what is the decoding time. The decoding time corresponds to the position in a video stream where the client consumes (e.g., reads from a buffer) the video data. The decoding time is not necessarily the same as the presentation time (when the data is displayed) of the video data. The decoding time may also be referred to as the playback time since the decoding is often performed for playback. Uplink and downlink packets may be used for emulation. The contents of the packets and their timing can be used as well.

Although FIG. 1 illustrates single instances of each module, in an embodiment, there may be multiple instances of various modules. For example, the access node may include multiple backhaul interface modules. Similarly, the access node may include multiple transceiver modules. The multiple backhaul interface modules and transceiver modules may operate according to different protocols.

FIG. 1 illustrates an access node for a particular allocation of functions to various modules and a particular distribution of modules in various communication nodes. Many other arrangements may also be used. For example, all or parts of the QoE enhancement module 110 could be in a gateway node in a core network.

Figure 2:
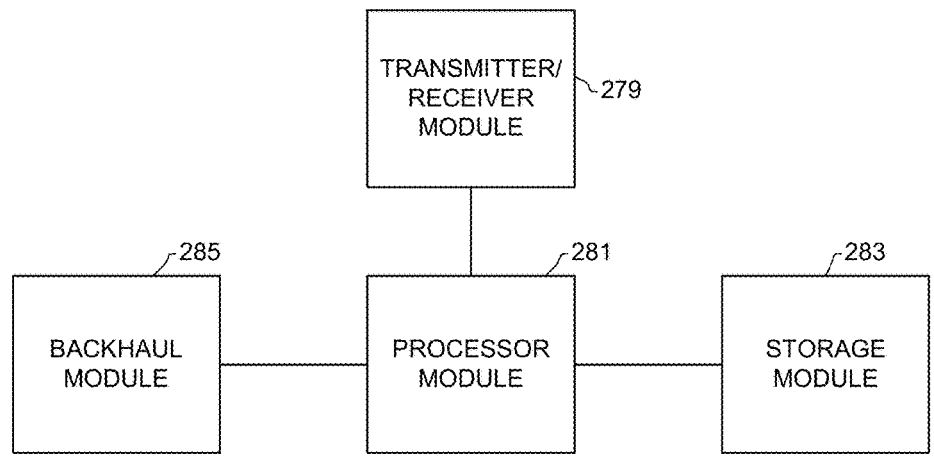
FIG. 2 is a functional block diagram of an access node in accordance with aspects of the invention.

FIG. 2 is a functional block diagram of an access node in accordance with aspects of the invention. The access node of FIG. 1 may be implemented, for example, using the access node of FIG. 2. In various embodiments, the access node of FIG. 2 may be a mobile WiMAX base station, a global system for mobile (GSM) wireless base transceiver station (BTS), a Universal Mobile Telecommunications System (UMTS) NodeB, an LTE or LTE Advanced evolved Node B (eNB or eNodeB), a cable modem head end, or other wireline or wireless access node of various form factors.

The access node includes a processor module 281. The processor module 281 is coupled to a transmitter-receiver (transceiver) module 279, a backhaul interface module 285, and a storage module 283.

The transmitter-receiver module 279 is configured to transmit and receive communications with other devices. In many embodiments, the communications are transmitted and received wirelessly. In such embodiments, the access node generally includes one or more antennas for transmission and reception of radio signals. In other embodiments, the communications are transmitted and received over physical connections such as wires or optical cables. The communications of the transmitter-receiver module 279 may be with terminal nodes.

The backhaul interface module 285 provides communication between the access node and a core network. The communication may be over a backhaul connection. Communications received via the transmitter-receiver module 279 may be transmitted, after processing, on the backhaul connection. Similarly, communication received from the backhaul connection may be transmitted by the transmitter-receiver module 279. Although the access node of FIG. 2 is shown with a single backhaul interface module 285, other embodiments of the access node may include multiple backhaul interface modules. Similarly, the access node may include multiple transmitter-receiver modules. The multiple backhaul interface modules and transmitter-receiver modules may operate according to different protocols.

The processor module 281 can process communications being received and transmitted by the access node. The storage module 283 stores data for use by the processor module 281. The storage module 283 may also be used to store computer readable instructions for execution by the processor module 281. The computer readable instructions can be used by the access node 275 for accomplishing the various functions of the access node. In an embodiment, the storage module 283 or parts of the storage module 283 may be a non-transitory machine readable medium. For concise explanation, the access node or embodiments of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

The access node may perform operations to enhance user quality of experience. For example, the access node may inspect and analyze packets related to video delivery to estimate occupancy of a video buffer in a client device and use the estimated occupancy in scheduling control responses. QoE enhancement may be a module provided, for example, by the processor module 281 using instructions from the storage module 283. Structures that are the same or similar to the access node of FIG. 2 may be used to implement network nodes generally and functions that are described as being performed by an access node may be performed by other network nodes. In such network node, the transmitter-receiver module 279 may be a first communication module that provides communications with downlink devices, for example, terminal nodes, and the backhaul interface module 285 may be a second communication module that provides communications with uplink devices, for example, video servers. The communications with the uplink and downlink devices may be through other network nodes.

Figure 3:
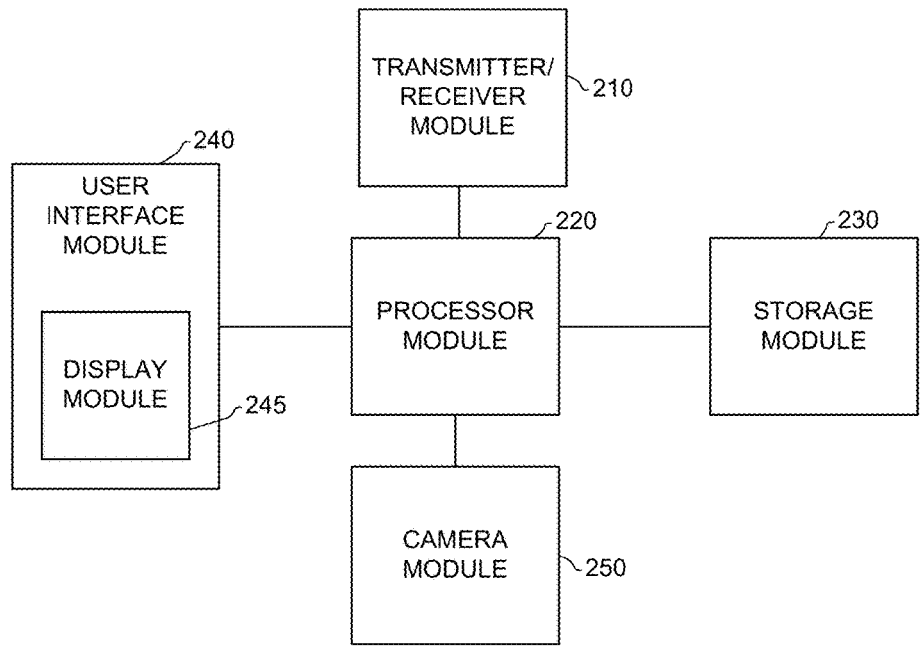
FIG. 3 is a block diagram of a terminal node in accordance with aspects of the invention.

FIG. 3 is a functional block diagram of a terminal node in accordance with aspects of the invention. The terminal node can be used for viewing streaming video. In various example embodiments, the terminal node may be a mobile device, for example, a smartphone or tablet or notebook computer. The terminal node includes a processor module 220. The processor module 220 is communicatively coupled to a transmitter-receiver module (transceiver) 210, a user interface module 240, a storage module 230, and a camera module 250. The processor module 220 may be a single processor, multiple processors, or a combination of one or more processors and additional logic such as application-specific integrated circuits (ASIC) or field programmable gate arrays (FPGA).

The transmitter-receiver module 210 is configured to transmit and receive communications with other devices. For example, the transmitter-receiver module 210 may communicate with a cellular or broadband base station such as an LTE evolved node B (eNodeB) or WiFi access point (AP). In example embodiments where the communications are wireless, the terminal node generally includes one or more antennae for transmission and reception of radio signals. In other example embodiments, the communications may be transmitted and received over physical connections such as wires or optical cables and the transmitter/receiver module 210 may be an Ethernet adapter or cable modem. Although the terminal node of FIG. 3 is shown with a single transmitter-receiver module 210, other example embodiments of the terminal node may include multiple transmitter-receiver modules. The multiple transmitter-receiver modules may operate according to different protocols.

The terminal node, in some example embodiments, provides data to and receives data from a person (user). Accordingly, the terminal node includes a user interface module 240. The user interface module 240 includes modules for communicating with a person. The user interface module 240, in an exemplary embodiment, may include a display module 245 for providing visual information to the user, including displaying video content. In some example embodiments, the display module 245 may include a touch screen which may be used in place of or in combination with a keypad connected to the user interface module 240. The touch screen may allow graphical selection of inputs in addition to alphanumeric inputs.

In an alternative example embodiment, the user interface module 240 may include a computer interface, for example, a universal serial bus (USB) interface, to interface the terminal node to a computer. For example, a wireless modem, such as a dongle, may be connected, by a wired connection or a wireless connection, to a notebook computer via the user interface module 240. Such a combination may be considered to be a terminal node. The user interface module 240 may have other configurations and include hardware and functionality such as speakers, microphones, vibrators, and lights.

The processor module 220 can process communications received and transmitted by the terminal node. The processor module 220 can also process inputs from and outputs to the user interface module 240 and the camera module 250. The storage module 230 may store data for use by the processor module 220, including images or metrics derived from images. The storage module 230 may also be used to store computer readable instructions for execution by the processor module 220. The computer readable instructions can be used by the terminal node for accomplishing the various functions of the terminal node. Storage module 230 can also store received content, such as video content that is received via transmitter/receiver module 210.

The storage module 230 may also be used to store photos and videos, such as those taken by the camera module 250. In an example embodiment, the storage module 230 or parts of the storage module 230 may be considered a non-transitory machine readable medium. In an example embodiment, storage module 230 may include a subscriber identity module (SIM) or machine identity module (MIM).

For concise explanation, the terminal node or example embodiments of it are described as having certain functionality. It will be appreciated that in some example embodiments, this functionality is accomplished by the processor module 220 in conjunction with the storage module 230, the transmitter-receiver module 210, the camera module 250, and the user interface module 240. Furthermore, in addition to executing instructions, the processor module 220 may include specific purpose hardware to accomplish some functions.

The camera module 250 can capture video and still photos as is common with a digital camera. The camera module 250 can display the video and still photos on the display module 245. The user interface module 240 may include a button which can be pushed to cause the camera module 250 to take a photo. Alternatively, if the display module 245 comprises a touch screen, the button may be a touch sensitive area of the touch screen of the display module 245.

The camera module 250 may pass video or photos to the processor module 220 for forwarding to the user interface module 240 and display on the display module 245. Alternatively, the camera module 250 may pass video or photos directly to the user interface module 240 for display on the display module 245.

Figure 4:
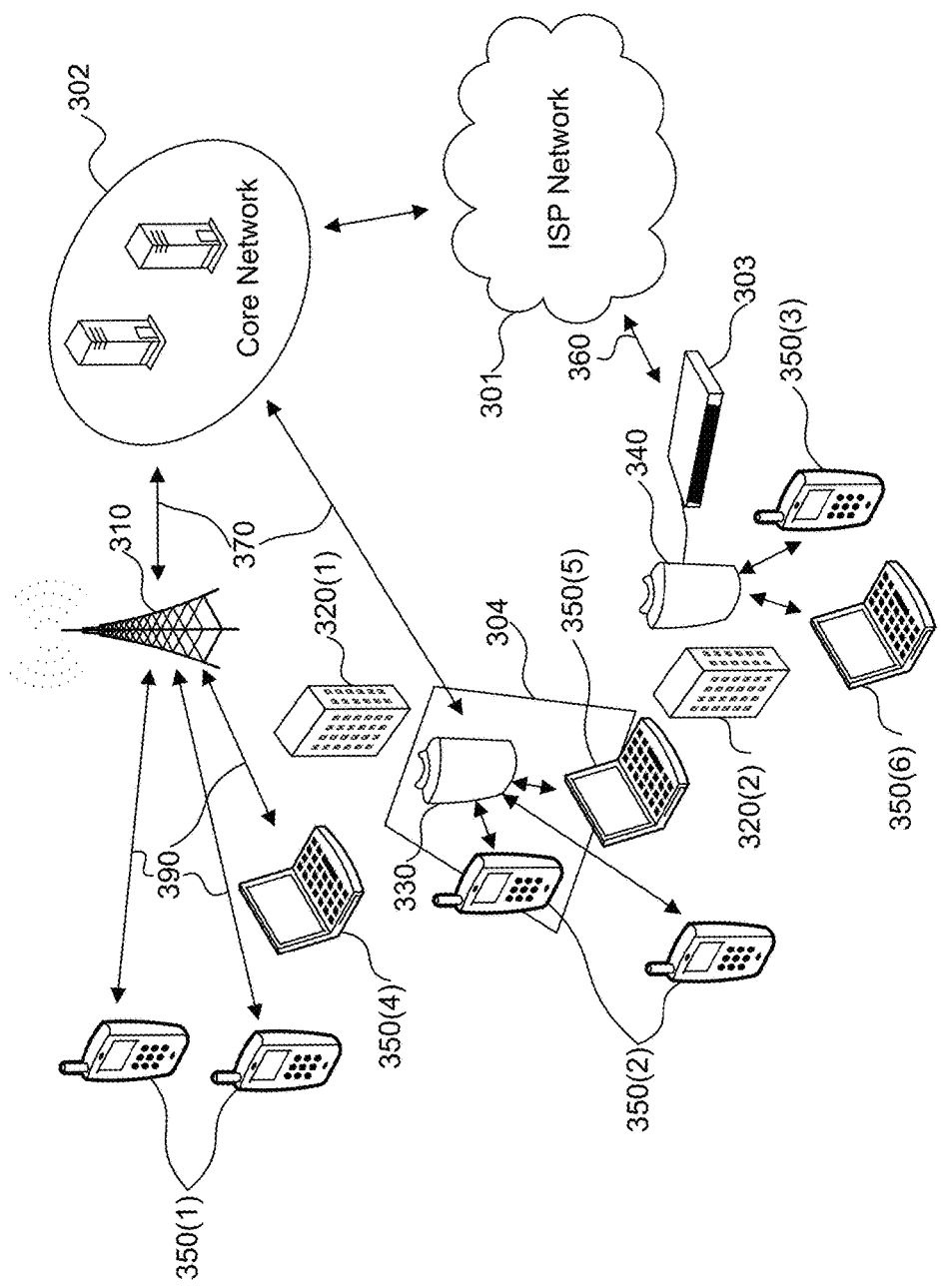
FIG. 4 is a block diagram of a communication network in which systems and methods can be implemented in accordance with aspects of the invention.

FIG. 4 is a block diagram of a communication network in which systems and methods disclosed herein can be implemented in accordance with aspects of the invention. A macro base station 310 is connected to a core network 302 through a backhaul connection 370. In an embodiment, the backhaul connection 370 is a bidirectional link or two unidirectional links. The direction from the core network 302 to the macro base station 310 is referred to as the downstream or downlink (DL) direction. The direction from the macro base station 310 to the core network 302 is referred to as the upstream or uplink (UL) direction.

Subscriber stations 350(1) and 350(4) can connect to the core network 302 through the macro base station 310. Wireless links 390 between subscriber stations 350 and the macro base station 310 are bidirectional point-to-multipoint links, in an embodiment. The direction of the wireless links 390 from the macro base station 310 to the subscriber stations 350 is referred to as the downlink or downstream direction. The direction of the wireless links 390 from the subscriber stations 350 to the macro base station 310 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 350 access content over the wireless links 390 using base stations, such as the macro base station 310, as a bridge. That is to say, the base stations generally pass user application data and any user application control messages between the subscriber stations 350 and the core network 302 without the base station being a destination for the data and control messages or a source of the messages.

In the network configuration illustrated in FIG. 4, an office building 320(1) causes a coverage shadow 304 which cannot be reached by the macro base station 310. A pico station 330 can provide coverage to subscriber stations 350(2) and 350(5) in the coverage shadow 304. The pico station 330 is connected to the core network 302 via a backhaul connection 370. The subscriber stations 350(2) and 350(5) may be connected to the pico station 330 via links that are similar to or the same as the wireless links 390 between subscriber stations 350(1) and 350(4) and the macro base station 310.

In an office building 320(2), an enterprise femtocell 340 provides in-building coverage to subscriber stations 350(3) and 350(6). The enterprise femtocell 340 can connect to the core network 302 via an internet service provider network 301 by utilizing a broadband connection 360 provided by an enterprise gateway 303. A similar arrangement of devices may be used in a residential environment.

The macro base station 310, the pico station 330, or the enterprise femtocell 340 of FIG. 4, in some embodiments, are implemented using the access node of FIG. 1 or the access node of FIG. 2. Similarly, the subscriber stations 350 may be implemented using the terminal node of FIG. 3.

Devices in the network of FIG. 4 (such as the macro base station 310, the pico station 330, the enterprise gateway 303, the enterprise femtocell 340, devices in the core network 302, and devices in the internet service provider network 301) may operate, individually or in combination, to enhance user quality of experience. For example, the devices may inspect and analyze packets related to video delivery to estimate occupancy of a video buffer in one of the subscriber stations 350 and use the estimated occupancy in scheduling control responses. The video buffer occupancy may, for example, be estimated in one device and communicated to a second device that uses the estimated video buffer occupancy for scheduling.

Figure 5:
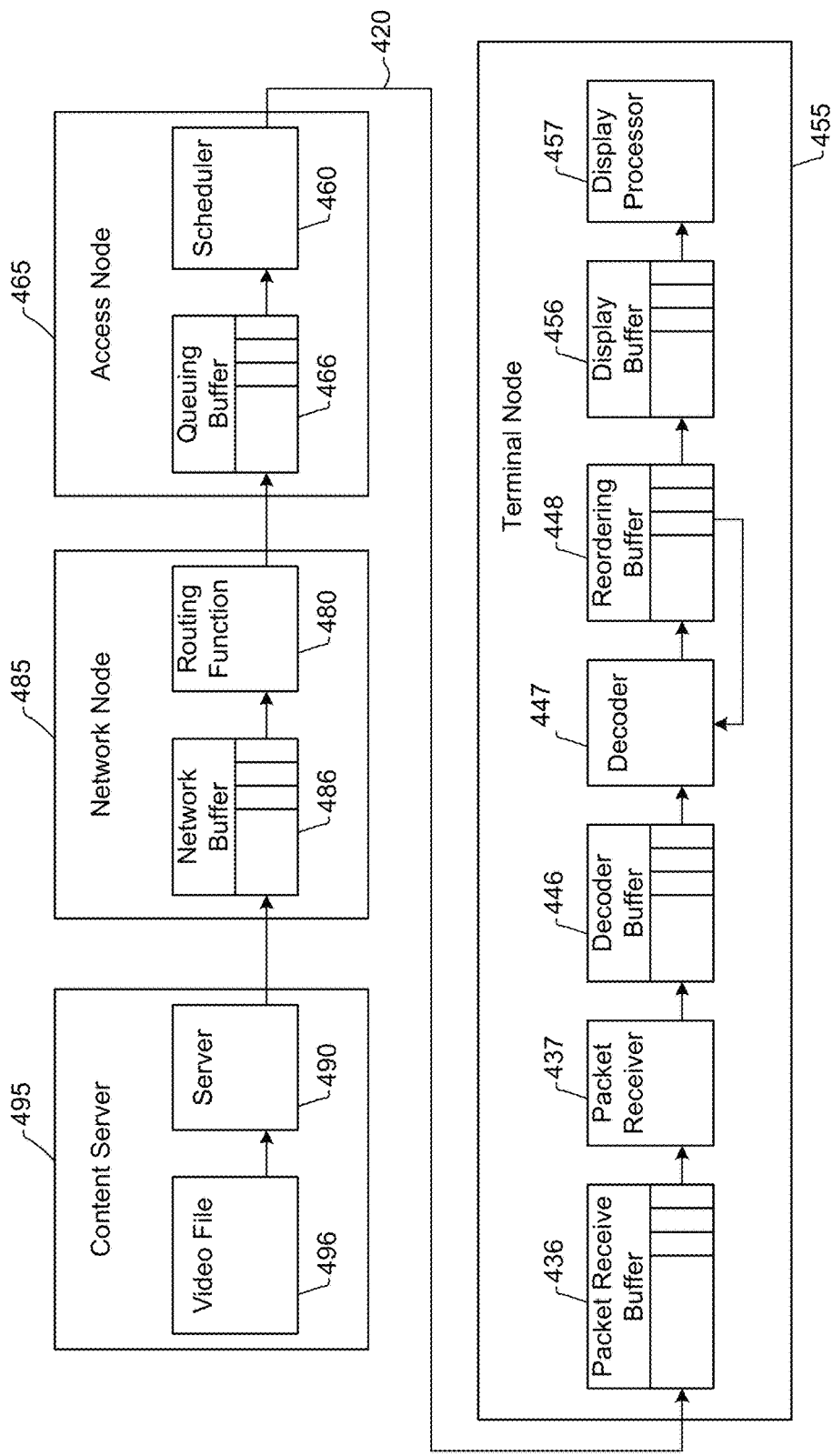
FIG. 5 is a diagram of video delivery in a communication network in accordance with aspects of the invention.

FIG. 5 is a diagram of video delivery in a communication system in accordance with aspects of the invention. Video is delivered from a content server 495 to a terminal node 455 via a network node 485 and an access node 465. The video data is generally delivered in a compressed format and decompressed at the terminal node 455. The video delivery illustrated in FIG. 5 can be performed in the communication network of FIG. 4 with the terminal node 455 of FIG. 5 corresponding to one of the subscriber stations 350 of FIG. 4, the access node 465 of FIG. 5 corresponding to the macro base station 310, the pico station 330, or the enterprise femtocell 340 of FIG. 4, the network node 485 of FIG. 5 corresponding to the enterprise gateway 303, a device in the core network 302, or a device in the internet service provider network 301 of FIG. 4, and the content server 495 of FIG. 5 corresponding to a device coupled to the core network 302 or the internet service provider network 301 of FIG. 4. The terminal node 455 may be termed a client according to its relationship to the content server 495. The content server 495 may include a network of separately located servers.

Various elements of the communication system may be the same or similar to like named elements described above. The communication system is illustrated in simplified form. For example, many communication systems will include many interconnected network nodes.

The terminal node 455 in the communication system shown in FIG. 5 communicates with the access node 465 over a radio link 420. The access node 465 is connected to the network node 485. The network node 485 provides access to the content server 495. A system may include intermediary devices between those shown. For example, a router node may provide connectivity to the Internet to which the content server 495 is also connected.

Buffering is used at many points in the video delivery. Buffering can smooth variable instantaneous communication rates to a longer-term average rate. The rate at which the video data can be communicated in a network can be highly variable. For example, communication to a given node in a multiple access network may vary from zero to a high rate depending on a current allocation of resources. Some communications may be intentionally bursty, for example, to save energy in battery powered nodes. Buffering can also smooth variable rate demands. The rate at which the video data needs to be supplied can also be highly variable. For example, in many video compression methods, the information for some frames (which usually correspond to equal time intervals) is represented with many more data bits than other frames. Buffering can help compensate for limited processing power and outgoing bandwidth at each node. Temporary storage in buffers can help avoid performance impacts from communication interruptions to the ingress of the buffer. For example, consider a buffer with a constant ingress and egress rate of 1 megabit per second (Mbps). If the buffer contains 1 megabit of stored data, then a communication interruption on the ingress may occur for up to 1 second without impacting data transmitted on the egress. The content server 495 delivers video from a video file 496. The video file 496 may be stored, for example, on a networked storage array. Based upon a client request, a server 490 reads video data from the video file 496 and transmits the data toward the terminal node 455. Alternatively, the delivered video may be dynamically generated while it is being requested. For example the delivered video may be of a live event. For another example, the delivered video may be dynamically generated from a static file based on particular user requirements, such as video resolution, video frame rate, or video data rate.

The network node 485 buffers video data from the content server 495 in a network buffer 486. The network buffer 486 stores the video data until a routing function 480 can transmit the data to the access node 465. The network node 485 may be connected to many additional devices. Delay in transmitting the video data from the network buffer 486 can vary, for example, with network traffic between the network node 485 and the additional devices.

The access node 465 buffers the video data received from the network node 485 in a queuing buffer 466. A scheduler module 460 selects data from the queuing buffer 466 to transmit to the terminal node 455. The access node 465 may select the data to transmit in order to enhance quality of experience of users for which the access node 465 provides communications. For example, the access node 465 may use client-side buffer occupancy information to improve quality of experience for a user of the terminal node 455. In addition to using buffer occupancy information for scheduling, the information may also be used, for example, in admission control and system administration.

The terminal node 455, as illustrated in FIG. 5, includes multiple buffers for the video stream. The buffer may, in an embodiment, be located in shared memory. A packet receive buffer 436 stores data packets containing video data as it is received at the terminal node 455. A packet receiver module 437 manages the packet receive buffer 436. Specific functions performed by the packet receiver module 437 and packet receive buffer 436 may vary with particular protocols used to deliver the video data. For example, when real-time transport protocol (RTP) and user datagram protocol (UDP) are used as the transport technology, the packet receiver module 437 and the packet receive buffer 436 can provide RTP dejitter functionality to compensate for the variation in the delay of packets. When transmission control protocol (TCP) is used as the transport technology, the packet receiver module 437 and packet receive buffer 436 may perform TCP functions including the processing of out-of-order packets, missing packets, and duplicate packets. For example, the packet receiver module 437 can delay delivering a packet to the subsequent stage if any packet with a smaller sequence number has not been delivered.

The video decoding, for example, decompressing video data in an MPEG-4 AVC format, is performed by a decoder module 447. The decoder module 447 uses a decoder buffer 446 and a reordering buffer 448. Video data in the decoder buffer 446 is in a compressed format. Video data in the reordering buffer 448 is in a decompressed format, for example, raster data. Video data in a decompressed format may be referred to as reconstructed video. A group of decoded or uncompressed video data which can be displayed as a single, human-viewable image is termed a video frame. A video sample is the compressed or encoded form of a video frame.

The decoder module 447 stores video data in the decoder buffer 446 to assure that there is sufficient data available for decoding. The decoder buffer 446 may be referred to as a bitstream buffer. The decoder buffer 446 may compensate for the highly variable bit rate associated with video. The decoder buffer 446 may also store additional data if the data arrives at the terminal node 455 faster than necessary for operation of the decoder module 447. The additional data may be used in compensating for fluctuation in the network bandwidth. For example, even if the network bandwidth falls below what is needed for transporting a video stream for a certain duration, there may be sufficient data in the decoder buffer 446 to supply data to the decoder module 447 until the network bandwidth recovers.

The decoder module 447 stores decoded frames of video in the reordering buffer 448. Many video compression methods include some frames that are decoded based on data in subsequent (in display order) frames. Accordingly, the reordering buffer 448 provides temporary storage for frames that are processed out of order (not in the sequence that frames will be displayed).

Decoded video frames are supplied from the reordering buffer 448 to a display buffer 456. A display processor 457 reads the frames from the display buffer 456, performs necessary processing, and supplies appropriate signals to a display, for example, a liquid crystal display. The display buffer 456, in an embodiment, stores all or parts of two frames—the current frame being displayed and the next frame to be displayed. In many embodiments, the display buffer 456 and the reordering buffer 448 are stored in a shared memory.

The value of the video data delivered to the terminal node 455 is time sensitive. That is, if a piece of the data is not available when needed, its value diminishes. For example, if a video frame is not available when it is to be displayed, the terminal node 455 may skip that frame or pause until it is delivered. In either case the terminal node 455 may continue to display ("freeze") the previous frame until a new frame is available. Video data will not be available at a stage in the video delivery if the associated buffer is empty (underflow). The effect of buffer underflow may vary with the point at which it occurs and with the communication protocols used to convey the data.

If one of the buffers at the terminal node 455 underflows, the video playback may eventually freeze. For example, if the packet receive buffer 436 is empty, it will not be able to supply further data for the decoder buffer 446; if the decoder buffer 446 is empty, it will not be able to supply further data to the decoder module 447 that will be placed in the reordering buffer 448; if the reordering buffer 448 is empty, it will not be able to supply further data to the display buffer 456 and the display processor 457 will freeze the display because a new frame will not be available.

If a buffer in the network node 485 or the access node 465 underflows, a video freeze at the terminal node 455 does not necessarily follow. For example, if the network buffer 486 underflows it means that the network node 485 was able to deliver packets before a subsequent packet arrives. This may only indicate that the network node 485 is not congested, not necessarily that packets are being delivered late.

The buffers could also overflow. Buffer overflow in the network node 485 or the access node 465 will result in packet loss. The effect of buffer overflow may vary with the point at which it occurs and with the communication protocols used to convey the data. For UDP based communication, packet loss will eventually be seen by the client as video quality degradation. For TCP based communication, any lost packets containing a TCP segment will be retransmitted so the packet loss results in lower throughput and longer latency. This may lead to a freeze if the retransmitted packet is not received by the client in time.

If one of the buffers in the terminal node 455 overflows, video data will be lost. This may happen when the client application cannot process data fast enough. Data lost due to buffer overflow in the terminal node 455 can also result in video quality degradation. Video clients are generally designed to stop feeding data to a buffer once the buffer occupancy reaches some limit. Since decompressed video data occupies much more space than compressed video data, buffers that store decompressed data (such as the reordering buffer 448 and the display buffer 456) are usually kept as small as possible while sufficient for normal operations. Any unconsumed video data are often stored in compressed format in the decoder buffer 446 after the video data have gone through any processing by the packet receiver module 437.

The decoder module 447 fetches the data from the decoder buffer 446 according to the decoding time of the video data. The decoding time of a particular frame may be called a decoding timestamp (DTS). The DTS may also be referred to as the value of a DTS field. If the video data for a frame arrives after its DTS, the decoder module 447 may not be able to generate a new video frame on time, and this may eventually lead to a video freeze. If the decoder buffer 446 cannot accept any data, the client will stop requesting data from the server.

The occupancies of the various buffers are interrelated. For example, congestion at a point can cause the buffers that are before that point in the video delivery to overflow and cause the buffers that are after that point in the video delivery to underflow. For example, buffer overflow in the access node 465 and buffer underflow in the terminal node 455 can both occur when the communication network cannot transfer data fast enough to the video player on terminal node 455.

Detecting when the video freezes locally in the terminal node 455 may not be particularly difficult. For example, the video player providing the playback will have the necessary information related to video freezes. However, detecting video freeze events occurring in the client from a remote network node, such as the access node 465, is difficult. The methods and systems described herein can be used to estimate the occupancy of buffers in the terminal node 455. Information about the occupancy of the buffers can be used to predict freeze events. Information about the freeze events can be used to enhance quality of experience for uses of the communication network. For example, the access node 465 may use the information in determining scheduling priorities.

A communication system could schedule video data with a high priority to avoid video freezes. This may not be practical. Additionally, a network node may deliver multiple video streams simultaneously and may need to prioritize between video streams. Video data is a major component of mobile traffic and is likely to become even more prevalent in the future. Always transporting video ahead of other traffic may also be unnecessary and may unduly impact the quality experience for other services. Additionally, delivering excessive amounts of video data can result in wasted bandwidth. For example, if the user decides to terminate the video playback session before all of the downloaded video data are consumed.

Communication networks use layers of protocols to abstract the functions of one layer from those provided by another layer. Abstraction of layers can allow greater portability of applications to different networks. Initiation and subsequent termination of flows of packets in a network may be triggered by particular applications or services. A flow of control and user data packets relating to the use of an end-user application or service is termed a session.

Networked servers, such as content servers or proxy servers, and terminal nodes, such as smart phones, tablets, or laptop computers, may initiate or participate in a session. Networked servers and terminal nodes may host one or more sessions simultaneously. The sessions may be independent from one another or related to each other. A session may be established between two nodes, for example, between a video server and a video client at a terminal node. Alternatively, a session may be established between a video client and multiple video servers. For example, a video client may interact with a cluster of computers acting as a virtual server. Sessions may also be between one node and many nodes through the use of, for example, multicast and broadcast packet protocols.

Sessions may be characterized or categorized by various criteria. One criterion may be a specific application that was initiated by the user and responsible for launching the session. Another criterion may be an application class that describes an overall function served by a particular session.

A session may consist of one or more independent data streams using the same or potentially different underlying connections. The data streams may use, for example, one or more user datagram protocol (UDP) connections or transmission control protocol (TCP) connections.

Aspects of the video delivery of FIG. 5 may vary with the particular protocols used. For example, the video delivery may use hypertext transfer protocol (HTTP) progressive download or HTTP streaming. For HTTP progressive download, a single file is downloaded and played. HTTP is based on TCP, so in-order and reliable delivery of video data is guaranteed. Quality degradation of a progressive download video session caused by network congestion can be due to video freezes when the video data is not delivered on time. Thus, the impact of video freezes can be considered when modifying scheduler parameters to enhance quality of experience for HTTP progressive download. To provide specific examples, many systems and methods are described herein with reference to HTTP; however, the systems and methods can generally be implement using any suitable application layer protocol.

For HTTP adaptive streaming, a method to enhance quality of experience can consider video freezes when modifying scheduler parameters. Additionally, for HTTP adaptive streaming, the client may detect that available bandwidth is either larger or smaller than the data rate of the video bitstream currently being transported. Accordingly, the client may choose to switch to another video bitstream with a data rate that better matches the available bandwidth.

Video compression takes advantage of the spatial redundancy within video frames, as well as the temporal redundancy between different video frames. Because of the difference between video frames, compressed frame sizes can be very different from frame to frame. For implementation considerations, the video bit rate fluctuation can be quantified. Video buffer models, such as the Video Buffering Verifier (VBV) buffer model and the Generalized Hypothetical Reference Decoder (HRD) buffer model were developed for that purpose.

VBV is a hypothetical decoder defined in MPEG-2 and in MPEG-4 part 2 and is conceptually connected to the output of an encoder to monitor the characteristics of the bitstream generated by an encoder. The model tells how much buffer occupancy fluctuation the decoder should expect if the data transfer rate is equal to a certain value, for example, the average bit rate of video stream.

Each VBV buffer model includes two parameters, a data rate R and a buffer size B. In addition, a VBV delay $\tau(n)$ can specify the latency from the time that the first bit of compressed data of a frame is received in the buffer to the time when a frame is removed from the buffer and decoded. If the data rate R is steady and the decoder removes the nth compressed frame from the buffer according to VBV delay $\tau(n)$, a buffer of size B should never overflow, and the buffer also does not underflow. Another parameter related to the decoder operation is initial buffer delay. This is the time needed to receive the bitstream's global syntax information and the VBV delay of the first frame. For example, the global syntax information may include information such as sequence header and group of picture header in MPEG-2.

An issue with using the VBV buffer model is that the decoder does not operate optimally if it receives data at a rate that differs from the VBV data rate. For example, if the network is able to transfer data at a rate higher than VBV data rate, generally the initial buffer delay may be reduced. If the decoder still operates based on the original initial buffer delay, which may be calculated based on a much lower rate, the initial buffer delay will be unnecessarily long for a network having higher bandwidth.

A Generalized Hypothetical Reference Decoder (HRD) model was developed to address this issue. Instead of sending one set of buffer parameters as in VBV buffer model, the HRD model can include buffer parameters for multiple buffer models. Each buffer model provides an optimal buffer size and initial buffer delay for a given data rate. For a network bandwidth that does not fall exactly on one of the data rates specified in the HRD model, a buffer size and initial buffer delay can be interpolated from the buffer models for similar data rates.

A video decoder should minimally have a buffer whose size is equal to the size of video stream buffer specified in the buffer model. The video stream buffer size may be explicitly specified in a bitstream. Alternatively, the video stream buffer size may be derived from the maximum video stream buffer size for a profile and level that the bitstream conforms to.

Each video coding standard can define the maximum video stream buffer size and maximum bit rate for a bitstream conforming to a certain profile at certain level. A profile specifies a collection of coding features and constraints that a bitstream needs to be compliant with. A level specifies limits on coding parameters, such as the frame size, frame rate, and buffer size. In H.264/AVC, for example, the sequence parameter set contains the profile and level that the bitstream conforms to. For level 4.1 (Blue-ray DVD), the standard specifies the maximum Coded Picture Buffer (CPB) (the video stream buffer in H.264) is 62.5 megabits.

Figure 6:
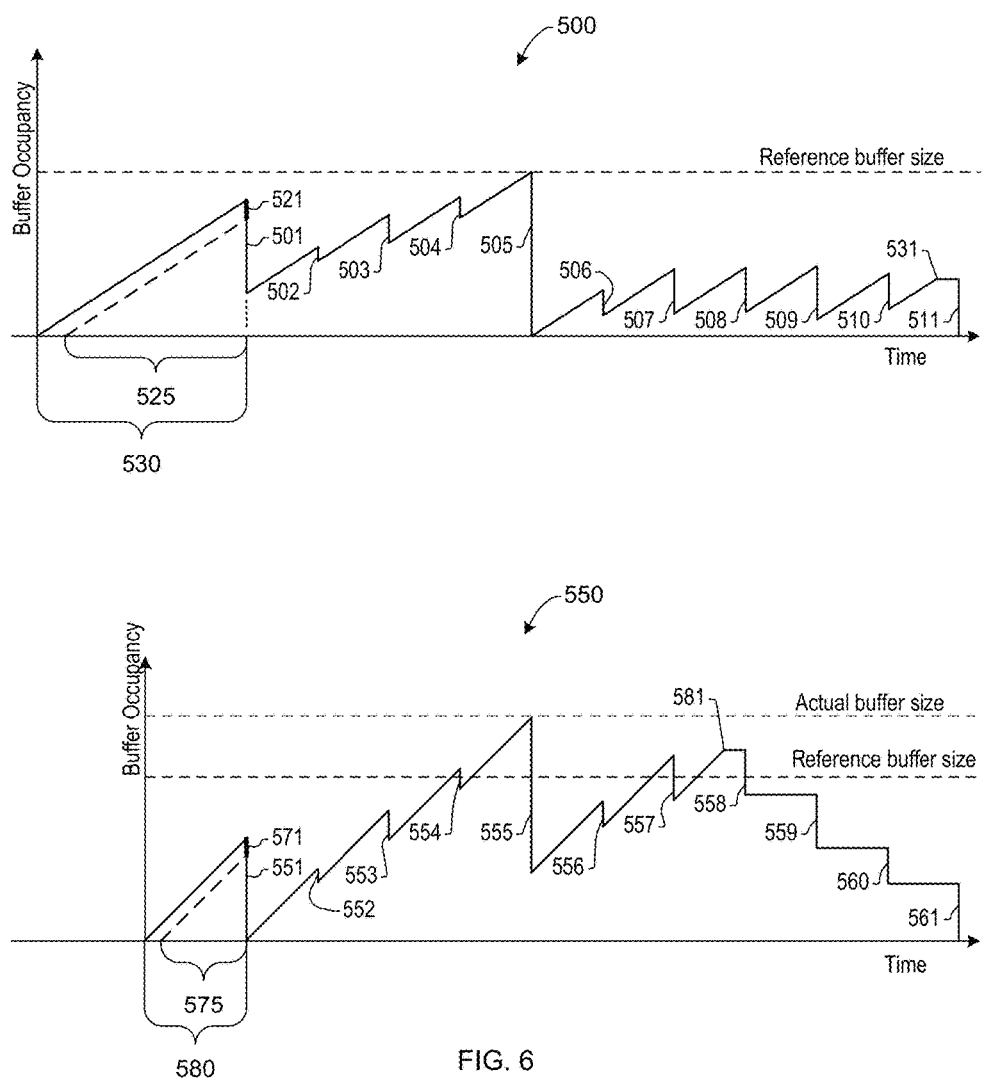
FIG. 6 shows example graphs of video buffer occupancy versus time illustrating aspects of the invention.

FIG. 6 shows example graphs of video buffer occupancy versus time illustrating aspects of the invention. A first graph 500, illustrates video buffer occupancy when data is transferred to a client at a rate equal to the average bit rate of the video. A second graph 550 illustrates video buffer occupancy when data is transferred to a client at a rate greater than the average bit rate of the video. Both examples illustrate cases where the video buffers do not underflow or overflow.

The graphs illustrate constant-rate delivery of the video data to the client. Thus the buffer occupancy ramps up as video data is received by the client. Consistent with the typical hypothetical decoder model, frames are removed from the buffer instantaneously in the graphs of FIG. 6. The video frames are removed at time positions (times 501-511 in the first graph 500 and times 551-561 in the second graph 550) according to their DTSs. Each time a video frame is removed from the buffer, the buffer occupancy steps down. The sizes of the steps vary with the amounts of data in the compressed video frames. For the first frame, additional information 521 in the first graph 500 or additional information 571 in the second graph 550 is required for decoding the first frame and is also removed from the bitstream buffer. The additional information 521, 571 may be, for example, metadata or global syntax information for use in decoding the video frames. In the example of the first graph 500, the first frame at time 501 is an intra-coded frame (I-frame) with a relatively large amount of data and the second, third, and fourth frames at times 502-504 are P-frames, which are predictively encoded, with a smaller amount of data.

The video client will not begin decoding and playing back the video immediately when the first video data is received. The decoding and playback will begin after an initial time latency 530 in the first graph 500, or 580 in the second graph 550. The initial time latency 530, 580 is often called initial buffer delay, T. The initial time latency includes the time spent transferring the additional information 521, 571 and the buffer delay of the first video frame (the buffer delay of the first video frame is shown as time period 525 in the first graph 500 and time period 575 in the second graph 550). The initial buffer delay, T, may be calculated using, for example, the VBV buffer delay of the first frame in the VBV model or the CPB removal delay of the first frame in the H.264 HRD model. An initial buffer occupancy, F, can be calculated from the initial buffer delay and the data rate, R, as $F=T\times R$.

In the first graph 500 of video buffer occupancy versus time where the rate at which data is transferred to the client is equal to the average bit rate of the video, the end of the data transfer 531 occurs near the end of the playback. The buffer size required is referred to as reference buffer size, for example, the VBV buffer size in MPEG-2.

In the second graph 550 of video buffer occupancy versus time where the rate at which data is transferred to the client is greater than the average bit rate of the video, the end of the data transfer 581 occurs substantially before the end of the playback. The actual buffer size used in the second example is also greater than the reference buffer size. Transfer of data to the client faster than the average bit rate of the video may occur, for example, when HTTP progressive download is used. It may also occur in video applications using other video transport protocols, such as HTTP video streaming, in order to store additional data to compensate for the fluctuation in network bandwidth.

When the transfer of data to the client is faster than the average bit rate of the video, the client may need a large buffer to store the data. Although the buffer does not underflow in this situation, the buffer could overflow. This can lead to communication inefficiency for retransmissions of data that could not be buffered.

In many communication systems, the data transfer rate will not be constant. Even when the average data transfer rate is higher than the average bit rate of the video, the instantaneous data transfer rate may fall below the average bit rate of the video. This could cause buffer underflow. A method to avoid buffer underflow is to increase the initial buffer delay and the buffer size. These methods may be inconvenient for the user and costly to implement.

Figure 7:
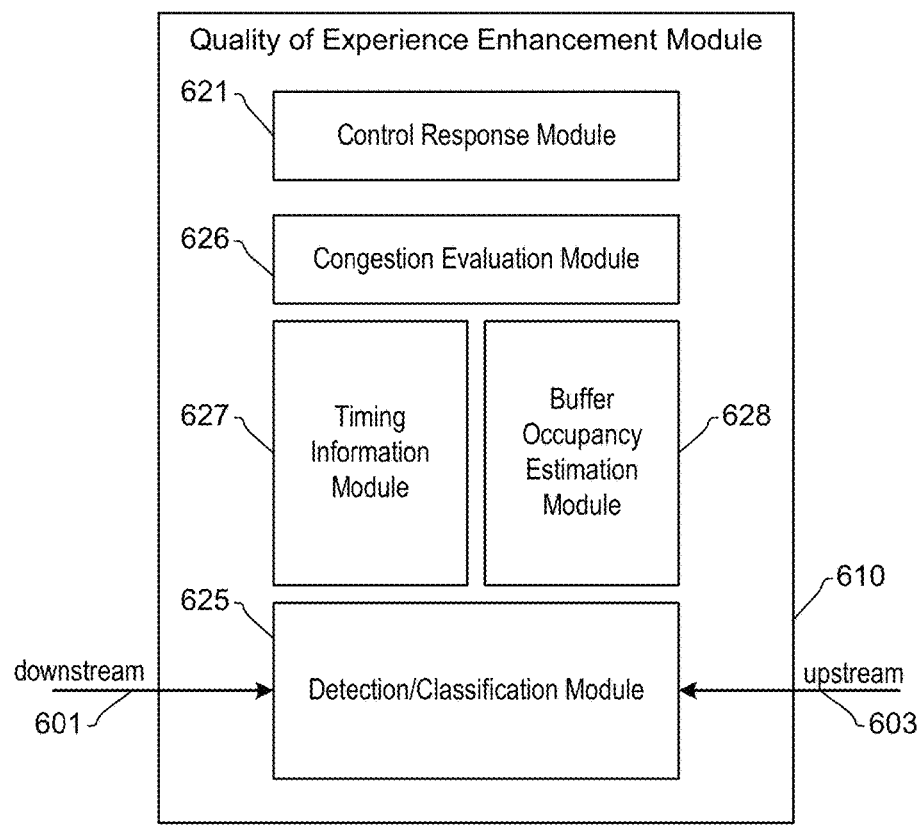
FIG. 7 is a block diagram of a quality of experience enhancement module in accordance with aspects of the invention.

FIG. 7 is a block diagram of a quality of experience (QoE) enhancement module 610 in accordance with aspects of the invention. The QoE enhancement module 110 of the access node of FIG. 1 may, for example, be provided by the QoE enhancement module 610 of FIG. 7.

The QoE enhancement module 610 can analyze downstream packets 601 and upstream packets 603 in a communication node. Based on the analysis, the QoE enhancement module 610 can estimate the video client buffer occupancy of a video session playing in a terminal node and may determine control responses to enhance QoE. For explanatory purposes, operation of the QoE enhancement module 610 at a wireless access node for video delivery will be described in detail. The QoE enhancement module 610 is, however, applicable to other network nodes and may enhance QoE for other services.

To enhance QoE for video delivery, the QoE enhancement module 610 can predict events that impact the video quality experienced by a user of a client device receiving the video. The video quality can be based on video freeze events. Since video freeze events are correlated with buffer occupancy in the client device, the QoE enhancement module 610 can use buffer occupancy information to enhance QoE. The QoE enhancement module 610 can use information about the estimated current playback time at the client and information about what video data has been delivered to the client to estimate buffer occupancy.

The QoE enhancement module 610 includes a detection/classification module 625. The detection/classification module 625 analyzes downstream and upstream packets to detect characteristics of the packets and classify the packets using the detected characteristics. For example, the detection/classification module 625 may characterize the packets by application class and specific application. Systems and methods for detecting characteristics of packets are described in U.S. patent application Ser. No. 13/607,559, filed Sep. 7, 2012 and titled "Systems and Methods for Congestion Detection for use in Prioritizing and Scheduling Packets in a Communication Network," which is hereby incorporated by reference. The detection/classification module 625 may identify some packets for further analysis by other modules. The detection/classification module 625 may, for example, detect packets associated with a particular video stream and pass those packets to a timing information module 627.

The timing information module 627 analyzes packets associated with a video delivery to determine video-related timing information. The timing information module 627 detects various types of timing information. One type of timing information includes parameters associated with the video, such as video buffer model parameters and locations of video samples. Another type of timing information is the time when each video sample should be removed from the client-side video stream buffer and decoded (which may be referred to as the decoding timestamp). The timing information module 627 can also estimate the time when various packets are delivered to the client. The timing information module 627 may also detect information about the playback state of the client, such as pauses. Using the information detected by the timing information module 627, a client-side video stream buffer emulator can be constructed to mimic how the client consumes the video data.

Video buffer model parameters are defined at various syntax levels. For example, an H.264 video bitstream may use a generalized hypothetical reference decoder (HRD) buffer model with parameters specified in an HRD Parameters section in the video usability information (VUI) and in a Buffering Period section in the supplemental enhancement information (SEI). Similar parameters may also be specified in the container file format. For example, the progressive download information (pdin) box in ISO (International Organization for Standardization) Base Media File Format (BMFF) specifies multiple pairs of data rate and initial buffer delay. When similar information is presented in the container file level, information at the elementary stream level may be ignored.

A video sample in a container file format is one video frame. The time when a compressed frame should be removed from the video stream buffer and decoded is specified at various syntax levels. For example, an H.264 video bitstream has picture timing SEI that specifies "cpb_removal_delay" to indicate when a compressed video frame (an access unit) needs to be removed from the decoder video stream buffer (Coded Picture Buffer or CPB in H.264 terminology). Similar parameters may also be specified in the container file format. When similar information is presented in the container file level, information at the elementary stream level may be ignored.

The timing information module 627 can estimate what video information has been delivered to the client in various ways. In particular, estimates of client-side buffer occupancy can use information about DTSs of the video samples delivered to the client.

The timing information module 627 may count the video data bytes that are transmitted to the client to estimate the DTS of the most recent video sample transmitted to the client. The DTS of the most recent video sample transmitted to the client can be estimated by dividing the number of bytes transmitted by the average video bitrate. This will be somewhat inaccurate as the instantaneous and average video bit rates differ.

The timing information module 627 can more accurately determine what video samples have been delivered to the client and their corresponding DTSs by decoding the relationship between bytes transmitted, video sample size, and the DTS of each video sample. For example, the timing information module 627 can parse the video metadata to establish a table that can be used to map byte counts to the video samples and the corresponding DTSs of the video samples.

In an access node that handles numerous data connections and simultaneous video streaming sessions, counting the bytes in a video stream may be impractical. For example, performing TCP segment processing (i.e., the handling of out-of-order, lost, and duplicate packets) on all Internet protocol (IP) packets containing TCP segments and parsing the container file metadata may be too costly. Control response decisions, such as scheduling parameters, may not need to change very frequently. Multiple optimization techniques for determining the video sample DTS can be used by the timing information module 627 to take advantage of infrequent control parameter changes.

One optimization is to parse the metadata asynchronously. The QoE enhancement module 610 can store the metadata in a local buffer and parse the metadata in a low priority thread. Before the metadata is parsed, no scheduling decisions that require information from the metadata can be applied. This may be handled by, for example, initially setting the priority of new video sessions to a high value until the metadata is processed. After the metadata is processed, the information can be used in congestion control.

Another optimization is to perform TCP segment processing only on packets containing the metadata and not on the packets containing actual media data (e.g., data in an ISO BMFF mdat box). Similarly, if the video stream is encrypted, the decryption of data may be performed only on the packets containing the metadata and not on the packets containing actual media data. The amount of video data transferred can be more efficiently calculated. The QoE enhancement module 610 may check TCP sequence numbers of the video packets to calculate the amount of video data transferred. The difference between the TCP sequence number of the initial video packet and the TCP sequence number of the most recently transmitted video packet and the payload length of the most recently transmitted video packet can be used to calculate the amount of data transferred. For example, if the TCP sequence number of the initial video packet is $S_0$, the TCP sequence number of the most recently transmitted video packet n is $S_n$, and the payload length of the video packet n is $L_n$, the amount of video data transmitted can be estimated as $V_n=(S_n-S_0)+L_n$. The sequence number in a TCP segment is a 32-bit number, and it will wrap around. Every time a TCP sequence number wrap around happens, 4294967296, which is ($2^{32}$), needs to be added to $V_n$ to get the estimated amount of video data transmitted. In one embodiment, TCP segment reordering issues are ignored. The sequence number of the most recently transmitted video packet is always used even if some video packets before the most recently transmitted video packet are lost. In another embodiment, the TCP sequence numbers are processed so only the sequence number of a TCP segment for which there are no earlier TCP segments missing is used in estimating the amount of video data transmitted.

Alternatively or additionally, the QoE enhancement module 610 may check the acknowledgment number of the TCP segments in the upstream packets 603 for the same TCP connection. The difference between the acknowledgment number in the most recent TCP segment in the upstream packets and the acknowledgment number in the initial TCP segment in the upstream packets can be used to calculate the amount of data transferred in the downstream direction for the same connection. Checking the acknowledgment number of the TCP segments in the upstream packets can be very efficient as the volume of data for the upstream packets 603 can be much less than the volume of data for the downstream packets 601. Thus, the processing effort needed to detect and parse TCP segments in the upstream packets can be much lower than for the downstream packets. Furthermore, the acknowledgment number of a TCP segment in an upstream packet is representative of the data transferred successfully to the client. Impairments, such as packet loss, are thus accounted for when acknowledgment numbers are used. Accuracy of buffer occupancy estimates may thereby be improved. For example, in a TCP connection for transmitting video packets, the first TCP ACK from the client to the server, which acknowledges the receiving of the TCP segment "SYN+ACK" from the server, has the initial acknowledgment number $AN_0$. If another TCP ACK m is received in the upstream packet, and it has acknowledgment number equal to $AN_m$, it can be known that the amount of the data that has been received successfully by the client is $V_m'=AN_m-AN_0$. The acknowledgment number in a TCP segment is a 32-bit number, and it will wrap around. Every time a TCP acknowledgment number wraps around, 4294967296, which is ($2^{32}$), needs to be added to $V_m'$ to get the estimated amount of video data transmitted. TCP ACKs may be detected and processed, for example, by the uplink processing and scheduling module 170.

The QoE enhancement module 610 includes a buffer occupancy estimation module 628. The buffer occupancy estimation module 628 estimates client-side video buffer occupancy using information from the timing information module 627. The buffer occupancy estimation module 628 can operate a client video stream buffer emulator. The emulator mimics the expected behavior of video playback on the client. The emulator may operate differently for different clients. For example, one client may follow the information contained within the video data to decide how to manage the initial buffering period. Another client may decide to buffer 15 seconds worth of video data before it starts decoding and playback regardless what is suggested in the video data. The type of client may be signaled in the request message sent from the client to the server. In one embodiment, the timing information module 627 stores the behavior of well-known clients. The timing information module 627 may detect the client type by inspecting the messages sent from the client to the server and apply the client behavior in the operation of the emulator.

Figure 8:
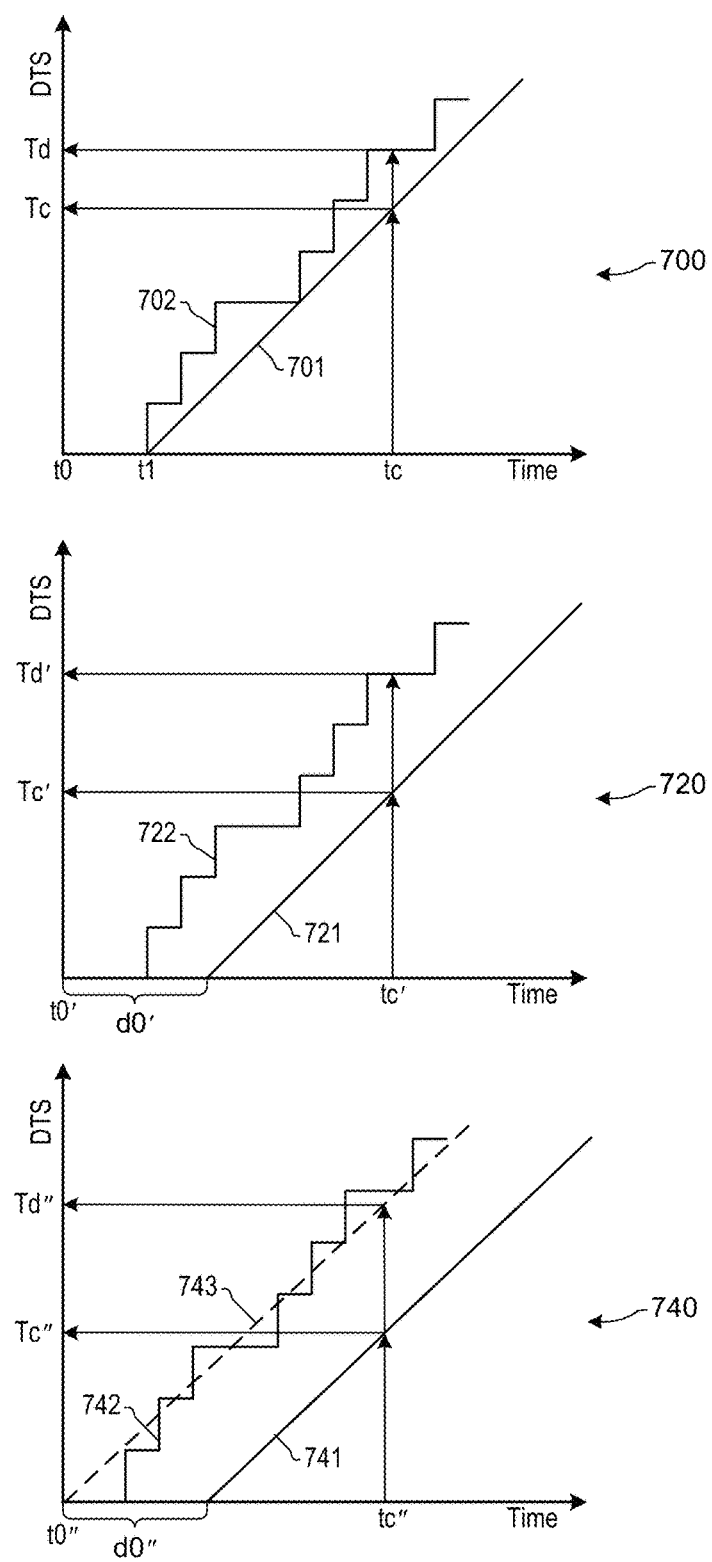
FIG. 8 shows example graphs of video data delivery to a client and video playback illustrating aspects of the invention.

The buffer occupancy estimation module 628 includes operations similar to a video buffer model. Further understanding of the buffer occupancy estimation module 628 may be gained by reference to FIG. 8. FIG. 8 shows example graphs of video data delivery to a client and video playback illustrating aspects of the invention. The graphs plot DTSs versus time. Each example in FIG. 8 illustrates a method the buffer occupancy estimation module 628 may use to estimate client-side video buffer occupancy. Time in each example graph begins at a value t0.

The first example graph 700 plots a video playback 701 and a video delivery 702. Although the term video playback may be used, the buffer estimation may be based on when the client removes video data from a buffer for decoding. The DTS of the video delivery 702 must be larger than or equal to the DTS of the video playback 701. Otherwise the decoder will have no data to decode and the video will freeze. At time t1, in the first example, the first video sample has been completely transferred to the client.

The first example graph 700 shows how the buffer occupancy estimation module 628 may estimate buffer occupancy at the current time tc. As illustrated, at time tc, video samples with DTSs up to Td have been delivered to the client and decoding has advanced to DTS Tc, where Td and Tc are expressed as time, for example, seconds of video delivered and seconds of video decoded, respectively. The value of Td can be determined by the timing information module 627 using one or more of the methods described above.

To determine the video decoding point Tc, the buffer occupancy estimation module 628 can calculate how long the video decoding on the client has been underway. In the method illustrated in the first example graph 700, the buffer occupancy estimation module 628 assumes the client begins decoding the video when the first video sample has been completely delivered, time t1. Accordingly, the video decoding point Tc is the difference between the current time tc and time t1. Thus, the buffer occupancy estimation module 628 can calculate the estimated buffer occupancy as $BO\_t = Td - (tc - t1)$.

This buffer occupancy may be expressed in units of time (e.g., seconds). If no more data were delivered to the client, video decoding could continue for BO_t. If the buffer occupancy BO_t is zero or negative, the buffer has underflowed and video decoding processing is disrupted and this will eventually lead to a playback freeze event. When an estimated buffer occupancy is negative, it indicates that data that should have arrived at the buffer has not yet arrived. A physical buffer will not have a negative occupancy. The buffer occupancy can be converted from time to bytes. A table that maps data byte counts to DTS may be used. Alternatively, the conversion to bytes may also be estimated using the average bitrate of the video. For various uses, buffer occupancy in terms of time or bytes may be preferred.

The second example graph 720 shows another method the buffer occupancy estimation module 628 may use to estimate buffer occupancy. The second example graph 720 also plots the video playback 721 and the video delivery 722. Estimation of buffer occupancy at the current time tc' is illustrated. At time tc', video samples of DTSs up to Td' have been delivered to the client and video decoding has advanced to DTS Tc'. The value of Td can be determined as described for the first method.

To determine the video decoding point Tc', the buffer occupancy estimation module 628 determines how long the video decoding process has been underway. In the method illustrated in the second example graph 720, the buffer occupancy estimation module 628 uses an initial buffer delay d0' to determine when the video decoding process is started. The timing information module 627 can determine the initial buffer delay d0' from the video stream parameters or from the client type, if the client type can be detected and its behavior is known to the timing information module 627. Since delivery of the video data started at time t0, the video decoding process started at time t0+d0. Accordingly, the time Tc' is the difference between the current time tc' and the decoding start time t0'+d0'. Thus, the buffer occupancy estimation module 628 can calculate the estimated buffer occupancy as $BO\_t' = Td' - (tc' + (t0' + d0'))$.

The third example graph 740 shows another method the buffer occupancy estimation module 628 may use to estimate buffer occupancy. The third example graph 740 also plots the video playback 741 and the video delivery 742. In addition, the third example graph 740 plots a constant-rate delivery 743 that assumes video data is delivered at a constant rate. The constant rate may be an average rate. Estimation of buffer occupancy at the current time tc" is illustrated. The buffer occupancy method illustrated in the third example graph 740 is similar to the method illustrated in the second example graph 720 and determines the video decoding point Tc in the same way.

The method illustrated in the third example graph 740 estimates that video samples of DTSs up to Td" from the amount of data delivered. The DTS Td" can be calculated as $Td'' = D/R$, where D is the amount of data delivered and R is the assumed constant video data rate. Thus, the buffer occupancy estimation module 628 can calculate the estimated buffer occupancy as $BO\_t'' = Td'' - (tc'' - (t0'' + d0''))$. The amount of data delivered to the client may be determined by the timing information module 627 as described above.

The above methods for estimating buffer occupancies produce estimates that may include errors in the information used. For example, an error in the initial buffer delay used can result in a corresponding error in the buffer occupancy estimate. Accordingly, the QoE enhancement module 610 may incorporate information from sources other than the video data (e.g., information about the client, information about the hardware used by the client, information about the user, and historical information) to determine the initial buffer delay. The buffer occupancy estimation module 628 may also adjust the video decoding point Tc to take into account playback freezes previously predicted by the estimated buffer occupancy.

The QoE enhancement module 610 includes a congestion evaluation module 626. The congestion evaluation module 626 analyzes estimated buffer occupancies from the buffer occupancy estimation module 628 to detect traffic congestion. Information about congestion can be used, for example, by other modules to adjust operation of the network node. Congestion is generally indicated when an estimated buffer occupancy is below a threshold level. The threshold level can be chosen to allow for processing and transport time necessary to adjust operation, for example the threshold value can take into consideration TCP packet transport, radio access network transport, or buffer occupancy estimation calculation time.

The congestion evaluation module 626 may use other information as well to detect congestion. For example, congestion evaluation may also use other information, such as the status of resources at the network node in which the QoE enhancement module 610 operates. When the estimated buffer occupancy in a client device is zero but the associated network node has no data to transmit to the client device, the congestion evaluation module 626 may determine that the traffic from the network node to the client device is not congested and that congestion exists upstream of the network node. Alternatively, congestion evaluation module 626 may compare the DTS of the most recent video sample to arrive at the network node from the video server, Td(arrive) and compare it to the estimated playback point of the video client, Tc. If Tc>Td(arrive), the congestion evaluation module 626 may conclude that congestion is occurring upstream of the network node. In these cases, the control response module 621 may send a message containing the video client's estimated buffer occupancy and information related to the network node's local buffer occupancy to one or more upstream nodes.

The congestion evaluation module 626 may use the buffer occupancy estimates to calculate performance metrics.

Example metrics include a time-average buffer occupancy. On a per-session basis, the congestion evaluation module 626 may average the buffer occupancy estimates over some period of time. The period of time may be an entire video session.

Another example metric is the elapsed time of video freezes. The congestion evaluation module 626 may run a timer when the buffer occupancy estimate is below a threshold (e.g., zero) to generate a metric indicating the duration of video freezes. The metric may converted to a percentage by dividing the duration of video freezes by a total session time.

Another example metric is a histogram of video freeze durations. The congestion evaluation module 626 may run a timer for each time the buffer occupancy estimate falls below a threshold. The duration times can then be combined in a histogram. The histogram metric may be used, for example, as an input to a video mean opinion score (VMOS) estimate, for example, as described in ITU-T J.247 Annex C.

Other metrics may also be calculated. The metrics can be aggregated, for example, to form a per-bearer, per-user, per-cell, or per-network quality metric. The aggregated metrics can be both on an instantaneous basis and over various time intervals.

The performance metrics derived from the buffer occupancy estimates may be used in various ways. The QoE enhancement module 610 may, for example, transmit the metric to a server that manages the network operations. The server could, for example, be in a core network or could be a cloud-based server. The server could aggregate metrics from multiple access nodes. The metrics may be compared to a threshold level. When the comparison indicates problematic network performance, an alarm may be sent to the network operator. The alarm may be generated, for example, local to a network node that includes the QoE enhancement module 610 or at a server that aggregates metrics from multiple network nodes. Alternatively or in addition, the metrics may be sent to the originating video server in support of dynamic adaptation methods such as rate throttling and traffic shaping which may be used to alleviate temporary network congestion.

The metrics may be further analyzed to assess chronic performance problems. The analysis can be used to determine potential areas for network capacity enhancements. The analysis can also be used to evaluate compliance to or violations of service level agreements. The service level agreements may be, for example, with end users or over-the-top (OTT) service providers (e.g., a carrier may commit to meeting a certain quality level for particular types of video sessions).

The QoE enhancement module 610 may include a control response module 621. The control response module 621 receives information about congestion from the congestion evaluation module 626 and can include the congestion information in control responses for the network node the QoE enhancement module 610 serves. The control response module 621 may also receive the estimated buffer occupancy information. The control responses can adjust scheduling parameters to enhance users' QoE. For example, when a video client's estimated buffer occupancy is below a low threshold, scheduling priority for packets to be transmitted to the client, or scheduling resources allocated to the video stream through the use of scheduling weights or credits, can be increased. When the video client's estimated buffer occupancy is above a high threshold, scheduling priority for packets to be transmitted to the client or scheduling resources can be decreased. The QoE enhancement module 610 may establish a piece-wise linear relationship between scheduling priority (or an application factor used in determining scheduling priority or scheduling resource allocation) and estimated buffer occupancy. Other mathematical relationships between estimated buffer occupancy and scheduling priority or resource allocation may be used.

The QoE enhancement module 610 may include or be used with methods of adjusting scheduling parameters or application factors as described in U.S. patent application Ser. No. 13/607,559, filed Sep. 7, 2012 and titled "Systems and Methods for Congestion Detection for use in Prioritizing and Scheduling Packets in a Communication Network".

The QoE enhancement module 610 may send an indication of congestion to a video client. In response to the congestion indication, the video client may reduce the rate of data it requests thereby reducing congestion. For example, based upon estimated buffer occupancy, the QoE enhancement module 610 may create a control response resulting in the setting of the two Explicit Congestion Notification (ECN) bits in IP packets to a value indicating congestion. The control response indicating congestion can trigger the video client to effect a video codec rate reduction. The use of ECN bits in IP packets is described in IETF RFC 3168 (September 2001): "The Addition of Explicit Congestion Notification (ECN) to IP".

FIG. 7 illustrates a particular allocation of functions to various modules and a particular distribution of modules in various communication nodes. Many other arrangements may also be used. For example, some modules or parts of modules can be distributed to different nodes. For example, modules in FIG. 7 except the control response module 621 may be located in a core based gateway, such as an LTE serving gateway (S-GW), and the control response module 621 may be located in an eNB served by the S-GW. In addition, the gateway from the example above may serve one or more eNBs. That is, the modules in FIG. 7 except the control response module 621 may perform functions in support of video streams transported to one or more eNB. Alternatively, all modules including the control response module 621 may be located in a core based gateway with control responses transmitted to one or more access nodes. The illustrated module may provide additional functions. Although modules of the QoE enhancement module 610 are described for one video session, they may analyze multiple sessions or multiple types of data concurrently.

FIG. 9 is a diagram of a data structure of a video file in accordance with aspects of the invention. The data structure of FIG. 9 is for a file based on ISO BMFF. The basic syntactic structure used for ISO BMFF is a box. Each rectangle in FIG. 9 is a box. A box can contain one or multiple other boxes. In FIG. 9, all boxes immediately to the right of a box are that box's child boxes. Each box includes a length field, a four-character-code as an ID, and the content of the box, if any.

An ISO BMFF based file starts with a file type (ftyp) box 801. The ftyp box 801 is unique to each file format derived from ISO BMFF. The ftyp box 801 includes information such as a file type, file version, and file compatibility. An optional progressive download information (pdin) box 802 may follow. The pdin box 802 includes an initial delay to be used before beginning video decoding and subsequent playback of decoded video. The initial delay from the pdin box 802 may be used, for example, by a QoE enhancement module in emulating operation of a video client's behavior.

A metadata container (moov) box 810 contains the metadata of the movie file. Note that ISO BMFF uses the term movie for videos. The moov box 810 includes information about the structure of the movie file and may be considered a header for the movie file. For a long video, the moov box 810 can include several megabytes of metadata.

A media data (mdat) box 890 contains media sample data for the movie. The moov box 810 can be used to locate particular data in the mdat box 890. The moov box 810 is before the mdat box 890 in a file conforming to progressive download requirements. For file storage purposes, the moov box 810 can be after the mdat box 890. Other similar file organization may be used, for example, a video may have interleaved fragments of metadata and media data.

Example code for use in parsing an ISO BMFF video and generating a table for mapping data locations to decoding timestamps will also be described. The methods described may be performed, for example, by the buffer occupancy estimation module 628 of FIG. 7. The example uses the ISO base media file format illustrated in FIG. 9. Many other file formats (e.g., MP4, 3GP, PIFF, and F4V) are similar to ISO BMFF. The methods described for ISO BMFF may be applied to other file formats.

The moov box 810 contains a movie header (mvhd) box 815, a track (trak) box 820, further track boxes 825 if any, and a movie extends (mvex) box 880. The mvhd box 815 contains overall information about the movie. The trck box 820 or any one of the further track boxes 825 contains metadata for one track of the movie. The mvex box 880 is used when the media data is fragmented. The mvex box 880 contains a movie extends header (mehd) box 881 and a track extends defaults (trex) box 882.

The trck box 820 contains a track header (tkhd) box 821, an edit (edts) box 822 that contains an edit list (elst) box 823, and a media information (mdia) box 830. The mdia box 830 provides characteristic information of the media in the track and contains a media header (mdhd) box 831, a handler reference (hdlr) box 832, and a media information (minf) box 840. The mdhd box 831 provides media-independent information relevant to characteristics of media in the track. The hdlr box 832 can provide information about how to handle media in the track.

The minf box 840 provides characteristic information of the media in the track. The minf box 840 contains a video media header (vmhd) box 842 and a data information (dinf) box 844 that contains a data reference (dref) box 846 that provides a table of data references.

The minf box 840 also contains a sample table (stbl) box 860. Information in the stbl box 860 is used to identify sample data in mdat box 890. The stbl box 860 contains a sample description (stsd) box 861, decoding time to sample (stts) box 862, a sync sample (ssts) box 863, a sample size (stsz) box 864, a sample-to-chunk (stsc) box 865, a chunk offset (stco) box 866, and an independent and disposable samples (sdtp) box 867.

The time a video sample is removed from a video stream buffer and decoded is specified in the stts box 862. The syntactic structure of the stts box 862 is listed in Table 1. The DTS of each sample is specified differentially as sample_delta. In addition, consecutive samples having the same sample_delta are grouped. In the following discussion, variable "td" is used in referring to the DTS of a video sample.

TABLE 1

| ISO BMFF Time-to-Sample Box "stts" Structure |
|---|
| aligned(8) class TimeToSampleBox<br>extends FullBox('stts', version = 0, 0) {<br>    unsigned int(32) entry_count;<br>    int i; |

TABLE 1-continued

| ISO BMFF Time-to-Sample Box "stts" Structure |
|---|
|     for (i=0; i < entry_count; i++) {<br>        unsigned int(32) sample_count;<br>        unsigned int(32) sample_delta;<br>    }<br>} | entry_count - is an integer that gives the number of entries in the following table.
sample_count - is an integer that counts the number of consecutive samples that have the given duration.
sample_delta - is an integer that gives the delta of these samples in the time-scale of the media.

In addition to the DTS, locating a video sample uses an offset of each video sample in the video stream and the size of each video sample. This information can be obtained by parsing the stsz box 864, the stsc box 865, and the stco box 866. Parsing this data can start with grouping samples into chunks. A chunk is a group of samples of the same sample type that are stored consecutively in the mdat box 890.

The stsc box 865 has information on how many samples are in each chunk and an index to the sample description for samples in the chunk. The structure of the stsc box 865 is listed in Table 2. Consecutive chunks of the same sample type having the same "samples_per_chunk" and "sample_description_index" are grouped in the stsc box 865. This is controlled using the field "first_chunk."

TABLE 2

| ISO BMFF Sample-to-Chunk Box "stsc" Structure |
|---|
| aligned(8) class SampleToChunkBox<br>extends FullBox('stsc', version = 0, 0) {<br>    unsigned int(32) entry_count;<br>    for (i=1; i <= entry_count; i++) {<br>        unsigned int(32) first_chunk;<br>        unsigned int(32) samples_per_chunk;<br>        unsigned int(32) sample_description_index;<br>    }<br>} | entry_count is an integer that gives the number of entries in the following table.
first_chunk is an integer that gives the index of the first chunk in this run of chunks that share the same samples-per-chunk and sample-description-index; the index of the first chunk in a track has the value 1 (the first_chunk field in the first record of this box has the value 1, identifying that the first sample maps to the first chunk).
samples_per_chunk is an integer that gives the number of samples in each of these chunks.
sample_description_index is an integer that gives the index of the sample entry that describes the samples in this chunk. The index ranges from 1 to the number of sample entries in the Sample Description Box.

The stco box 866 has information on the offset of each chunk in the video file starting from the beginning of the file. Its structure is listed in Table 3. After parsing the stsc box 865 and the stco box 866, the mapping from the sample to the chunk and offset of the first sample in a chunk in the file can be established.

TABLE 3

| ISO BMFF Chunk Offset Box "stco" Structure |
|---|
| aligned(8) class ChunkOffsetBox<br>extends FullBox('stco', version = 0, 0) {<br>    unsigned int(32) entry_count;<br>    for (i=1; i <= entry_count; i++) {<br>        unsigned int(32) chunk_offset;<br>    }<br>} | entry_count is an integer that gives the number of entries in the following table.
chunk_offset is a 32 or 64 bit integer that gives the offset of the start of a chunk into its containing media file.

The stsz box 864 specifies the size of each sample for a movie track. The structure of the stsz box 864 is listed in Table 4.

TABLE 4

ISO BMFF Sample Size Box "stsz" Structure

```
aligned(8) class SampleSizeBox extends FullBox('stsz', version = 0, 0) {
    unsigned int(32) sample_size;
    unsigned int(32) sample_count;
    if (sample_size==0) {
        for (i=1; i <= sample_count; i++) {
            unsigned int(32) entry_size;
        }
    }
}
``` sample_size is integer specifying the default sample size. If all the samples are the same size, this field contains that size value. If this field is set to 0, then the samples have different sizes, and those sizes are stored in the sample size table. If this field is not 0, it specifies the constant sample size, and no array follows.
sample_count is an integer that gives the number of samples in the track; if sample-size is 0, then it is also the number of entries in the following table.
entry_size is an integer specifying the size of a sample, indexed by its number.

After parsing the stsz box 864, the stsc box 865, and the stco box 866, the offset of each sample in a file and the size of each sample can be obtained. This information can be combined with the DTS parsed from the stts box 862 to generate a table, for example, the example in Table 5, for mapping byte counts to samples and their DTSs. The total amount of data transmitted can be estimated using the methods described above. In this example, the table has one record for each video sample in the video file.

In Table 5, the sample offset is the offset of the first byte of a video sample with respect to the beginning of the video file. A buffer occupancy estimation module can compares the amount of video data delivered, D, to the sample offsets to know the DTS for which samples have been delivered. For example, using example of Table 5, if the total amount of video data transmitted is 166000 bytes, it is known that the second video frame has been completely transferred and the DTS of the last complete video sample has been advanced to 33 ms.

TABLE 5

ISO BMFF Offset to Sample Timing Mapping

| Sample Index | Sample Offset (bytes) | Sample Size (bytes) | Sample Decoding Timestamp (ms) |
|---|---|---|---|
| 0 | 103578 | 52234 | 0 |
| 1 | 155812 | 10023 | 33 |
| 2 | 165835 | 8000 | 66 |
| ... | | | |

The information in the table can be generated by parsing the moov box 810. The moov box 810 will usually span multiple TCP segments. Accordingly, parsing the moov box 810 may take care that the typical TCP issues (e.g., packet reordering, lost packets, and duplicated packets) do not affect the parsing. While a buffer occupancy estimation module may parse the moov box 810, it may only estimate the number of bytes transmitted for the mdat box 890. The DTS of the last completely transmitted video sample can be calculated by comparing the amount of bytes in mdat box 890 that has been transmitted and the array of sample information, including offset, sample size, and sample DTS. The client-side buffer occupancy in units of time can be estimated as the difference between the DTS of the last completely transmitted video sample and the total video transfer time. Considering the client often does not start consuming video data immediately, the client-side buffer occupancy in units of time can be adjusted by adding the initial buffer delay of the client.

A review of HTTP video streaming is now provided. Those not familiar with the subject may wish to review R. Fielding, et al., RFC 2616, "Hypertext Transfer Protocol—HTTP/1.1," June 1999. HTTP video streaming is an HTTP based video delivery technology.

A video is encoded into different representations that each may be of a different bit rate. Each representation consists of many small independently decodable segments. The video segments of different representations are aligned in playback time, so the client can switch from one representation to another at the segment boundary, for example, if the network bandwidth changes. Information about the representations and the segments is summarized in one or multiple manifest files. Video segments and the manifest files can be put on a server or many servers in a content delivery network. A client first retrieves, for example, via HTTP, the manifest file. The client can then play the video in a very flexible way, by fetching the video segments on demand through HTTP, based on the progress of client buffering and playback, and user inputs. The entire process is client driven, instead of server-driven.

HTTP streaming protocol has many variants, such as Microsoft Smooth Streaming (see [MS-SSTR]-v20120705, "Smooth Streaming Protocol Specification", Jul. 5, 2012), Apple HTTP Live Streaming (see Pantos and May, "HTTP Live Streaming," draft-pantos-http-live-streaming-12, Oct. 14, 2013), and Adobe HTTP Dynamic Streaming (see Adobe, "HTTP Dynamic Streaming Specification Version 3.0 FINAL," August 2013). MPEG (ISO/IEC SG28 WG11) (see ISO/IEC 23001-6, "Information technology—MPEG systems technologies—Part 6: Dynamic adaptive streaming over HTTP (DASH)" and O/IEC 21009-1, "Information technology—Dynamic adaptive streaming over HTTP (DASH)—Part 1: Media presentation description and segment formats") and 3GPP also defined a standard HTTP video streaming protocol, which is referred to as DASH (Dynamic Adaptive Streaming over HTTP) (see "Transparent end-to-end Packet-switched Streaming Service (PSS); Progressive Download and Dynamic Adaptive Streaming over HTTP (3GP-DASH)," 3GPP Release 12, TS 26.247, V12.0.0, September, 2013). MPEG DASH and 3GPP DASH are mostly the same with some minor differences. In the following discussion, DASH, MPEG DASH, or 3GPP DASH may be referred to in the discussion, depending on whether the feature described is common to both, or specific to one specific variant.

Figure 10:
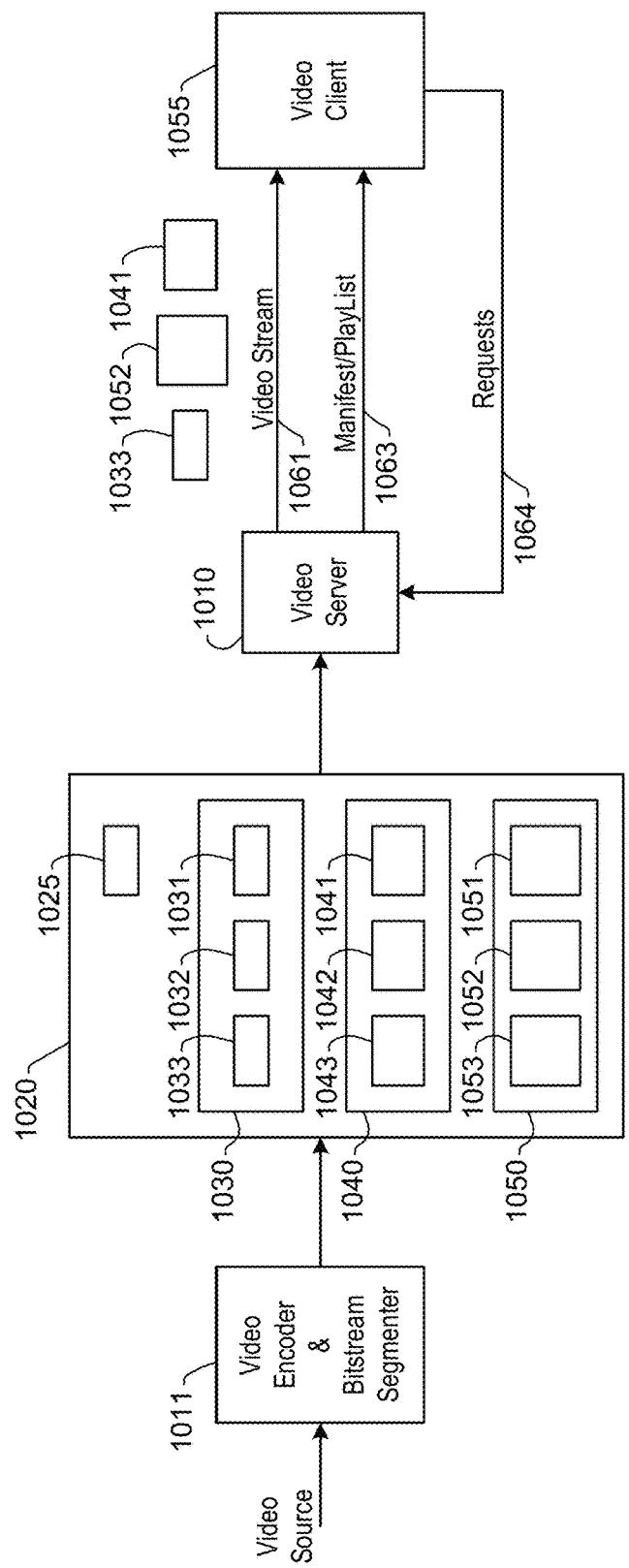
FIG. 10 is a block diagram of a video streaming environment with adaptive bit rate in accordance with aspects of the invention.

FIG. 10 is a block diagram of a video streaming environment with adaptive bit rate in accordance with aspects of the invention. The video streaming environment may be performed in the communication systems of FIG. 4. The video streaming environment of FIG. 10 includes a video encoder and bitstream segmenter 1011, a video storage 1020, a video server 1010, and a video client 1055. To provide a specific example, the video streaming environment shown in FIG. 10 will be described for HTTP video streaming; however, video streaming environments according to other standards and protocols can be used. Although many descriptions in this document focus on video, the same or similar systems and methods may also be applied to streaming of a presentation that has both video and audio, has only video, or has only audio.

HTTP video streaming often uses a manifest file which provides information of a presentation to the video client 1055 for use in controlling the playback process. A video presentation may be referred to as a movie presentation or simply a presentation. The manifest file may have various formats. A manifest file using Media Presentation Description (MPD) defined in MPEG/3GPP DASH is described below.

The video encoder and bitstream segmenter 1011 generates multiple video representations for the same video presentation. The video encoder and bitstream segmenter 1011 can store the video representations and a corresponding manifest/playlist file 1025 in the video storage 1020. A video representation may be referred to as simply a representation. The video representations have different bit rates. For example, a first video representation 1030 has a low bit rate, a second video representation 1040 has a medium bit rate, and a third video representation 1050 has a high bit rate.

The video encoder and bitstream segmenter 1011 also divides the video representation into video segments. A video segment may be referred to as simply a segment. Each video representation includes multiple video segments that are independently decodable. The first video representation 1030 includes a first video segment 1031, a second video segment 1032, and a third video segment 1033. The second video representation 1040 includes a first video segment 1041, a second video segment 1042, and a third video segment 1043. The third video representation 1050 includes a first video segment 1051, a second video segment 1052, and a third video segment 1053. The video segments are aligned in decoding time across the different video representations. Thus, a continuous video can be displayed from video segments selected from any combination of the video representations. The illustrated media has three levels of data hierarchy—presentation, representation, and segment.

Information about the video representations, such as average bit rate (e.g., over the entire presentation), and uniform resource locators (URLs) of the video segments inside each representation may be summarized in a manifest file. The video segments and manifest file can be stored in the video server 1010, which may be a single server or may be distributed across multiple servers or storage systems.

The video client 1055 can retrieve data from the video server 1010 by sending requests 1064. The video client 1055 may first retrieve the manifest file 1063, which is a copy of the manifest file 1025 on the server. The video client 1055 can then play the video by fetching the video segments forming a video stream 1061. The video segments fetched may be selected based on network conditions. If the network bandwidth is not sufficient, the video client 1055 may fetch following video segments from a video representation of lower quality. Once the network bandwidth increases at another time, the video client 1055 may fetch segments from a video representation of higher quality. For example, the video client 1055 may select the first video segment 1041 from the second video representation 1040, the second video segment 1052 from the third video representation 1050, and the third video segment 1033 from the first video representation 1030.

Since the network conditions between the video server 1010 and the video client 1055 may vary over time, the video client 1055 may select video segments from more than one video representation. Additionally, since the network conditions may vary differently for different video clients, each client's video stream may be made up of a different set of video representations for video streaming sessions of the same video presentation.

The duration of a video segment is usually a few seconds in playback time. Using video segments of longer duration can make the compression and transport more efficient, but it will incur longer latency in switching across representations. The size of a video segment in bytes depends on factors, such as the segment duration, video content, and compression settings. The segment length or segment size normally refers to the number of bytes in a segment, while the segment duration refers to how long in time the segment can be played.

Figure 11:
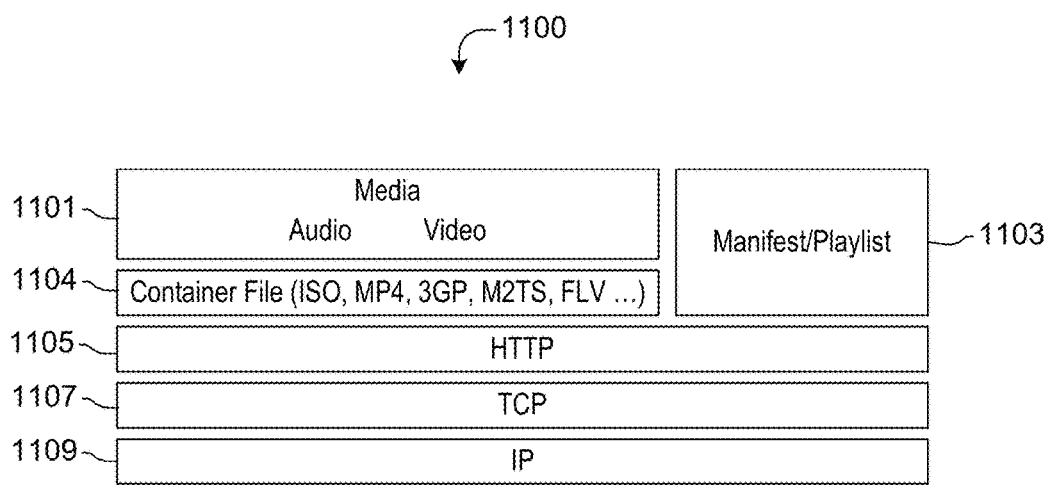
FIG. 11 is a block diagram of a protocol stack to support video streaming in accordance with aspects of the invention.

FIG. 11 is a block diagram of a protocol stack to support video streaming in accordance with aspects of the invention. The protocol stack 1100 of FIG. 11 is for HTTP video streaming. There are currently many proprietary HTTP streaming technologies, such as Apple HTTP Live Streaming, Microsoft Smooth Streaming, and Adobe Dynamic Streaming. The basic concepts are similar, but they differ in the format of the manifest file and the video container file which encapsulates video data into segments. These differences make them incompatible with each other. The protocol stack 1100 shown in FIG. 11 includes an Internet protocol (IP) layer 1109, a transmission control protocol (TCP) layer 1107, an HTTP layer 1105, a container file 1104, a manifest/playlist layer 1103, and a media (audio/video) layer 1101. The protocol stack 1100 may be implemented, for example, by the processor module 220 of the terminal node of FIG. 3.

The protocol stack 1100 shown in FIG. 11 may be used with many protocol variants. HTTP streaming protocol does not specify a new transport mechanism. Instead it specifies the format of encapsulating media data into segments and the manifest file format. All objects, including manifest and media segments, are transferred via HTTP transactions. An example HTTP transaction includes a request sent from a client on a terminal node to a server and a response message sent from the server to the client. Herein the request may use an HTTP "GET" request message, which is a request message with "GET" method, and the response message may be referred to as HTTP "GET" response message.

Table 6 lists exemplary HTTP streaming protocols and their specific media file format and the manifest file format.

TABLE 6

Container and Manifest File Formats in HTTP Streaming Variants

| Variant | Container file | Manifest file |
| --- | --- | --- |
| Apple HTTP Live Streaming | MPEG-2 TS | m3u8 playlist |
| Microsoft HTTP Smooth Streaming | PIFF | IIS SS Client Manifest |
| Adobe HTTP Dynamic Streaming | F4V | F4M |
| MPEG DASH | MP4, or MPEG-2 TS | DASH MPD (Media Presentation Description) |
| 3GPP DASH | 3GPP | DASH MPD |

Apple's HTTP streaming protocol is HTTP Live Streaming (HLS). HLS uses MPEG-2 transport stream (TS) to encapsulate video data. Instead of using a comprehensive manifest file, HLS uses a simple playlist file for retrieving the basic information about video representations and the video segments in the video representations.

Microsoft's HTTP streaming protocol is called Microsoft Smooth Streaming. Microsoft Smooth Streaming uses a fragmented video file format derived from ISO base media file format (ISOBMFF) and its proprietary XML-based manifest file format. Microsoft Smooth Streaming uses PIFF (Protected Interoperable File Format) as the video container format. Microsoft Smooth Streaming may also use other container file formats such as those based on Advanced Systems Format (ASF).

Adobe's HTTP streaming protocol is called HTTP Dynamic Streaming. It uses a fragmented video file format based on ISOBMFF, so it is quite similar to Microsoft HTTP Smooth Streaming, if the latter uses an ISOBMFF-based video file format as well. However, the two HTTP streaming protocols define extensions to ISOBMFF differently, and the manifest file formats are also different.

MPEG/3GPP standardization groups specified DASH (Dynamic Adaptive Streaming over HTTP) as an open standard in an effort to solve the issue of having multiple incompatible, proprietary HTTP streaming technologies in the market.

DASH uses an XML-based manifest file called MPD (Media Presentation Description) file. While 3GPP DASH adopts a video container file format based solely on the ISO base media file format (ISOBMFF), MPEG DASH supports an additional video container file format based on MPEG-2 transport stream format in some profiles, such as full profile, MPEG-2 TS simple profile, and MPEG-2 TS main profile.

DASH defines multiple levels for the media data hierarchy. A presentation is made up of one or more periods. Each period has one or more adaptation sets. An adaptation set contains one or more representations of one or several media content components. Each representation usually has a different quality setting. For example, if the representation contains video, the video quality may be varied by having a different resolution, a different frame rate, a different bit rate, or a combination of these variations. A representation is made up of one or more segments. The duration of a segment in playback time is typically a few seconds. A segment may further be made up of sub-segments. The additional levels in the media data hierarchy add flexibility in supporting additional features, but the disclosed quality adaptation control algorithms are equally applicable to protocols with different hierarchies.

Figure 12:
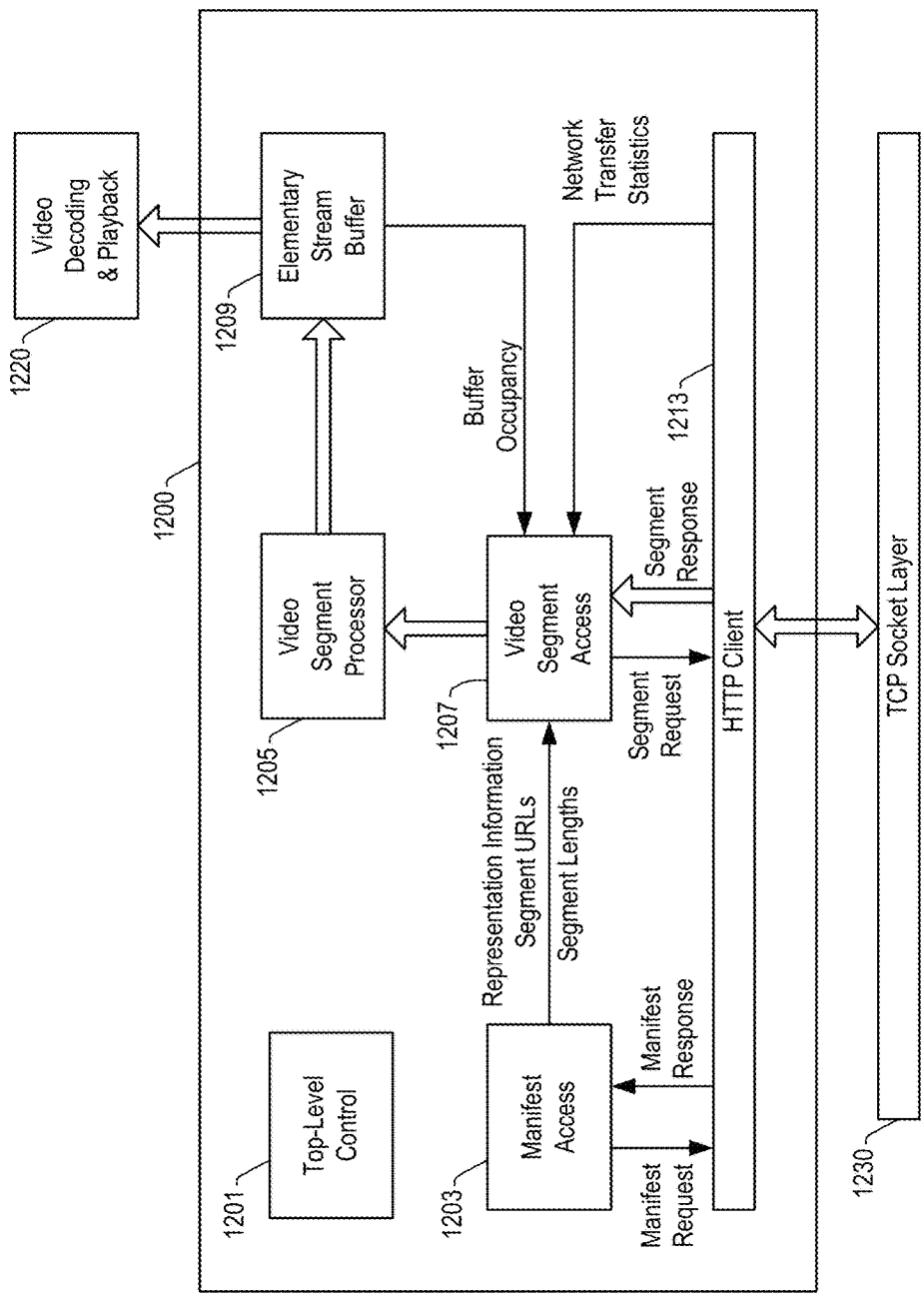
FIG. 12 is a block diagram illustrating aspects of a video streaming client module in accordance with aspects of the invention.

FIG. 12 is a block diagram illustrating aspects of a video streaming client module in accordance with aspects of the invention. The video streaming client module 1200 may be implemented using, for example, the processor module 220 of the terminal node of FIG. 3. The video streaming client module 1200 includes a top-level control module 1201, a manifest access module 1203, a video segment processor module 1205, a video segment access module 1207, an elementary stream buffer module 1209, and an HTTP client module 1213. The video streaming client module 1200 interfaces with a TCP socket layer 1230 and a video decoding and playback module 1220.

The video streaming client module 1200 handles all the protocol aspects of HTTP video streaming on the client side. The video streaming client module 1200 requests the video content from the video server, typically using TCP connections, and delivers the video stream to the video decoding and playback module 1220.

The top-level control module 1201 maintains a state machine for the video streaming client module 1200. The states include requesting a manifest file followed by requesting the video segments.

The manifest access module 1203 issues a request for a manifest file through the HTTP client module 1213. The manifest access module 1203 also processes the manifest file received via the HTTP client module 1213. The processing can include extracting information about a presentation, individual representations, and URLs of segments in the representations.

The video segment access module 1207 issues requests for segments through the HTTP client module 1213. The video segment access module 1207 also receives the segments through HTTP client module 1213. The video segment access module 1207 delivers the received segments to the video segment processor module 1205 for further processing. The video segment access module 1207 makes decisions, using a quality control adaptation algorithm, on how to switch among different representations, for example, to optimize the quality of the video streaming session. In addition to the information from the manifest file, such as information about the presentation, the representations, and segments, the video segment access module 1207 may also incorporate information such as buffer occupancy (e.g., from the elementary stream buffer module 1209) and network transfer statistics (e.g., from the HTTP client module 1213) in the decisions about switching among different representations.

The video segment processor module 1205 parses the video segments received by the video segment access module 1207 and extracts the elementary streams, such as video streams or audio streams, and sends them to corresponding elementary buffers.

The elementary stream buffer module 1209 stores the elementary streams extracted from the video segments, before they are consumed by the video decoding and playback module 1220. A video session may have at least one video elementary stream, and one audio elementary stream. The elementary stream buffer module 1290 is also able to report the buffer occupancy for each elementary stream. The buffer occupancy for an elementary stream is the amount of data in the elementary stream buffer that is available to play. A separate elementary stream buffer may be maintained for each elementary stream. For brevity, only one elementary stream buffer is shown in the FIG. 12.

The HTTP client module 1213 translates the requests for downloading the manifest and video segments into HTTP request messages and sends the messages through TCP connections that are managed by the HTTP client module 1213. The HTTP client module 1213 also receives the HTTP response messages from the server and delivers the content in the payloads of the HTTP response messages to either the manifest access module 1203 or the video segment access module 1207.

The video streaming client module 1200 maintains the elementary stream buffer module 1209 to accommodate variation in both video bit rate and network bandwidth. The elementary stream buffer module 1209 has a buffer of a limited size. The buffer size may be specified in units of playable time (e.g., seconds) or bytes. The buffer size in units of time may be preferred in some cases, since it can be more convenient to use in a time-based feedback loop. The disclosed systems and methods are described with buffer size and buffer occupancy, which is the amount of data in the buffer, specified in units of time, unless otherwise noted. However, an embodiment may use buffer size and buffer occupancy specified in units of bytes.

The video streaming client module 1200 can operate to avoid overflow of the stream buffer. When the stream buffer is full, the video client will stop fetching new data. When the stream buffer is no longer full, the video client will resume fetching new data. The video streaming client module 1200 may use separate thresholds for stopping and resuming fetching new data. When the video client stops fetching new data to avoid buffer overflow, the network may not be fully utilized.

The video streaming client module 1200 can also operate to avoid underflow of the stream buffer. Underflow of the stream buffer indicates that the incoming data does not keep up with the decoding and playback process. Video freezes will result from buffer underflows. Video freezes lower the quality of experience for a viewer of the video. Thus, buffer underflow is also not desired.

The video streaming client module 1200 uses a quality adaptation control algorithm to decide from which representation the next segment should be fetched. The quality control adaptation algorithm may operate to avoid overflow or underflow of the elementary stream buffer module 1209.

Figure 13:
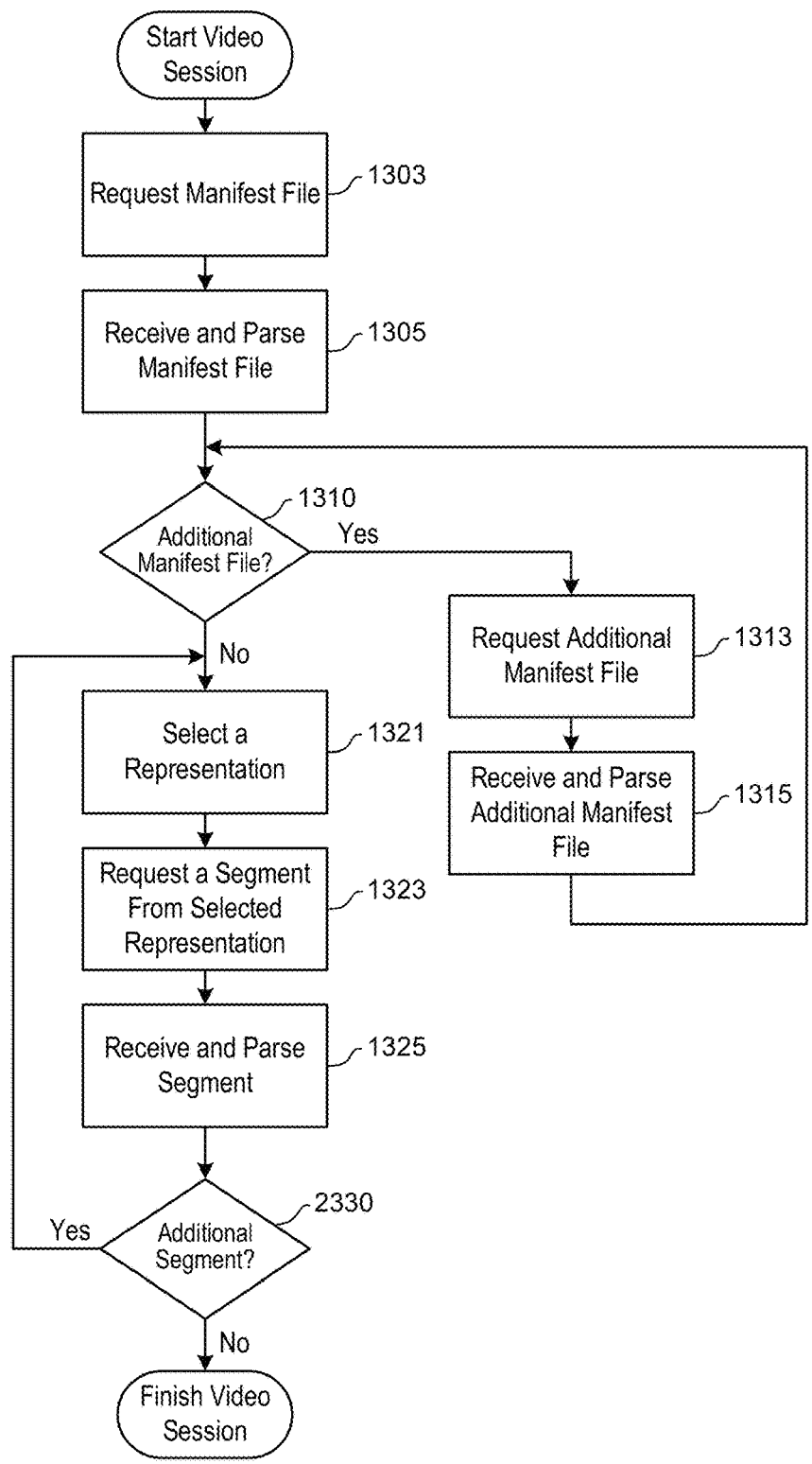
FIG. 13 is a flowchart of a process for playing one video session by a video streaming client in accordance with aspects of the invention.

FIG. 13 is a flowchart of a process for playing one video session by a video streaming client. The process may be performed by the video streaming client of FIG. 12.

In step 1303, to start a video session, the process requests a manifest file. After the request is sent, the video streaming client will wait for a response to the request. In step 1305, the process receives and parses the manifest file in the response from the server. The client can either parse the manifest file after the manifest file is completely received or as it is being received. Once the client has the information about the presentation, it starts requesting, receiving, and processing segments until the session is completed.

The complete manifest of a video presentation may be received in multiple parts with each part in a different HTTP transaction. Each part of the manifest file contains partial information of a presentation. In step 1310, the process determines if there are any additional manifest files. There may be additional manifest files, for example, in live streaming where video data is transferred shortly after it is generated and the manifest is repeatedly updated to include the information of the part of the presentation that was just generated. Another example with multiple manifest files is when a multi-level manifest is used. When there is an additional manifest file, the process continues to step 1313; otherwise, the process continues to step 1321.

In step 1313, similar to step 1303, the process requests the additional manifest file. After the request is sent, the video streaming client will wait for a response to the request. In step 1315, similar to step 1305, the process receives and parses the additional manifest file. Thereafter, the process returns to step 1310. Steps 1313 and 1315 may occur while segments are being fetched.

In step 1321, the client selects a representation, for example, using a quality adaptation control algorithm. In step 1323, the client requests a segment from the selected representation. After the request is sent, the video streaming client will wait for a response to the request. In step 1325, the client receives and parses the requested segment in the response from the server.

In step 1330, the process determines if there are any additional segments remaining in the video session. When there is an additional segment, the process returns to step 1321; otherwise, the process finishes the video session.

A general HTTP streaming framework, as described above, has three levels in the media data hierarchy: presentation, representation, and segment. Some HTTP video streaming protocol variants have more levels in media data hierarchy than the general HTTP video streaming framework. For example, Dynamic Adaptive Streaming over HTTP (DASH) defines the following media data hierarchy:

presentations that include one or more periods;

periods that have one or more adaptation sets;

adaptation sets that contain one or more representations of one or several media content components (e.g. a video or audio component). Each representation usually has a different quality setting. For example, if the representation contains video, the video quality may be varied by having a different resolution, a different frame rate, a bit rate, or a combination of these variations;

representations that include one or more segments. The duration of a segment in playback time is typically a few seconds; and segments that may further include sub-segments.

The additional levels in the media data hierarchy add more flexibility in supporting additional features. Some algorithms described herein are described based on the assumption of 3-level data hierarchy; however, the same or similar algorithms are applicable to data hierarchies of more or fewer levels.

Various HTTP streaming protocols define their manifest files differently. Some algorithms described herein are described for a particular manifest file format; however, the same or similar algorithms are applicable to other protocols.

Table 7 lists an example MPD file for 3GPP/DASH On-Demand Service. For the first period, whose duration is 30 seconds, the URL of each segment is explicitly defined. For example, the URL of the first segment in the first representation is "http://example.com/rep 1/seg-1.3gp". For the second period, which starts after 30 seconds, segment URL is not specified individually. A video client should derive the segment URL using a template, "http://example.com/$RepresentationId$/$Number$.3gp", specified in the element <SegmentTemplate>. For example, the URL of segment number "4" in representation of id "1" is determined to be "http://example.com/1/4.3gp". Using a template can reduce the size of an MPD file. Since an MPD file is transferred at the beginning of a session, a smaller MPD file can reduce the startup latency.

TABLE 7

Example MPD File for 3GPP/DASH On-Demand Service

```
<?xml version="1.0"?>
<MPD
    profiles="urn:3GPP:PSS:profile:DASH10"
    type="static"
    minBufferTime="PT10S"
    mediaPresentationDuration="PT2H"
    availabilityStartTime="2010-04-01T09:30:47Z"
    availabilityEndTime="2010-04-07T09:30:47Z"
    xsi:schemaLocation="urn:mpeg:DASH:schema:MPD:2011 3GPP-Rel10-MPD.xsd"
    xmlns:xsi="http://www.w3.org/2001/XMLSchema-instance"
    xmlns="urn:mpeg:DASH:schema:MPD:2011">
    <ProgramInformation moreInformationURL="http://www.example.com">
        <Title>Example</Title>
    </ProgramInformation>
    <BaseURL>http://www.example.com</BaseURL>
    <Period start="PT0S">
        <AdaptationSet mimeType="video/3gpp">
```

TABLE 7-continued

Example MPD File for 3GPP/DASH On-Demand Service

```
            <ContentComponent contentType="video"/>
            <ContentComponent contentType="audio" lang="en"/>
            <Representation codecs="s263, samr" bandwidth="256000" id="256">
                <BaseURL>"rep1"</BaseURL>
                <SegmentList duration="1000" timescale="100">
                    <Initialization sourceURL="seg-init.3gp"/>
                    <SegmentURL media="seg-1.3gp"/>
                    <SegmentURL media="seg-2.3gp"/>
                    <SegmentURL media="seg-3.3gp"/>
                </SegmentList>
            </Representation>
            <Representation codecs="mp4v.20.9, mp4a.E1" bandwidth="128000"
id="128">
                <BaseURL>"rep2"</BaseURL>
                <SegmentList duration="10">
                    <Initialization sourceURL="seg-init.3gp"/>
                    <SegmentURL media="seg-1.3gp"/>
                    <SegmentURL media="seg-2.3gp"/>
                    <SegmentURL media="seg-3.3gp"/>
                </SegmentList>
            </Representation>
        </AdaptationSet>
    </Period>
    <Period start="PT30S">
        <SegmentTemplate
            duration="10"
            initialization="seg-init-$RepresentationId$.3gp"
            media="http://example.com/$RepresentationId$/$Number$.3gp"/>
        <AdaptationSet mimeType="video/3gpp"codecs="mp4v.20.9, mp4a.E1">
            <ContentComponent contentType="video"/>
            <ContentComponent contentType="audio" lang="en"/>
            <Representation bandwidth="256000" id="1"/>
            <Representation bandwidth="128000" id="2"/>
        </AdaptationSet>
    </Period>
</MPD>
```

Some HTTP video streaming protocols have the option of using a multi-level manifest. For example, Apple HTTP live streaming defines two types of manifest files; a master playlist file and a media playlist file. A Playlist is known as a media playlist if all uniform resource identifier (URI) lines in the playlist identify media segments. A playlist file is known as a master playlist if all URI lines it includes identify Media Playlists. Table 8 shows an example of a master playlist file and a media playlist file.

Adobe HTTP dynamic streaming also has the option of using multi-level manifest, one set-level manifest and one stream-level manifest for each stream, which is one representation of the presentation. Herein, master manifest is used as the name for the manifest of presentation level, and media manifest is used as the name for the manifest of the representation, assuming a 3-level data hierarchy.

Some HTTP streaming protocols allow that a manifest file may be periodically updated. This is useful, for example, in applying HTTP streaming protocol to transferring the presentation of a live event. On the server side, the media data

TABLE 8

Example of Apple HLS Playlist Files

| | |
|---|---|
| Master playlist file | #EXTM3U<br>#EXT-X-STREAM-INF:BANDWIDTH=1280000<br>http://example.com/low.m3u8<br>#EXT-X-STREAM-INF:BANDWIDTH=2560000<br>http://example.com/mid.m3u8<br>#EXT-X-STREAM-INF:BANDWIDTH=7680000<br>http://example.com/hi.m3u8<br>#EXT-X-STREAM-INF:BANDWIDTH=65000,CODECS="mp4a.40.5"<br>http://example.com/audio-only.m3u8 |
| Media playlist file<br>low.m3u8 | #EXTM3U<br>#EXT-X-VERSION:3<br>#EXT-X-TARGETDURATION:8<br>#EXTINF:7.975,<br>http://example.com/fileSequence_low_0.ts<br>#EXTINF:7.941,<br>http://example.com/fileSequence_low_1.ts<br>#EXTINF:7.975,<br>http://example.com/fileSequence_low_2.ts<br>#END_X_ENDLIST | just captured from a live event is encoded into media segments, and the information about the availability of the new segments is summarized in a manifest update file for the client to retrieve.

Figure 14:
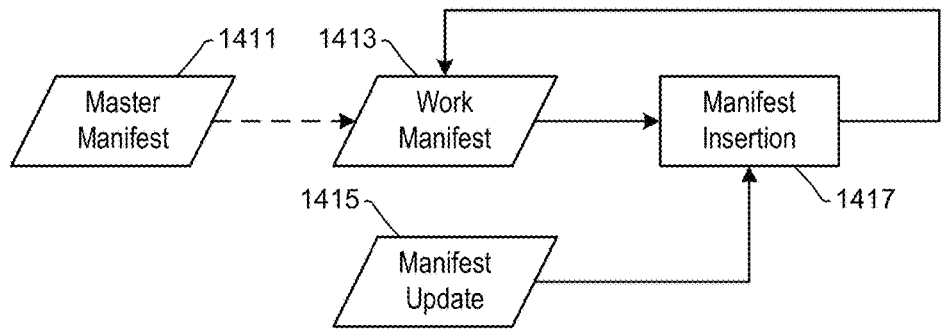
FIG. 14 is flow diagram illustrating a dynamically updated manifest in accordance with aspects of the inventions.

FIG. 14 is flow diagram illustrating a dynamically updated manifest in accordance with aspects of the inventions. The client starts the streaming process by requesting a first manifest file from the server (e.g., using step 1303 of the process of FIG. 13). The first manifest file is also referred to as master manifest herein. The master manifest file 1411 is copied to a work manifest file 1413. During the streaming process, the client periodically checks for the manifest update. If there is any update in manifest, the manifest update 1415 will be retrieved (e.g., using step 1313) and incorporated into the work manifest 1413. A manifest insertion step 1417 is used to apply the manifest update 1415 to the work manifest 1413. The work manifest is used in requesting the segments in the streaming process.

Figure 15:
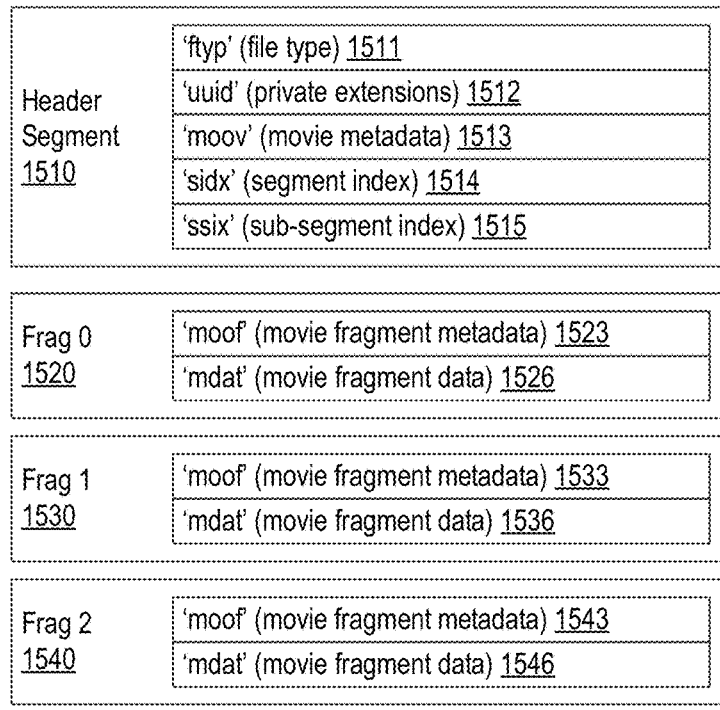
FIG. 15 is a diagram of a data structure of a video file with multiple movie fragments in accordance with aspects of the invention.

FIG. 15 is a diagram of a data structure of a video file with multiple movie fragments in accordance with aspects of the invention. A media container file format often has specific syntax elements that support HTTP streaming. The data structure of FIG. 15 is the structure of a media container file based on ISO base media file format with support of movie fragments. If this structure is compared with that in FIG. 9, it is seen that media data is distributed into multiple movie fragments instead of being stored in one single "mdat" box.

The data structure includes a header segment 1510 that includes a file type (ftyp) box 1511, optionally a private extensions box (uuid) 1512, and a metadata container (moov) box 1513. The header segment 1510 may also include a segment index box (sidx) 1514 and a sub-segment index box (ssix) 1515 that contains the media manifest information.

The example data structure of FIG. 15 includes a first fragment 1520, a second fragment 1530, and a third fragment 1540. A movie segment in HTTP streaming may include one or more movie fragments. Each movie fragment is independently decodable. The first fragment 1520 includes a movie fragment box (moof) 1523 that contains metadata corresponding to the media data of this fragment. The first fragment 1520 also includes a movie fragment data box (mdat) 1526 containing the media data. Similarly, the second fragment 1530 includes a second movie fragment metadata box 1533 and a second movie fragment data box 1536 and the third fragment 1540 includes a third movie fragment metadata box 1543 and a third movie fragment data box 1546.

For some HTTP streaming variants, such as one implementation of Microsoft HTTP smooth streaming, the media manifest may be defined using standard syntax elements of a media container file format. This manifest may be part of a media container file also containing all media segments of a representation. In some scenarios, the media manifest information is located at the beginning of the media file.

Systems and methods for estimating, in a network node, the client BO (buffer occupancy) of an HTTP video streaming session running on a client are now further described. The network node may be on the path between the server and client. For example, the network node estimating client BO may be an access node. Client BO estimation can also be implemented on the client or server node.

Compared with HTTP progressive download, in which all the video data of a video session is often transferred through the same TCP connection, manifest and segments of an HTTP streaming session may be transferred using more than one TCP connection. The methods below describe how to classify these objects and associate them with an HTTP streaming session in the client. Once the HTTP streaming sessions through a network node are properly classified, client BO estimation may be performed using the techniques similar to that described previously.

Figure 16:
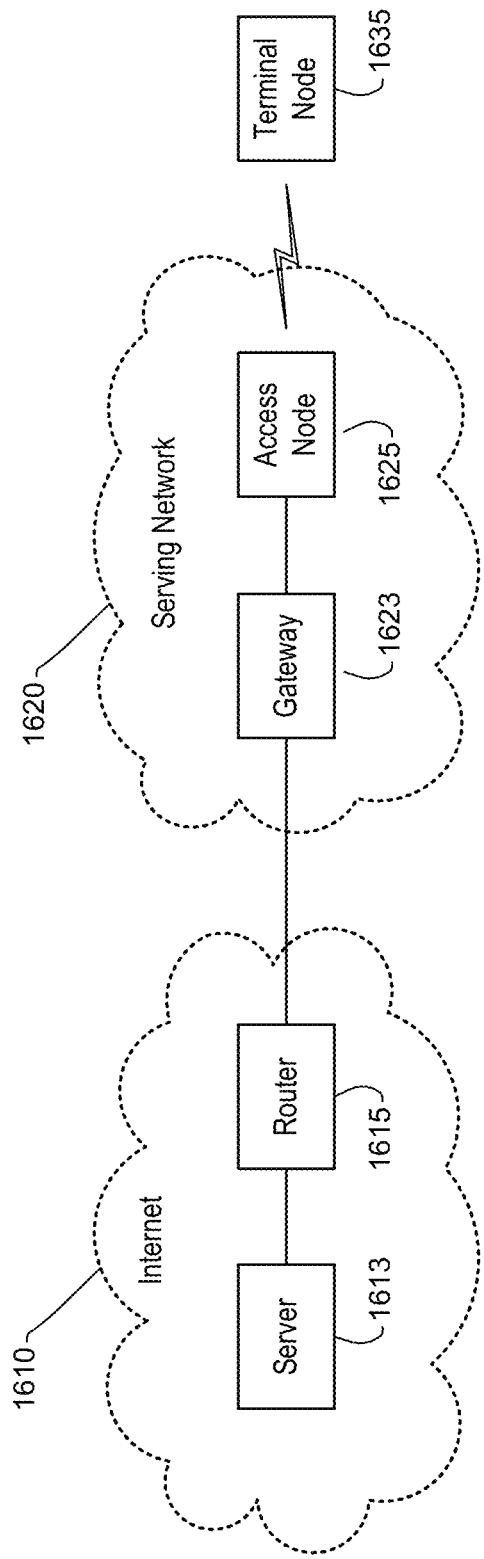
FIG. 16 is a block diagram of a communication system supporting video streaming in accordance with aspects of the invention.

FIG. 16 is a block diagram of a communication system supporting video streaming in accordance with aspects of the invention. The example communication system includes a terminal node 1635, on which an HTTP streaming client runs, and a server 1613. An access node 1625 is the node through which the terminal node 1635 is connected to the network. The access node 1625 and a gateway node 1623 are located in a serving network 1620, such as a cellular network. The gateway node 1623 connects the access node 1625 to the server 1613 via a router 1615. The server 1613 and the router 1615 are located in the internet 1610.

For a terminal node 1635, such as a cell phone, the access node 1625 is a base station, such as an eNodeB in LTE. In many descriptions herein, an access node will be used as an example of the network node on which client BO estimation is performed. However, it should be noted that the techniques described herein can be applied in estimating client BO in other network nodes, for example, the serving gateway or PDN (Packet Data Network) gateway in an LTE EPC (Evolved Packet Core) network. Similarly, the systems and methods described herein are not limited to wireless networks an may be used in other networks, for example, DOCSIS, PON, and DSL networks.

For each HTTP video streaming session in the client, the access node identifies and tracks sessions and inspects the objects belonging to the sessions. The access node estimates client BO based, in part, on the amount of media data transferred for a session over the time.

Procedures that the access node follows to manage a streaming session differ from the procedures followed by the client in managing a playback session (e.g., as described with reference to FIG. 12 and FIG. 13). For example, an HTTP streaming client selects a segment URL from a list of segment URLs of one of the representations in a manifest file. When the packets of the segment arrive, they can be sent to the application based on the port number which is associated with the application that opens the connection for packet transmission. In contrast, the access node can see the packets exchanged between the client and the server, but it does not have the application information of the streaming client in the terminal node, so it relies on the information in the packets to understand the client behavior.

Figure 17:
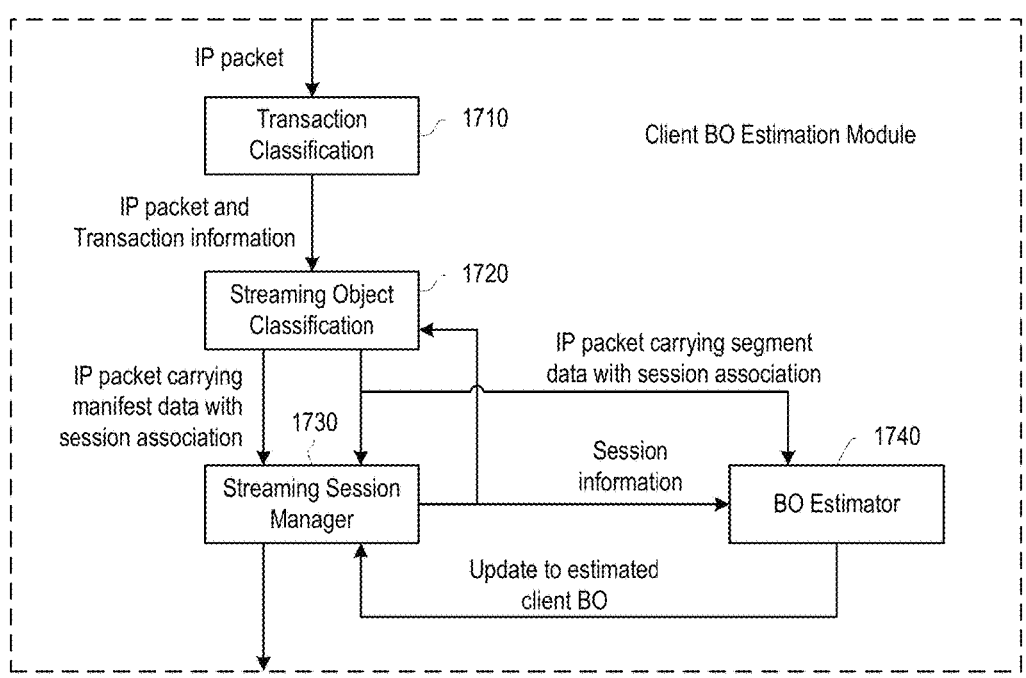
FIG. 17 is a functional block diagram of a client BO estimation module in accordance with aspects of the invention.

FIG. 17 is a functional block diagram of a client BO estimation module in accordance with aspects of the invention. The client BO estimation module may implement the buffer occupancy estimation module 628 of the QoE enhancement module 610 of FIG. 7. The client BO estimation module may also implement functions of the timing information module 627 and the detection/classification module 625. The client BO estimation module of FIG. 17 may be a module provided, for example, in the access node of FIG. 2 by the processor module 281 using instructions from the storage module 283.

By way of introduction, the client BO estimation module includes:
  a transaction classification module 1710 that inspects IP packets to identify HTTP transactions that are transferring objects of interest;
  a streaming object classification module 1720 that inspects HTTP transactions for information related to HTTP video streaming and associates the payloads of HTTP response messages with existing streaming sessions;

a streaming session manager module 1730 that takes the manifest and segment information, which are extracted in the streaming object classification module 1720, along with other parameters as inputs to create and maintain a set of current streaming sessions; and a BO estimator module 1740 that processes segment packet data to estimate client BO for HTTP streaming sessions being played on the client.

An HTTP transaction includes a request sent from a client on the terminal node to a server and a response message sent from the server to the client. Table 9 lists an example of an HTTP transaction which results in the transfer of one Apple HTTP Live Streaming playlist file from the server to the client.

TABLE 9

HTTP Request (GET) and Response Example

| HTTP | Request line | GET /hls/playlist.m3u8 HTTP/1.1 |
|---|---|---|
| Request from Client | Request message header fields | Host: www.somecompany.com:80<br>Connection: keep-alive<br>User-Agent: Mozilla/5.0 (Windows NT 6.1; WOW64) AppleWebKit/534.24 (KHTML, like Gecko) Chrome/11.0.696.65 Safari/534.24<br>Accept: application/xml,application/xhtml+xml,text/html;q=0.9, text/plain;q=0.8,image/png,*/*;q=0.5<br>Accept-Encoding: gzip,deflate,sdch<br>Accept-Language: en-US,en;q=0.8<br>Accept-Charset: ISO-8859-1,utf-8;q=0.7,*; q=0.3 |
| | Message body | (Optional, not present in this message) |
| HTTP Response from Server | Status line | HTTP/1.1 200 OK |
| | Response message header fields | Date: Mon, 09 May 2011 17:55:26 GMT<br>Content-Type: application/vnd.apple.mpegurl<br>Server: FlashCom/3.5.4<br>Cache-Control: no-cache<br>Content-Length: 142 |
| | Message body | (Playlist file "playlist.m3u8" returned) |

An HTTP request message may be formed with different methods, such as "GET", "PUT", "POST", and "DELETE", etc. This specific example uses method "GET", which is the method for downloading a file from the server, and it is the method used by an HTTP streaming client for either requesting a manifest file or a segment file. The string "/hls/playlist.m3u8" that follows the method "GET" on the request line is the Request-URI according to the terminology defined in HTTP specification. It identifies a file on the host which is indicated by the value of the "Host" field, www.somecompany.com:80. The complete URL of the file, "http://www.somecompany.com:80/hls/playlist.m3u8", is formed with both the host and Request-URI. Herein, URI and URL may be used interchangeably to indicate a formatted string that identifies a resource with the information related to its location. The URL of an object requested may refer to Request-URI or the complete URL formed with host and Request-URI.

The HTTP messages are usually transferred using TCP protocol. The request message and response message of the same transaction are transferred through the same TCP connection between the client and server. Each HTTP transaction may be transferred through a unique TCP connection or multiple HTTP transactions may share one TCP connection.

Figure 18:
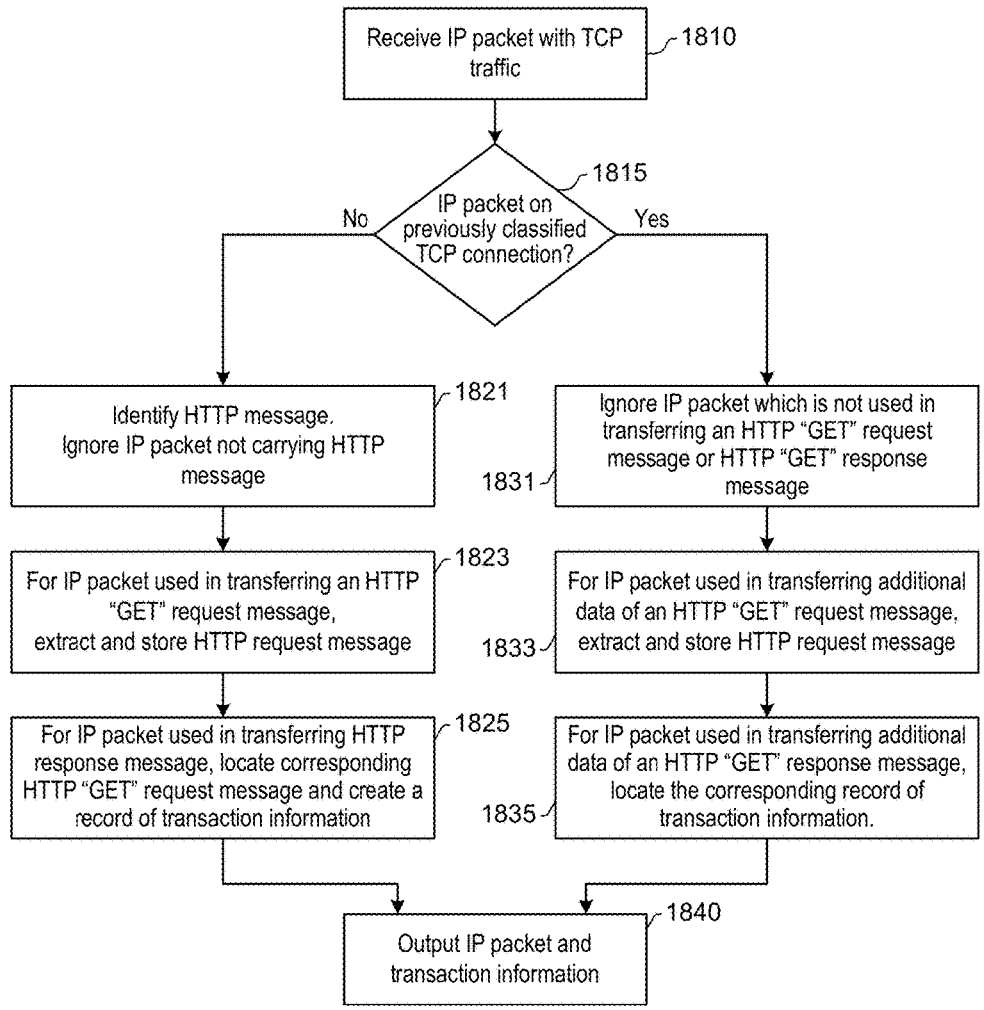
FIG. 18 is a flowchart of a process for extracting transaction information in accordance with aspects of the invention.

FIG. 18 is a flowchart of a process for extracting transaction information in accordance with aspects of the invention. The process may be performed by the transaction classification module 1710.

In step 1810, a new IP packet is received. In step 1815, the process determines whether the received IP packet carries a TCP segment on a TCP connection previously identified to be carrying an HTTP transaction. In step 1815, similar to other steps described herein, the analysis or inspection of packets to determine information about the packets (and related transactions, messages, sessions, and the like) may be performed on a subset of the packets and information from packets communicated in one direction (e.g., upstream) may be used to determine information about packets communicated in another direction (e.g., downstream). This may be accomplished, for example, by comparing all or a subset of information in the TCP/IP 5-tuple information (protocol, client IP address, client TCP port number, server IP address, and server TCP port number). The transaction classification module 1710 may maintain a list of all HTTP transactions already identified and their associated TCP/IP 5-tuple and use this information in classifying future IP packets. If the received IP packet carries a TCP segment on a TCP connection previously identified to be carrying an HTTP transaction, the process continues to step 1831; otherwise, the process continues to step 1821.

In step 1821 (reached when the received IP packet does not carry part of an HTTP message belonging to an HTTP transaction that has previously been identified), the process inspects the payload of the TCP segment carried in the IP packet to check whether it carries part of a new HTTP message. This may be achieved by checking the beginning of the payload of the TCP segment for an HTTP message header having a specific format (e.g., as listed in Table 9). If the IP packet does not carry part of a new HTTP message, the IP packet is ignored. The transaction classification module 1710 may perform no further processing for such packets.

In step 1823, the process, when the TCP segment carries part of a new HTTP message, further examines the TCP segment to determine whether the new HTTP message is an HTTP "GET" request message. If the new HTTP message is an HTTP "GET" request message, the HTTP message is stored and information, such as host and URL of the requested object, is extracted and stored.

In step 1825, the process, when the new HTTP message is not an HTTP "GET," examines the TCP segment to determine whether the new HTTP message is an HTTP response message corresponding to an HTTP "GET" request message previously detected in the opposite direction of the TCP connection. If so, a new HTTP transaction is determined and recorded in the transaction classification module 1710 and the IP packet and the transaction information are then output (step 1840) by the transaction classification module. If not, the HTTP message's classification information is recorded and may be used for classifying future IP packets.

In step 1831 (reached when the received IP packet is on a TCP connection used to transfer an HTTP message that has previously been identified), the process determines whether the IP packet is used in transferring an HTTP message which is neither an HTTP "GET" request message nor an HTTP "GET" response message. For such packets, the packet is ignored and the transaction classification module may perform no further processing for the new packet.

In step 1833, when the HTTP message is an HTTP "GET" request message, the process extracts the HTTP message from the IP packet. Information such as host and Request-URI of an objected being requested is extracted from the HTTP "GET" request message.

In step 1835, when the HTTP message is an HTTP "GET" response message, the process retrieves transaction information corresponding to the transaction. The IP packet and the transaction information are output for further processing. Thereafter, the IP packet and the transaction information are then output (step 1840) by the transaction classification module.

In the process of FIG. 18, the IP packet may be an IP packet in the forward direction (e.g., from server to client) carrying a TCP segment that contains all or part of the HTTP message or an IP packet in the reverse direction (e.g., from client to server) carrying a TCP ACK.

The transaction classification module 1710 outputs transaction information along with the IP packet that is used in transferring information of this transaction. Examples of transaction information include client IP address, client TCP port number, server IP address, server IP port number, and URL of the HTTP request. With the IP packet used in transferring either the request message or the response message, the transaction classification module 1710 can also output packet-level transport information. Examples of packet-level transport information include the TCP sequence number, TCP ACK sequence number, and the amount of payload.

Figure 19:
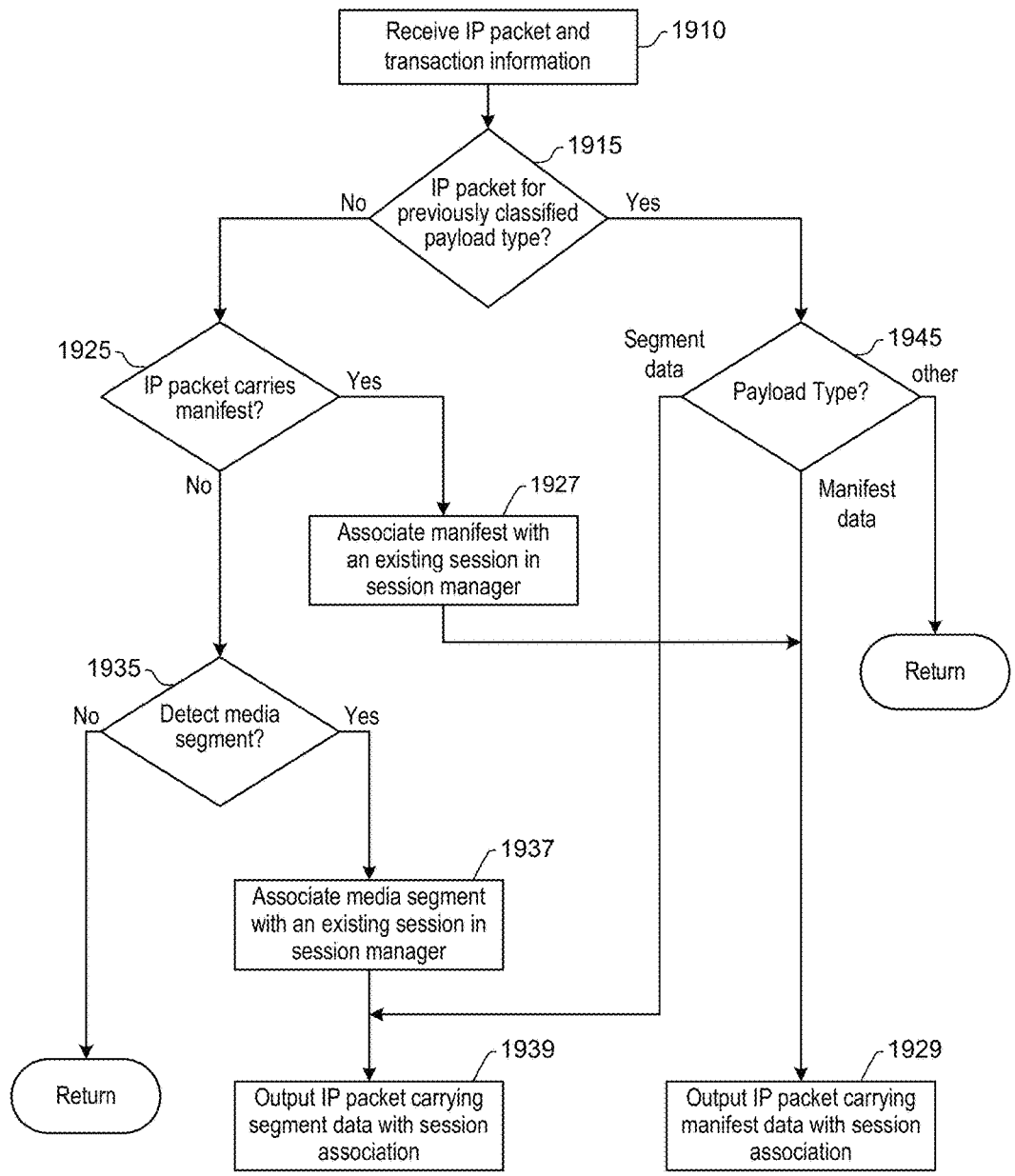
FIG. 19 is a flowchart of a process for classifying streaming objects in accordance with aspects of the invention.

FIG. 19 is a flowchart of a process for classifying streaming objects in accordance with aspects of the invention. The process may be performed by the streaming object classification module 1720.

In step 1910, an IP packet and associated transaction information is received. For example, the streaming object classification module 1720 may receive the IP packet and transaction information from the transaction classification module 1710.

In step 1915, the process determines whether the IP packet is related to a transaction whose payload type has already been classified and session association has been performed. In performing session association, it is determined whether or not the payload is associated with an existing session. The result of the session association process may be that the packet is not associated with a session which may result, for example, in the session association having a null value. If the IP packet is related to a transaction whose payload type has already been classified and session association has been performed, the process continues to step 1945; otherwise, the process continues to step 1925.

In step 1925 (reached when the IP packet is related to a transaction whose payload type has not been classified), the process classifies the payload of the HTTP response message to determine whether it contains manifest related information. Examples of how this may be performed are described below. If the payload contains manifest related information, the process continues to step 1927; otherwise, the process continues to step 1935.

In step 1927 (reached when the payload has manifest related information), the process tries to associate the manifest with an existing session by checking session information from the streaming session manager module 1730 as described further below. There may or may not be a session that is associated with the manifest file. An IP packet carrying manifest data and its session association will be sent to the streaming session manager module for further processing. If a manifest file is not associated with any session, a new session may be created depending on the type of manifest file. This is described below with further description of the streaming session manager module. Thereafter, the process continues to step 1929.

In step 1935 (reached when the payload does not contain manifest related information), the process determines whether the payload contains a media segment, If the payload does not contains a media segment, process ignores the IP packet and returns. This may occur when the packet is for a payload that is not related to HTTP streaming (e.g., the transaction has a payload that is neither a manifest nor a media segment). If the payload contains a media segment, the process continues to step 1937.

In step 1937 (reached when the payload has media segment related information), the process tries to associate the media segment with an existing session, for example, by checking session information from the streaming session manager module. IP packet carrying media segment data and its session association will be sent to the streaming session manager module 1730 for further processing. If a media segment is not associated with any session, the IP packet may be ignored. Thereafter, the process continues to step 1939.

In step 1945 (reached when the IP packet is related to a transaction whose payload type has been previously classified), the process checks the payload type. If the payload type is segment data, the process continues to step 1939; if the payload types is manifest data, the process continues to step 1929; otherwise, the process ignores the IP packet (the payload is not related to HTTP streaming) and returns.

Various methods to process the object in the payload may be used individually or in combination. One method is to detect whether the payload has an object of a certain type, such as a media segment, and if an object of a certain type is detected, the streaming object classification module 1720 will try to associate the object with an existing session by checking session information from the streaming session manager module. Using another method, the streaming session manager module may try to associate the payload directly with an existing session by comparing the URL of the object with the URLs of objects of that type in a presentation.

In step 1929 (for IP packets carrying manifest data), the IP packet and its session association are output. For example, the streaming object classification module 1720 may output the packet carrying manifest data and session association to the streaming session manager module 1730.

In step 1939 (for IP packets carrying media segment data), the IP packet and its session association are output. For example, the streaming object classification module 1720 may output the packet carrying segment data and session association to the streaming session manager module 1730 and the BO estimator module 1740.

Techniques for detection of manifest files, for example in step 1925 and step 1945, will now be described in more detail. The presence of a manifest file in an HTTP response message can be detected based on multiple pieces of information. The various pieces of information may be used individually or in various combinations.

A first type of information that may be used to detect manifest files is "Content-Type" header field in an HTTP response message. For example, the MPD (Media Presentation Description) file, which is the manifest file in MPEG/3GPP DASH, is returned in an HTTP response message which has "Content-Type" field value set to "application/dash+xml". 3GPP DASH supports updating MPD with MPD delta file. The HTTP response message containing the MPD delta file has "Content-Type" header field value set to "application/dashdelta". In Adobe HTTP dynamic streaming, the manifest file is returned in HTTP response message with "Content-Type" header field value set to "application/f4m". In Apple HTTP live streaming, the manifest file is called playlist file. There are two different types of playlist files, master playlist file and media playlist file. The "Content-Type" header field in the HTTP response message for both playlist file types should be set to "application/vnd.apple.mpegurl".

Some HTTP server implementations may not set "Content-Type" header field properly in the response message carrying manifest file, or some HTTP streaming protocol variants may not have strict requirements on setting "Content-Type" header field. For example, "Content-Type" header field in the HTTP response message may be set to "text/xml" for an HTTP video streaming variant using manifest of XML file format. In this case, the streaming object classification module 1720 can inspect the beginning of the payload of the HTTP response message to verify whether it has a manifest file.

Even if the "Content-Type" header field value of the HTTP response message indicates that the payload of the message is a manifest file, it may be useful for the streaming object classification module 1720 to inspect if the file is indeed a manifest file, for example, to improve the robustness of the system.

A manifest file is usually a text file with unique tokens at the beginning. The presence of a token may be used to determine whether the payload of an HTTP response message has a manifest file or not. For example:
- a MPEG/3GPP DASH file is an XML file and its root element is <MPD>; and
- a playlist file, either master playlist file or media playlist file, of Apple HTTP live streaming starts with a line "#EXTM3U".

Other methods exist to detect or validate the file type or the correctness of the file and these methods may be employed in addition to or instead of the methods described above.

Some HTTP streaming protocols have an option of using a multi-level manifest. An example of a multi-level manifest used by Apple is listed in Table 8. Manifest files of a multi-level manifest usually have the same "Content-Type" in the HTTP header field and have similar payload file formats. These characteristics allow the streaming object classification module 1720 to associate multiple multi-level manifest files with the appropriate streaming session.

Similar to the discussion of client behavior for updating manifest files (see, e.g., FIG. 14 and related description), the client BO estimation module may also update manifests. The streaming session manager module 1730 takes various approaches for detecting manifest updates including: (a) based on special tokens used in each manifest update file; or (b) by checking whether the URL of the current file is equal to the URL of an MPD (or more generally, a manifest) update in the initial manifest file. The second approach does include inspecting the payload content. Further details about using the URL in determining whether payload has the manifest file are described below.

Determining whether the payload of an HTTP response message contains a media segment may include inspecting the "Content-Type" header field, payload content, or both. Table 10 lists the "Content-Type" header field in an example HTTP response message containing a media segment for different HTTP streaming protocols. An HTTP response message that contains, for example, one of the header fields listed in Table 10 may be determined to carry a media segment payload.

TABLE 10

Content-Type Header Field Value in HTTP Response Message Carrying a Media Segment

| Content-Type | Description |
| --- | --- |
| video/mp4 | ISOBMFF (ISO Base Media File Format) based MPEG-4 media container file |
| video/3gpp | ISOBMFF based 3gpp media container file |
| Video/3gpp2 | ISOBMFF based 3gpp2 media container file |
| video/x-flv | Adobe flash video file format |
| video/MP2T | MPEG-2 transport stream format |

The payload in an HTTP response message may also be inspected to determine whether it contains a media segment. A file containing a media segment may start with some unique pattern. For example, any file of a format derived from ISOBMFF starts with an "ftyp" box, which has the structure listed in Table 11. To determine that the payload may contain a media segment in a file of format derived from ISOBMFF, for example, a detect media segment function may search for the presence of the character string "ftyp."

TABLE 11

Box "ftyp" in a File of Format Derived from ISOBMFF aligned(8) class FileTypeBox
    extends Box('ftyp') {
        unsigned int(32) major_brand;
        unsigned int(32) minor_version;
        unsigned int(32) compatible_brands[ ]; // to end of the box
} major_brand - is a brand identifier
minor_version - is an informative integer for the minor version of the major brand
compatible_brands - is a list, to the end of the box, of brands For example, the first 16 bytes of a file of mp4 file format, which is derived from ISOBMFF, are listed in Table 12. The first row is the position of each byte in a file. The first byte of the file has position equal to 1, and so on. The second row is the value of each byte. The last row lists the character if the byte value on the second row can be mapped to a readable character. The first four bytes are the length of "FileTypeBox", including the length field itself. The next four bytes are always "ftyp" for a file of a format derived from ISOMBFF. The following four bytes, "mp42", indicates that this is a file of MP4 file format.

TABLE 12

Beginning of an Example MP4 File

| | | | | | | | | Position | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| Byte | | | | | | | | | | | | | | | |
| 00 | 00 | 00 | 18 | 66 | 74 | 79 | 70 | 6D | 70 | 34 | 32 | 00 | 00 | 00 | 01 |
| Character | | | | f | t | y | p | m | p | 4 | 2 | | | | |

Alternatively or additionally, if the URL in an HTTP transaction carrying an object is equal to one of the media segment URLs in a session in streaming session manager module, this object may be deemed a media segment. Further details about using the URL in determining whether a payload has a media segment are described in below.

Figure 21:
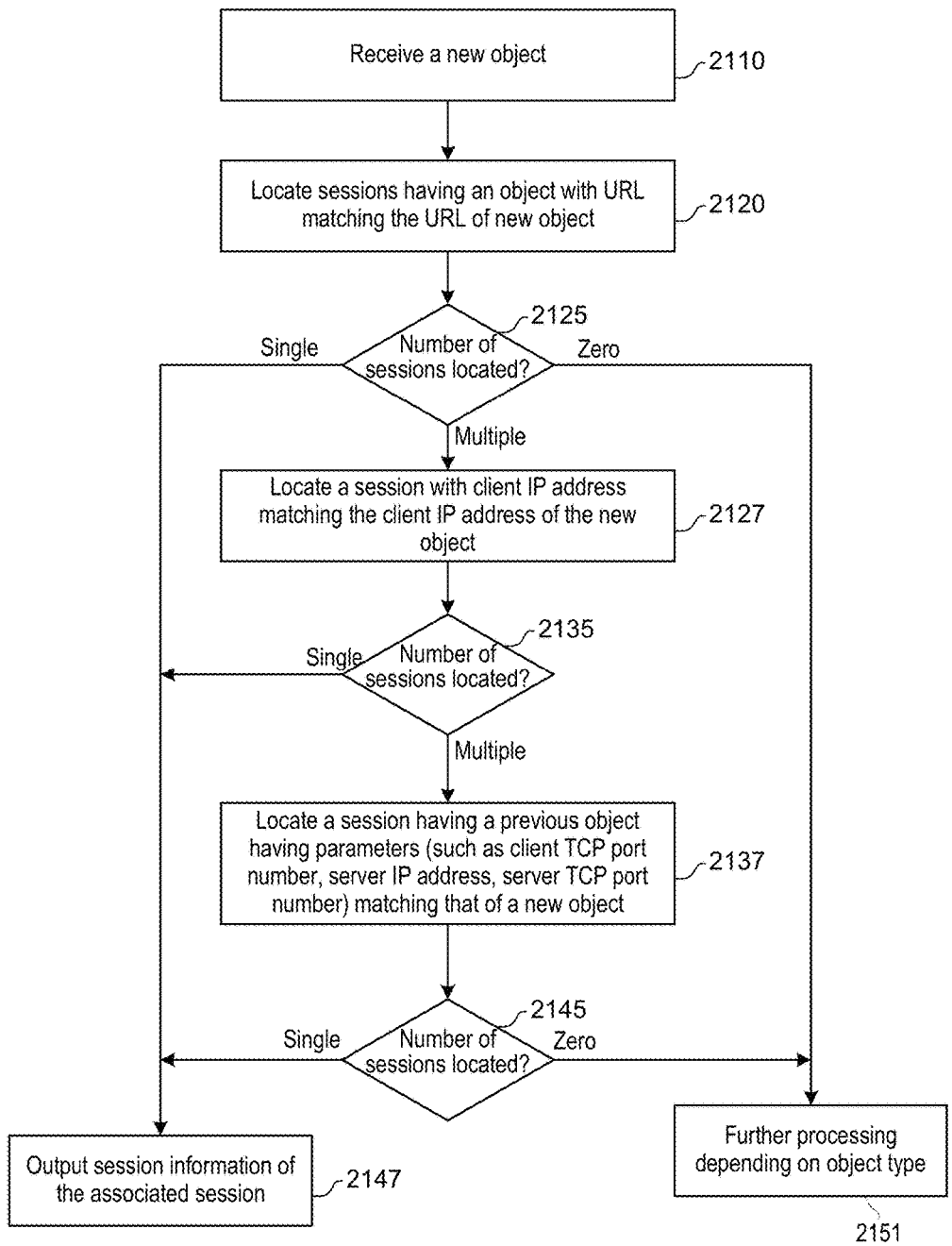
FIG. 21 is flowchart of a process for associating a new object with a streaming session in accordance with aspects of the invention.

FIG. 21 is flowchart of a process for associating a new object (containing a manifest file or a media segment) with an already established streaming session in accordance with aspects of the invention. The process will be described with reference to the streaming session manager module 1730 of FIG. 17; however, various embodiments of the process may be applied to any suitable apparatus.

Figure 20:
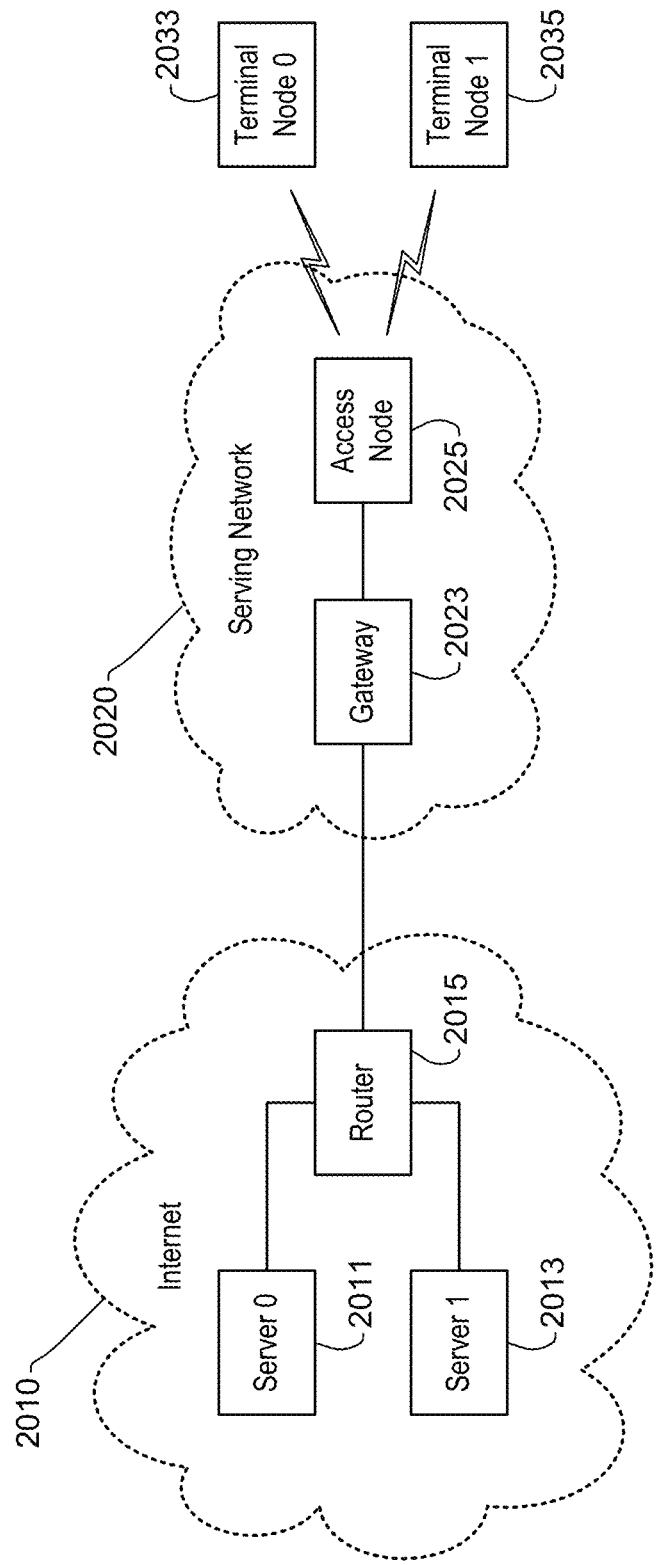
FIG. 20 is a block diagram of a communication system supporting concurrent video streaming in accordance with aspects of the invention.

Aspects of associating an object with a streaming session may be understood by reference to FIG. 20 which is a block diagram of a communication system supporting concurrent video streaming in accordance with aspects of the invention. The example communication system includes multiple terminal nodes 2033, 2035 connected to the same access node 2025 (which is performing client BO estimation). Each terminal node 2033, 2035 may have multiple HTTP video streaming clients running. Each HTTP video streaming client may request streaming data, including manifest and segments, from more than one server 2011, 2013. Also, multiple HTTP streaming clients on the same terminal node 2033, 2035 may play the same video presentation from the same servers 2011, 2013. The access node 2025 and a gateway node 2023 are located in a serving network 2020, such as a cellular network. The gateway node 2023 connects the access node 2025 to the servers 2011, 2013 via a router 2015. The servers 2011, 2013 and the router 2015 are located in the internet 2010.

In step 2110, the process receives a new object. For example, the streaming session manager module 1730 may receive the new object from the streaming object classification module 1720. In step 2120, the URL of the new object is compared to the URLs associated with existing sessions to locate matching sessions.

In step 2125, the number of existing sessions with URLs matching the URL of the new object is determined. If the number of existing sessions with matching URLs is one, the process continues to step 2147 where the object is associated with that session. If the number of existing sessions with matching URLs is zero, the process continues to step 2151 for further processing depending on the object type.

If the number of existing sessions with matching URLs is two or more, the process continues to 2127. Multiple existing sessions with matching URLs may occur, for example, in the scenario depicted in FIG. 20 where more than one session on one or more terminal nodes, which connect to the same access node, are playing the same video. In this and other scenarios, the URL matching of step 2120 may not be sufficient to uniquely locate the associated session.

In step 2127, the process works to resolve the ambiguity when the URL of the object matches multiple sessions by comparing the client IP address of the TCP connection used in transferring the object with the client IP addresses of the matched sessions. In step 2135, the number of existing sessions located in step 2127 with client IP address matching the client IP address of the TCP connection used in transferring the object is determined. If a single session is located in step 2127, the process continues to step 2147; otherwise, the process continues to step 2137.

In step 2137 (reached when more than one session is located that has client IP address matching the client IP address of the object), the process considers additional parameters of the object to locate the session associated with the object. The additional parameters, such as client TCP port, server IP address, and server TCP port number of the TCP connection used in transferring the object, are compared with the corresponding parameters of the TCP connection used in transferring previous objects of the sessions located in step 2135. An object may be determined to be associated to a session having an equivalent set of the additional parameters.

In step 2145, the number of existing sessions located in step 2137 with matching additional parameters is determined. If a single session is located in step 2137, the process continues to step 2147; otherwise, the process continues to step 2151. The latter situation, that there is more than one session that has the same client IP address matching that of the new object, but there is no session that has the additional parameters matching that of the new object, may happen, for example, when multiple applications on one terminal node are playing the same video and the objects in the same session are transferred through different TCP connections.

In step 2147 (reached when a single session has been located), the session information of the associated session is output. For example, the streaming session manager module 1730 may supply the session information to the streaming object classification module 1720 and to the BO estimator module 1740.

In step 2151, further processing is performed to associate the object with a session. The processing may differ depending on whether the object is a manifest file or a media segment.

Continuing step 2151, when the object is a manifest for a presentation with a single manifest or a master manifest for presentation with multi-level manifest, information such as (a) a unique session ID, (b) a local timestamp when the manifest is received by the access node, and (c) the session's associated parameters, can be used by the streaming session manager module 1730 to create a new session. This processing may help accommodate the scenario where a single terminal node has two clients playing the same presentation.

The process, when the object is a media manifest for a presentation with a multi-level manifest and there is more than one session that may be associated with the media manifest, may select the session with a master manifest whose local timestamp (which indicates the time when the master manifest is received) is closer to the local timestamp (which indicates the time when the media manifest is received) of the media manifest. Alternatively, the manifest may be associated with all sessions having an associated master manifest with the URL of this manifest. Alternatively, the process may associate the manifest with those sessions having an associated master manifest with the URL of this manifest, but that have not received a copy of this manifest file.

The process, when the object is a manifest update for an HTTP streaming protocol using a dynamically updated manifest, the manifest update will be associated with any such session that has not received a copy of this media manifest update file.

Continuing step 2151, when the object is a new segment that the streaming object classification module just detected, the earliest playback time (EPT) of the new segment may be compared with the earliest playback time (EPT) of the last segment transferred in each session. As used herein the EPT may generally refer to the playback time of the first playable sample of the segment. For example, if the sum of the earliest playback time, EPT(n, i), of the last segment "i" in a session "n" and duration of that last segment, D(n, i), EPT(n, i)+D(n, i), is equal to the earliest playback time of the new segment "c", EPT(c), then new segment "c" may be associated with session "n". The earliest playback time and duration of a segment may be determined, for example, from the information in a manifest or information in a media file if the manifest information is part of media file.

An HTTP streaming client may use an algorithm that avoids switching between representations of very different qualities to improve the Quality of Experience, so another check that may be performed is to compare the representation index of the new segment with that of the last segment in a session. For example, the representations of a presentation may be indexed in such a way that a representation of a larger index has a higher quality than a representation of a smaller index. If the representation index of the last segment in a session matches or is close to the representation index of the new segment, this session may be selected. Both additional checks are heuristic. They may be combined to provide a rating on the sessions. The session with the best overall match may then be selected.

Figure 22:
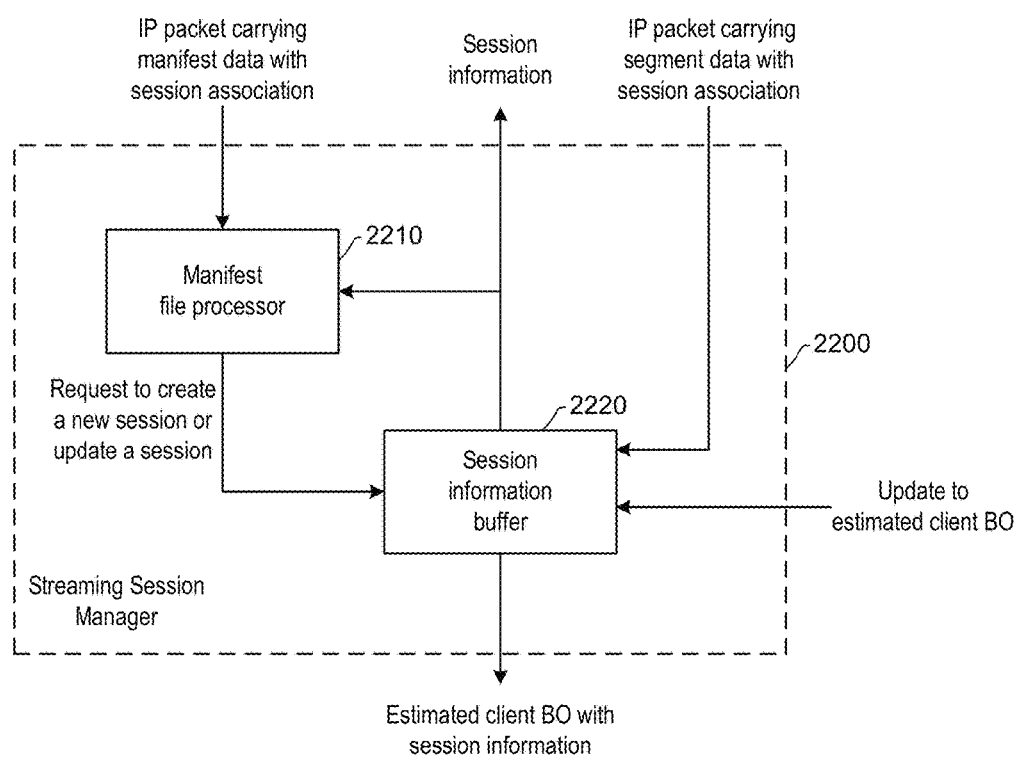
FIG. 22 is a block diagram of a streaming session manager module in accordance with aspects of the invention.

FIG. 22 is a block diagram of a streaming session manager module in accordance with aspects of the invention. The streaming session manager module 2200 may implement the streaming session manager module 1730 of the client BO estimation module of FIG. 17. The streaming session manager module 2200 processes the manifest file and segment information (which may include session association information) to track and manage the streaming sessions. The streaming session manager module 2200 includes a manifest file processor module 2210 and a session information buffer 2220.

The manifest file processor module 2210 extracts from the manifest file the manifest information about a presentation. Examples of manifest information include URLs of additional manifest files (which may be manifest files in a multi-level manifest or manifest files in a temporal update), number of representations, and URLs of media segments in each representation. If a manifest file without session association is received, information derived from the manifest by manifest file processor module 2210 will be sent to the session information buffer 2220 for creating a new session. If the manifest file is either a media manifest of a multi-level manifest or a manifest update of a temporally updated manifest, a session with which the manifest file is associated can be updated with the information from the manifest file.

Figure 23:
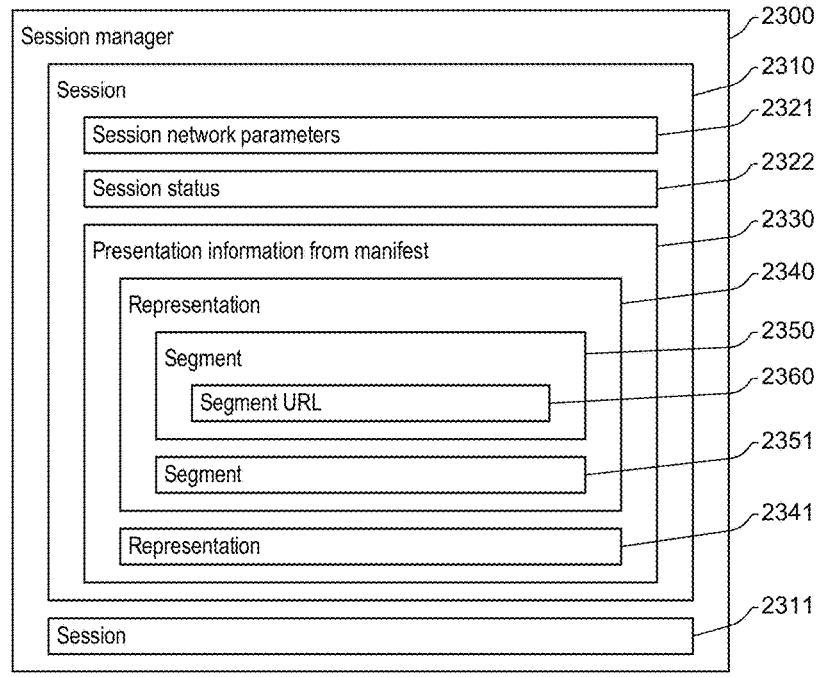
FIG. 23 is a diagram of a data structure for use with a streaming session manager in accordance with aspects of the invention.

The session information buffer 2220 maintains the streaming sessions detected in the network node that is performing estimation of client BO for HTTP streaming applications. FIG. 23 is a diagram of a data structure for use with a streaming session manager in accordance with aspects of the invention. FIG. 23 shows an example data structure 2300 maintained in the session information buffer for sessions 2310, 2311. The session information may include session network parameters 2321, session status 2322, and the presentation information 2330 (including representation information 2340 with segment information 2350, 2350 with segment URL information 2360) parsed from the manifest file. The session information buffer 2220 may maintain information for multiple streaming sessions, each having unique characteristics and states.

The session network parameters 2321 may include the client IP address and a list of host names and IP addresses of the servers that contribute to the streaming session. The session network parameters 2321 may also include client TCP port number, server IP address, and server TCP port number of the TCP connection used in transporting the previous object, or all previous objects. The client IP address is initialized when the manifest file for a presentation with single manifest file, or a master manifest file for a presentation with more than one file related to manifest, is detected.

Examples of information in the session status 2322 include the URL of the manifest file, segments that have already been transferred, and current estimated client BO for the session. Presentation information 2330 for each session is obtained from the manifest file and stored in the session information buffer 2220. This information may include all or a subset of information from manifest.

The segment URL information 2360 of each segment 2350, 2351 may be explicitly listed in the manifest file. The DASH MPD file in Table 7 shows such an example for the first period of the presentation. Alternatively, segment URL may be derived from a template for some HTTP streaming protocol variants like DASH. The DASH MPD file in Table 7 shows how a template may be used in deriving segment URLs for the second period of the presentation.

The streaming session manager module 1730 may remove an HTTP streaming session, for example, if the session is created unnecessarily or its corresponding session on the client ends. A manifest file transported by a network node may not always be a result of an HTTP streaming client starting a new HTTP streaming session. For example, a file downloading application may download a manifest file using HTTP as a part of a normal file transfer with no intent to initiate a streaming session. A time-out mechanism may be used to remove such an HTTP streaming session from the streaming session manager module 1730 if no media segment is detected for this HTTP streaming session after a certain period of time.

An HTTP video streaming session on the client side may end when the playback reaches the end of a presentation. The network node can detect such an ending of the session based on the presentation duration, which is often signaled in the manifest file, and upon detection of the last segment of a representation. For a presentation that does not change after the streaming session is started, there are a finite number of media segments in each representation. In one implementation, an HTTP video streaming session in the streaming session manager module 1730 may be removed when the last segment of a representation is detected. In some cases, the user may play the same video again from some point even after the end of presentation time has been reached. Some client implementations may not download the manifest file again. So in another implementation, the HTTP video streaming session may be kept in the streaming session manager module for some period of time even after the network node has transferred the last segment of a representation.

There are some scenarios that the streaming session manager module 1730 cannot rely on the detection of the last segment of a representation to determine that the client has reached the end of a session. One scenario is that a client may stop its session before the last segment of a representation is requested. Another scenario is that the duration of a presentation may not be signaled in the manifest file. The presentation of a live event is one such example. For such scenarios, the time-out mechanism may also be used to remove such an HTTP streaming session from the HTTP streaming session manager module if the client has not requested a media segment after a certain period of time.

The BO estimator module 1740 utilizes information from the streaming object classification module 1720 and the streaming session manager module 1730 to perform client BO estimation.

Figure 24:
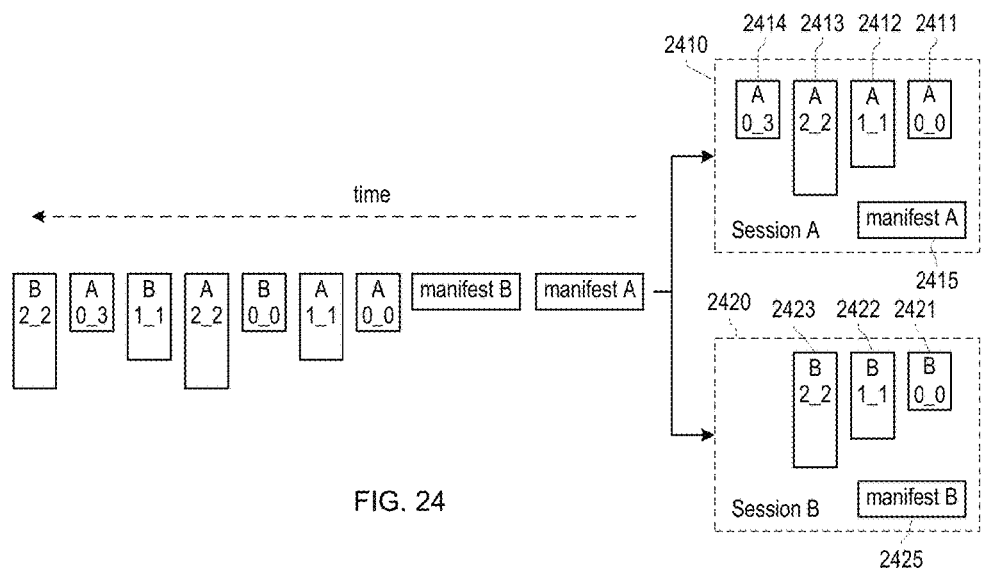
FIG. 24 illustrates an example of classifying streaming objects into sessions in accordance with aspects of the invention.

Aspects of the client BO estimation module may be understood by reference to FIG. 24 which illustrates an example of classifying streaming objects into sessions in accordance with aspects of the invention. FIG. 24 illustrates a first ("A") streaming session 2410 and a second ("B") streaming session 2420 that operate concurrently. The first streaming session 2410 requests and receives a first manifest 2415, a first segment 2411 from a first representation, a second segment 2412 from a second representation, a third segment 2413 from a third representation, and a fourth segment 2414 from the first representation. The second streaming session 2420 requests and receives a second manifest 2425, a first segment 2421 from a first representation, a second segment 2422 from a second representation, and a third segment 2413 from a third representation. In the example streaming of FIG. 24, the manifest are received in the order illustrated: the first manifest 2415, the second manifest 2425, the first segment 2411 of the first streaming session 2410, the second segment 2412 of the first streaming session 2410, the first segment 2421 of the second streaming session 2420, the third segment 2413 of the first streaming session 2410, the second segment 2422 of the second streaming session 2420, the fourth segment 2414 of the first streaming session 2410, and the third segment 2413 of the second streaming session 2420.

Through the transaction classification module 1710, the streaming object classification module 1720, and the streaming session manager module 1730, the network node obtains information pertaining to each streaming session that may be considered equivalent to the information received and consumed by the client. The BO estimation module can then inspect IP packets that are used in transferring segments to obtain further information such as the TCP sequence numbers, TCP ACK sequence numbers, and the amounts of payload to perform client BO estimation. Alternatively, another module may obtain this further information and supply it to the client BO estimation module. The client BO estimation may be performed at the segment level by only using the earliest playback time and the duration of the segments. The BO estimation may also be performed at a level of finer granularity at the sample level, for example, using algorithms described with reference to FIGS. 6-9. These algorithms may also be extended to a media container file using other syntax elements.

Figure 25:
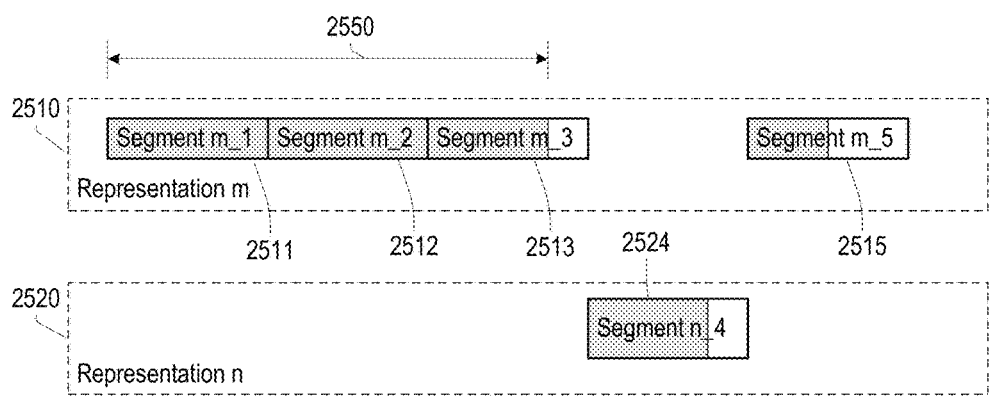
FIG. 25 illustrates an example of concurrent fetching of multiple segments in accordance with aspects of the invention.

FIG. 25 illustrates an example of concurrent fetching of multiple segments in accordance with aspects of the invention. Instead of requesting one segment at a time, a streaming client may open multiple connections concurrently to one or more servers and request one segment on each connection. In this scenario, the streaming session manager module may see multiple segments with each segment partially transferred. In this scenario, the most recent sample of the oldest partial segment can be used to update the client BO estimate.

In the example of FIG. 25, a first segment (m_1) 2511 from representation "m" and a second segment (m_2) 2512 from representation "m" have been fully transferred and a third segment (m_3) 2513 from representation "m," a fourth segment (n_4) from representation "n," and a fifth segment (m_5) from representation "m" have been partially transferred. The BO estimator module 1740, in an embodiment, updates its estimates using the most recent sample of the oldest partial segment, which is the third segment (m_3) 2513.

In addition to linearly playing a steaming session, a video client may perform a seeking operation that changes the playback position. The new playback position may be after the current playback position (forward seeking) or before the current playback position (backward seeking). The streaming session manager module 1730 may detect a seeking operation by monitoring the earliest playback time of the segment being requested for each session and detecting deviations from a sequential increase of the playback time of the segments. Even though the segments from different representations may be requested, segments requested are always sequential (the earliest playback time of the segment being requested should be equal to the earliest playback time of the previous segment requested plus the playback duration of the previous media segment) in playback time during a normal playback process. In the case when multiple segments are being requested concurrently, the segments being transferred may be ordered by the earliest playback time of each of these segments. During continuous (non-seeking) playback, there should not be a gap in the playback time between any two segments.

If the user seeks forward to a point that is ahead of the last segment transferred, the client may fetch a segment causing a gap in playback time between the segment being requested and the segment previously requested. The client BO estimation module in the access node may detect such a gap and conclude that the client has performed a forward seeking operation. The client will re-buffer the media data by fetching segments starting from the new playback position. In this case the new playback position is treated as the point when buffering is reset, and the client BO estimation process may be restarted as if the new playback position is the beginning of a playback session.

If the user seeks backward, the client may fetch a segment whose earliest playback time is earlier than that of the previous segment fetched. The client BO estimation module in the access node may detect such an event (a reverse in decoding timestamps) and conclude that the client has performed a backward seeking operation. The client may re-buffer the media data by fetching segments starting from the new playback position. In this case the new playback position is treated as the point when buffering is reset, and client BO estimation process may be restarted as if the new playback position is the beginning of a playback session.

Functions provided by the client BO estimation module may incur significant computation load. For example, when the session information buffer 2220 stores information for many sessions that each have a long list of segments, associating a new object with one of these existing sessions could include a comparing information for many or all of the segments. Efficient techniques for implementing these functions are thus valuable.

Searching for a URL in a list of URLs is a common operation in several modules. For example, an object, which may be a manifest file or a media segment file, may be associated with a session by comparing the URL of the object with the URLs maintained in the streaming session manager module 1730. Also, to identify which representation within a presentation a segment belongs to, the segment URL is compared with a list of URLs each of a segment for all segments in a presentation.

Computational challenges in a URL comparison process include that a URL is usually long and comparing two long strings can take significant computation resources. An additional computational challenge is that there could be many URLs that the URL of an object can be compared with. For example, if a 2-hour movie is encoded into 6 representations containing 4-second segments, there may be 10800 segment URLs. In addition, there may be many concurrent sessions detected in a network node. Thus, efficient implementation of this URL comparison process is valuable.

One technique for efficient URL comparison is to shorten the strings used for comparison. This can be achieved by extracting the common part of all strings in the same category and making the string comparison a multiple step process, with the first comparison to put the string into a certain category and the second comparison to identify the specific URL within the category. This technique includes identifying the part in a URL that stays constant for certain category of URLs. For example, all the segment URLs in the first period of the manifest list in Table 7 either start with a prefix "http://example.com/rep 1/seg-" for the segments in the first representation or with a prefix "http://example.com/rep2/seg-" for the segments in the second representation. For a new segment received whose URL is "http://example.com/rep1/seg-1.3gp," it is only needed to compare the first 28 characters with two prefixes to tell the new segment belongs to the first representation. In addition, the last 5 characters "1.3gp" may be compared with the last 5 characters of all segment URLs in the first representation.

The technique of extracting a common string from URLs may also be used in associating the object with a session. For example, all the URLs in the example presentation start with "http://example.com/rep," and if this common part is unique among all the sessions currently in streaming session manager module, the common part is sufficient in associating an object with a session.

Another technique for efficient URL comparison is to calculate a hash value from the URL string. Since a hash value can be much shorter than the URL string and it has fixed-length, the comparison between two hash values is more efficient than the comparison between two strings directly. An example of hash function is CRC32, which generates a 32-bit number from an array of data bytes of any length. This technique of using hash value of string in string comparison may be combined with separating the URL into multiple parts. For the same example, all segment URLs share a common part "http://example.com/rep." All segment URLs are separated into this common part and a varying part, and a hash value is calculated only for the varying part. When a new segment is received, the common part is compared with the substring, whose length equals the length of the common part, of the URL of the new segment. If they match, a hash value is calculated from the remaining part of the URL.

A further optimization technique for locating a segment URL in a presentation is to construct a hash table of segment URLs and the associated parameters. The index to the hash table is the hash value calculated from either the complete URL or the partial URL as explained above. Each table entry may have the representation index and segment index for the 3-level data hierarchy (presentation, representation, and segment). Additional parameters may be added for a data hierarchy of more levels.

A further technique to reduce the searching of a segment URL is to first compare the URL of the new segment with a sub-list of URLs containing just the segments expected next for each active session.

Figure 26:
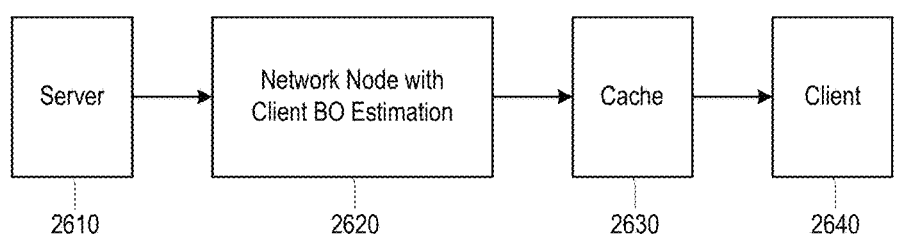
FIG. 26 is block diagram illustrating caching between an access node with client BO estimation and a client in accordance with aspects of the invention.

FIG. 26 is block diagram illustrating caching between an access node with client BO estimation and the client in accordance with aspects of the invention. A manifest file or a segment file may be cached in a terminal node. At the next time a client on the same terminal node starts a new HTTP streaming session corresponding to the same video presentation, the client may not fetch the cached file from the server, so the network node may not see all the files that the client processes for this HTTP streaming session. FIG. 26 illustrates a more general caching scenario. Client BO estimation based on HTTP streaming session classification is implemented in a network node 2620 (which performs client BO estimation). There is a cache 2630 between the network node 2620 and client 2640. The network node 2620 may not have all the information it would use to construct a complete session for performing client BO estimation when some information is retrieved from the cache 2630 rather than from the server 2610 via the network node 2620.

If the manifest file is found in the cache 2630 and returned to the client 2640 without going through the network node 2620, the network node 2620 may not be able to construct an HTTP streaming session to perform client BO estimation, if it relies on detection of the manifest file to do so.

In one implementation, the network node 2620 caches (retains for some period of time) the manifest files from all streaming sessions. When a media segment is detected that does not belong to any active sessions, the manifest files in the local cache in the network node 2620 may be inspected. The association of a media segment with a manifest file stored in a cache may be implemented in a similar fashion to the association of a media segment with an active session, as described with reference to FIG. 19.

In another implementation, the network node 2620 may disable the caching of the manifest file, so that when a client starts a new session, it will always request the manifest file which will go through the network node 2620. The network node 2620 may, for example, change a header field in HTTP response messages to prevent caching. In the example in Table 13, the network node 2620 changes a "Cache-Control" header field value in a HTTP response message carrying a manifest file from a value that allows the file be cached for 1 hour to a value that makes the message non-cacheable.

TABLE 13

Example of Changing "Cache-Control" Field
to Disable Caching of HTTP Response

| | HTTP header field | Description |
|---|---|---|
| Before | Cache-Control: max-age=3600 | Allow the response to be cached for 3600 seconds. |
| After | Cache-Control: no-cache, max-age=0 | Do not allow the response to be cached. |

The HTTP response message may also include an entity tag of an object using an "ETag" header field. The client may use the entity tag to revalidate an object it has previously received if the object is stale. The network node 2620 may remove the "ETag" field, if it is present, in an HTTP response message carrying a manifest file so that the client does not try to reuse the manifest file that it may have stored in its local cache by revalidating the content of the file.

In addition to the impact of caching of manifest files on client BO estimation, if a segment file is found in the cache 2630 and returned to the client 2640 without going through the network node 2620, the BO estimation process may also be impacted. If one or more segments at the beginning of a session are fetched from the cache 2630, the first segment that the network node 2620 sees will have its earliest playback time not equal to zero. The network node 2620 can estimate the time when the client receives the first video sample and starts playback process, even though the network node does not have access to it. If the network node sees the manifest file of the video session, the time when the manifest file is completely transferred may be used in inferring the time when the client starts playing video sample. The client and server may exchange other information related to the streaming process. For example, the same video client may request information related to DRM (digital rights management). If the manifest file is fetched from the cache, detection of the exchange of such other information (e.g., DRM information) may be used as in estimating the playback start time.

If one segment in the middle of a session is fetched from cache, the network node 2620 will detect a gap in playback time between the next segment that the client will fetch from the server and the last segment fetched from the server. The network work node may differentiate this from the forward seeking operation. Assume the network node detects the first packet of a segment of index k at time $T_k$, and the first packet of the following segment of index k+m at time $T_{k+m}$, and m is an integer that is equal to or larger than 2. The segments between segment k and segment k+m are fetched from the cache. One technique for differentiating this case from forward seeking is to compare $(T_{k+m}-T_k)$, the playback duration of segments from segment k to segment k+m−1. If they are within a threshold H, the network node can determine that the gap is caused by the caching operation. Otherwise, the network node determines that the client has performed a forward seeking operation, which will be handled as described above.

The foregoing systems and methods and associated devices and modules are susceptible to many variations. Additionally, for clear and brief description, many descriptions of the systems and methods have been simplified. For example, the figures generally illustrate one of each type of device (e.g., one access node, one terminal node), but a communication system may have many of each type of device. Similarly, many descriptions use terminology and structures of a specific wireless standard such as LTE. However, the disclosed systems and methods are more broadly applicable, including for example, in hybrid fiber-coax cable modem systems. Additionally, functions describes as being performed in particular nodes may be distributed over multiple nodes.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A network node, comprising:
a first communication module configured to communicate packets with one or more terminal nodes, the packets including packets associated with one or more streaming sessions;
a second communication module configured to provide communications with one or more video servers; and
a processor, based on an inspection of at least a subset of the packets communicated with the one or more terminal nodes, configured at least to:
determine a payload type associated with objects conveyed in packets identified with application layer messages,
associate the objects conveyed in the packets identified with application layer messages with the one or more streaming sessions, and
estimate an occupancy level of each of one or more video buffers in the one or more terminal nodes, each of the one or more video buffers being associated with one of the one or more streaming sessions, at least by utilizing decoding timestamps associated with media segments conveyed by packets communicated to the one or more terminal nodes, wherein utilizing the decoding timestamps comprising utilizing locations and a timing advancement of the decoding timestamps so as to estimate the occupancy level of the each of one or more video buffers in the one or more terminal nodes, wherein, in the case that one of the one or more streaming sessions uses multiple connections to concurrently communicate multiple media segments, the latest decoding timestamp of the oldest of the concurrent media segments communicated to the corresponding one of the one or more terminal nodes is used to estimate the occupancy level of the corresponding one of the one or more video buffers.

2. The network node of claim 1, wherein the processor is further configured at least to analyze at least a subset of the packets communicated with the one or more terminal nodes to identify application layer messages and extract transaction information from the application layer messages.

3. The network node of claim 2, wherein the transaction information includes one or more items selected from the group consisting of a client address, a client port number, a server address, a server port number, and a uniform resource identifier of an application layer request.

4. The network node of claim 1, wherein the streaming object classification module is further configured to determine the payload type associated with objects conveyed in the packets identified with application layer messages based at least in part on the packets and transaction information extracted from the from the application layer messages.

5. The network node of claim 4, wherein the payload type is selected from the group consisting of a media segment and a manifest.

6. The network node of claim 1, wherein the processor is further configured at least to associate the objects conveyed in the packets identified with application layer messages with one of the one or more streaming sessions based at least in part on a uniform resource identifier associated with the corresponding application layer message and a uniform resource identifier of the one of the one or more streaming sessions.

7. The network node of claim 1, wherein the processor is further configured at least to associate the objects conveyed in the packets identified with application layer messages with one of the one or more streaming sessions based at least in part on the transaction information extracted from the corresponding application layer message and the transaction information of another object associated with the one of the one or more streaming sessions.

8. The network node of claim 7, wherein the transaction information includes one or more items selected from the group consisting of a client address, a client port number, a server address, a server port number, and a uniform resource identifier of an application layer request.

9. The network node of claim 1, wherein the processor is further configured at least to detect a gap in the decoding timestamps associated with sequential media segments associated with one of the one or more streaming sessions, and wherein the estimation of the buffer occupancy level associated with the one of the one or more streaming sessions is reset after detection of the gap in the decoding timestamps.

10. The network node of claim 1, wherein the processor is further configured at least to detect a reverse in the decoding timestamps associated with sequential media segments associated with one of the one or more streaming sessions, and wherein the estimation of the buffer occupancy level associated with the one of the one or more streaming sessions is reset after detection of the reverse in the decoding timestamps.

11. The network node of claim 1, wherein the processor is further configured at least to cache at least one manifest after termination of the associated one of the one or more streaming sessions and to utilize the cached manifest in the estimation of the buffer occupancy level associated with a subsequent one of the one or more streaming sessions.

12. The network node of claim 1, wherein the processor is further configured at least to modify a header field in a response message conveying a manifest to disable caching of the manifest.

13. The network node of claim 1, wherein the processor is further configured at least to receive downlink packets via the second communication module and schedule the downlink packets for transmission by the first communication module utilizing scheduler parameters, the scheduler parameters based at least in part on the estimated occupancy levels of the one or more video buffers in the one or more terminal nodes.

14. A method for use in operating a network node that communicates packets with one or more terminal nodes, the packets including packets associated with one or more streaming sessions, the method comprising:
determining, based on an inspection of at least a subset of the packets communicated with the one or more terminal nodes, a payload type associated with objects conveyed in packets identified with application layer messages;
associating, based on an inspection of at least a subset of the packets communicated with the one or more terminal nodes, objects conveyed in the packets identified with application layer messages with the one or more streaming sessions; and estimating an occupancy level of each of one or more video buffers in the one or more terminal nodes, each of the one or more video buffers being associated with one of the one or more streaming sessions, at least by utilizing decoding timestamps associated with media segments conveyed by packets communicated to the one or more terminal nodes, wherein utilizing the decoding timestamps comprising utilizing locations and a timing advancement of the decoding timestamps so as to estimate the occupancy level of the each of one or more video buffers in the one or more terminal nodes, wherein, in the case that one of the one or more streaming sessions uses multiple connections to concurrently communicate multiple media segments, the latest decoding timestamp of the oldest of the concurrent media segments communicated to the corresponding one of the one or more terminal nodes is used to estimate the occupancy level of the corresponding one of the one or more video buffers.

15. The method of claim 14, further comprising analyzing at least a subset of the packets communicated with the one or more terminal nodes to identify application layer messages and extract transaction information from the application layer messages.

16. The method of claim 15, wherein the transaction information includes one or more items selected from the group consisting of a client address, a client port number, a server address, a server port number, and a uniform resource identifier of an application layer request.

17. The method of claim 14, wherein determining the payload type associated with objects conveyed in the packets identified with application layer messages is based at least in part on the packets and transaction information extracted from the from the application layer messages.

18. The method of claim 17, wherein the payload type is selected from the group consisting of a media segment and a manifest.

19. The method of claim 14, further comprising associating the objects conveyed in the packets identified with application layer messages with one of the one or more streaming sessions based at least in part on a uniform resource identifier associated with the corresponding application layer message and a uniform resource identifier of the one of the one or more streaming sessions.

20. The method of claim 14, further comprising associating the objects conveyed in the packets identified with application layer messages with one of the one or more streaming sessions based at least in part on the transaction information extracted from the corresponding application layer message and the transaction information of another object associated with the one of the one or more streaming sessions.

21. The method of claim 20, wherein the transaction information includes one or more items selected from the group consisting of a client address, a client port number, a server address, a server port number, and a uniform resource identifier of an application layer request.

22. The method of claim 14, further comprising detecting a gap in the decoding timestamps associated with sequential media segments associated with one of the one or more streaming sessions, and wherein the estimation of the buffer occupancy level associated with the one of the one or more streaming sessions is reset after detection of the gap in the decoding timestamps.

23. The method of claim 14, further comprising detecting a reverse in the decoding timestamps associated with sequential media segments associated with one of the one or more streaming sessions, and wherein the estimation of the buffer occupancy level associated with the one of the one or more streaming sessions is reset after detection of the reverse in the decoding timestamps.

24. The method of claim 14, further comprising caching at least one manifest after termination of the associated one of the one or more streaming sessions and utilizing the cached manifest in estimating the buffer occupancy level associated with a subsequent one of the one or more streaming sessions.

25. The method of claim 14, further comprising modifying a header field in a response message conveying a manifest to disable caching of the manifest.

26. The method of claim 14, further comprising scheduling downlink packets to be communicated to the one or more terminal nodes utilizing scheduler parameters, the scheduler parameters based at least in part on the estimated occupancy level of the one or more video buffers in the one or more terminal nodes.

27. A network node, comprising:
a first communication module configured to communicate packets with one or more terminal nodes, the packets including packets associated with one or more streaming sessions;
a second communication module configured to provide communications with one or more video servers; and
a processor, based on an inspection of at least a subset of the packets communicated with the one or more terminal nodes, configured at least to:
determine a payload type associated with objects conveyed in packets identified with application layer messages,
associate the objects conveyed in the packets identified with application layer messages with the one or more streaming sessions, and
estimate an occupancy level of each of one or more video buffers in the one or more terminal nodes, each of the one or more video buffers being associated with one of the one or more streaming sessions, at least by utilizing decoding timestamps associated with media segments conveyed by packets communicated to the one or more terminal nodes, wherein utilizing the decoding timestamps comprising utilizing locations and a timing advancement of the decoding timestamps so as to estimate the occupancy level of the each of one or more video buffers in the one or more terminal nodes, wherein the processor is further configured at least to detect a gap or a reverse in the decoding timestamps associated with sequential media segments associated with one of the one or more streaming sessions, and wherein the estimation of the buffer occupancy level associated with the one of the one or more streaming sessions is reset after detection of the gap or the reverse in the decoding timestamps.

28. A method for use in operating a network node that communicates packets with one or more terminal nodes, the packets including packets associated with one or more streaming sessions, the method comprising:
determining, based on an inspection of at least a subset of the packets communicated with the one or more terminal nodes, a payload type associated with objects conveyed in packets identified with application layer messages;
associating, based on an inspection of at least a subset of the packets communicated with the one or more terminal nodes, objects conveyed in the packets identified with application layer messages with the one or more streaming sessions;

estimating an occupancy level of each of one or more video buffers in the one or more terminal nodes, each of the one or more video buffers being associated with one of the one or more streaming sessions, at least by utilizing decoding timestamps associated with media segments conveyed by packets communicated to the one or more terminal nodes, wherein utilizing the decoding timestamps comprising utilizing locations and a timing advancement of the decoding timestamps so as to estimate the occupancy level of the each of one or more video buffers in the one or more terminal nodes; and detecting a gap or a reverse in the decoding timestamps associated with sequential media segments associated with one of the one or more streaming sessions, and wherein the estimation of the buffer occupancy level associated with the one of the one or more streaming sessions is reset after detection of the gap or the reverse in the decoding timestamps.

\* \* \* \* \*